United States Patent [19]

Zodrow et al.

[11] Patent Number: 5,227,005

[45] Date of Patent: * Jul. 13, 1993

[54] LABELLING STATION FOR LABELLING OBJECTS, SUCH AS BOTTLES

[75] Inventors: Rudolf Zodrow; Rainer Buchholz, both of Düsseldorf, Fed. Rep. of Germany

[73] Assignee: ETI-TEC Maschinenbau GmbH, Erkrath, Fed. Rep. of Germany

[*] Notice: The portion of the term of this patent subsequent to May 21, 2008 has been disclaimed.

[21] Appl. No.: 495,562

[22] Filed: Mar. 16, 1990

Related U.S. Application Data

[63] Continuation-in-part of Ser. No. 335,478, Apr. 7, 1989, Pat. No. 5,004,518, and a continuation-in-part of Ser. No. 334,891, Apr. 7, 1989, Pat. No. 4,981,547, and a continuation-in-part of Ser. No. 335,025, Apr. 7, 1989, Pat. No. 5,062,917, and a continuation-in-part of Ser. No. 335,177, Apr. 7, 1989, Pat. No. 5,017,261, and a continuation-in-part of Ser. No. 432,113, Nov. 3, 1989, Pat. No. 5,062,918, which is a continuation-in-part of Ser. No. 335,478, Nov. 3, 1989.

[30] Foreign Application Priority Data

Mar. 16, 1989 [DE] Fed. Rep. of Germany ....... 3908659

[51] Int. Cl.$^5$ ................................................ B65C 9/12
[52] U.S. Cl. .................................... 156/566; 156/568; 156/571; 118/230
[58] Field of Search ............... 156/568, 571, 578, 566, 156/567; 118/230, 231; 271/33

[56] References Cited

U.S. PATENT DOCUMENTS

| | | | |
|---|---|---|---|
| 288,134 | 11/1983 | Stone, Jr. | 74/443 |
| 2,080,414 | 5/1937 | Ermold | 91/18 |
| 2,860,804 | 11/1958 | Sherrington | 216/54 |
| 3,919,040 | 11/1975 | Zodrow | 156/571 |
| 4,040,887 | 8/1977 | Zodrow | 156/384 |
| 4,077,621 | 3/1978 | Knuppertz et al. | 156/568 X |
| 4,092,207 | 5/1978 | Zodrow | 156/568 |
| 4,298,422 | 11/1981 | Zodrow | 156/568 |
| 4,336,098 | 6/1982 | Zodrow | 156/568 |
| 4,361,460 | 11/1982 | Kronseder | 156/568 |
| 4,430,141 | 2/1984 | Zodrow | 156/360 |
| 4,445,961 | 5/1984 | Kronseder et al. | 156/364 |
| 4,450,040 | 5/1984 | Zodrow et al. | 156/171 X |
| 4,508,330 | 4/1985 | Jorss | 156/568 X |
| 4,531,995 | 6/1985 | Gau | 156/456 |
| 4,709,796 | 12/1987 | Uenohara | 192/106.1 |
| 5,017,261 | 5/1991 | Zodrow et al. | 156/571 X |
| 5,062,917 | 11/1991 | Zodrow | 156/571 X |

FOREIGN PATENT DOCUMENTS

| | | |
|---|---|---|
| 2435582 | 2/1976 | Fed. Rep. of Germany . |
| 2436003 | 2/1976 | Fed. Rep. of Germany . |
| 2709521 | 9/1977 | Fed. Rep. of Germany . |
| 2954229 | 3/1981 | Fed. Rep. of Germany . |
| 2129004 | 10/1972 | France . |
| 2279623 | 2/1976 | France . |
| 2344763 | 10/1977 | France . |
| 8120173 | 10/1981 | France . |
| 979541 | 1/1965 | United Kingdom .................. 74/443 |

Primary Examiner—David A. Simmons
Assistant Examiner—James J. Engel, Jr.
Attorney, Agent, or Firm—Nils H. Ljungman and Associates

[57] ABSTRACT

This invention relates to a labelling station for objects such as bottles with several stations located one behind another along a track, which includes an adhesive application station, a label feed station and a label transfer station. At least one extracting element is mounted so that it can rotate on a driven support plate. The drive mechanism comprises a cam drive mechanism. The cam drive mechanism comprises a stationary double cam disc with two one-sided cams located above one another, and two sets of followers. The two sets of followers are mounted on the drive shaft of the extracting element or on a bearing shaft coupled to it by means of a support element. During rotation of the support plate, the two sets of followers provide, by action of a form-fit with the two cam surfaces, a positive movement of each extraction element over its entire revolution. To achieve a simple and compact construction of the labelling station, the drive or bearing shaft ends above the plane of the first cam disc which is closest to said bearing shaft, thus allowing the first cam disc to extend into the open space below the shaft without interference from the shaft.

20 Claims, 39 Drawing Sheets

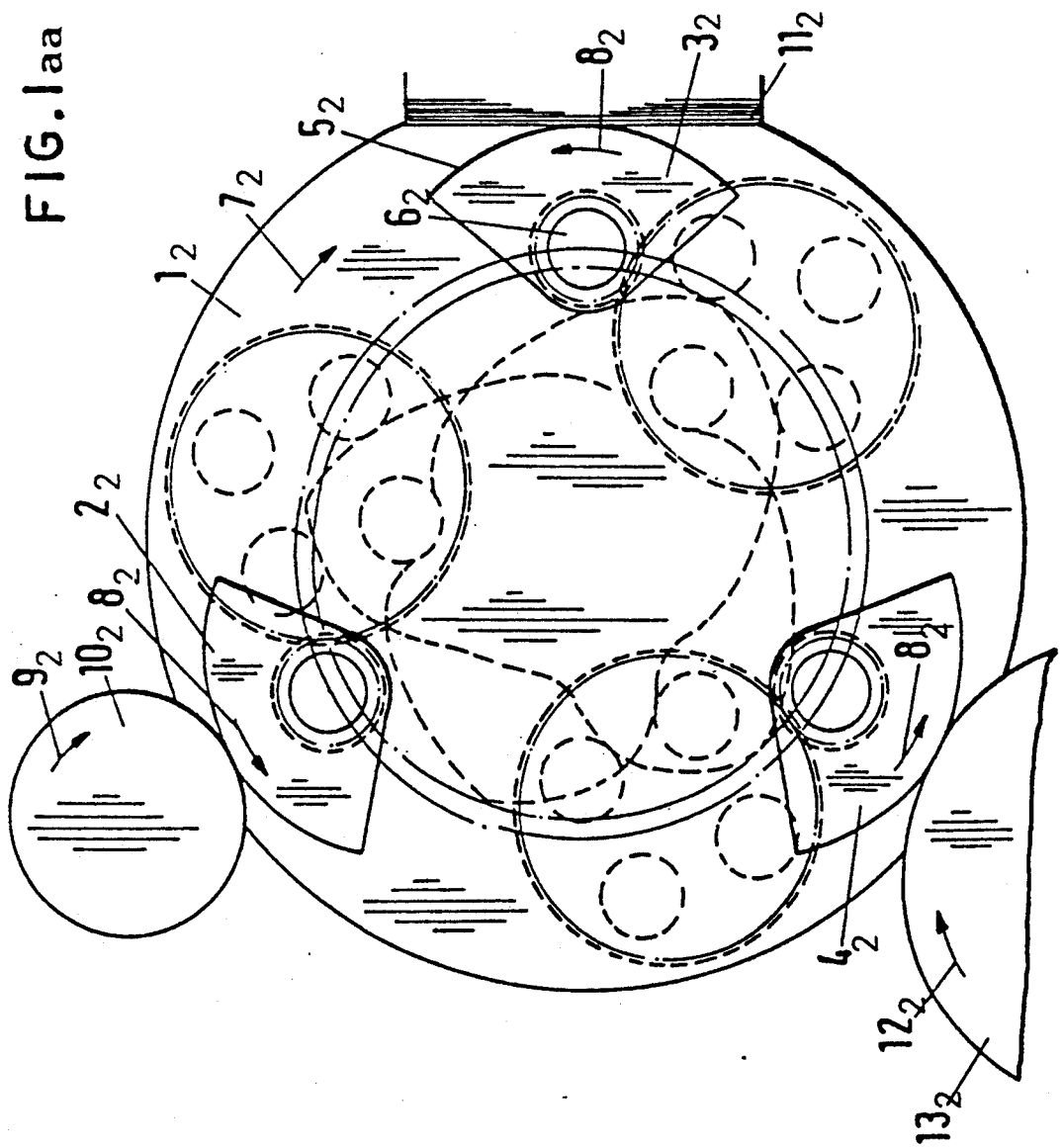

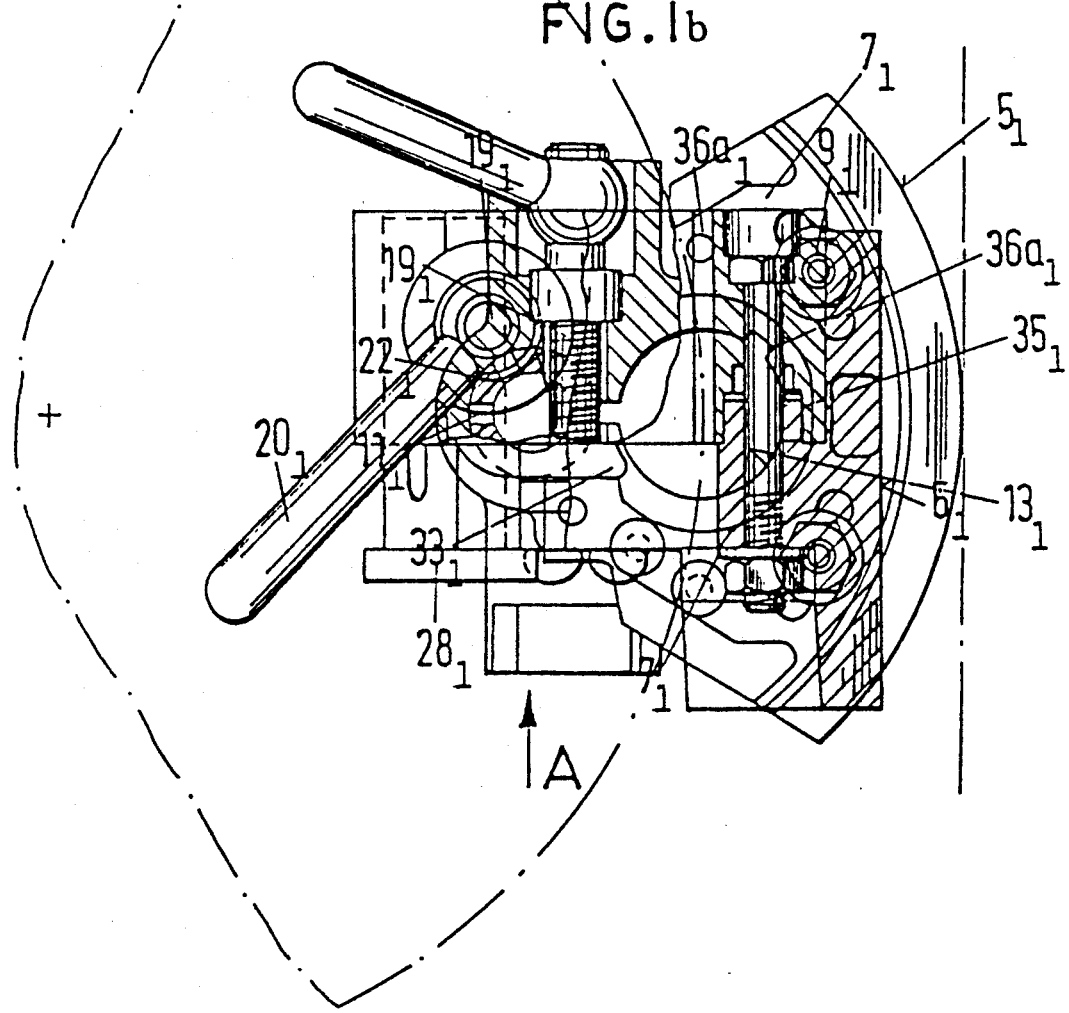

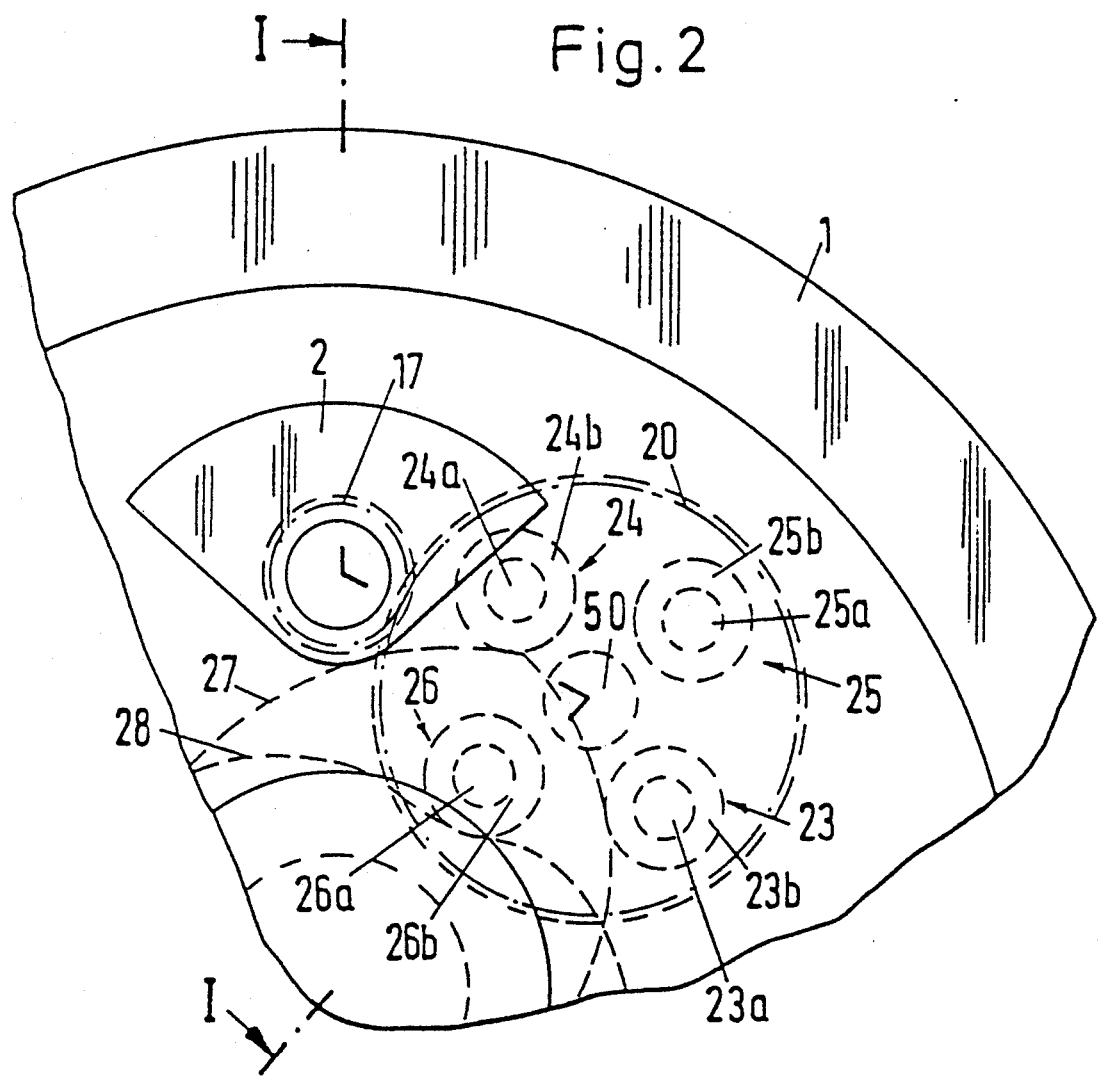

LABELLING STATION FOR LABELLING OBJECTS, SUCH AS BOTTLES

The present application is a continuation-in-part of U.S. patent application Ser. No. 07/335,478, U.S. Pat. No. 5,004,518, entitled "LABELLING MACHINE FOR OBJECTS SUCH AS BOTTLES OR THE LIKE" filed Apr. 7, 1989; U.S. patent application Ser. No. 07/334, 891, U.S. Pat. No. 4,981,547, entitled "MOUNTING AND DRIVE COUPLING FOR THE EXTRACTING ELEMENT SUPPORT OF A LABELLING STATION FOR A LABELLING MACHINE FOR CONTAINERS AND SIMILAR OBJECTS" filed Apr. 7, 1989: U.S. patent application Ser. No. 07/335,025, U.S. Pat. No. 5,062,917, entitled "SUPPORT ELEMENT FOR THE FOLLOWERS OF A CAM DRIVE OF A DRIVE MECHANISM AND A LABELLING STATION EQUIPPED WITH A SUPPORT ELEMENT" filed Apr. 7, 1989 and U.S. patent application Ser. No., 07/335,177, U.S. Pat. No. 5,017,261, entitled "LABELLING MACHINE FOR OBJECTS SUCH AS BOTTLES OR THE LIKE" filed Apr. 7, 1989. The present application is also a continuation-in-part of U.S. patent application Ser. No. 07/432,113, U.S. Pat. No. 5,062,918, entitled "GLUE SEGMENTS WHICH CAN BE ATTACHABLE TO A DRIVE SHAFT OF A LABELLING MACHINE" filed Nov. 3, 1989 which is a continuation-in-part of U.S. patent application Ser. No. 07/335,478, U.S. Pat. No. 5,004,578, entitled "LABELLING MACHINE FOR OBJECTS SUCH AS BOTTLES OR THE LIKE" filed Apr. 7, 1989.

BACKGROUND OF THE INVENTION

1. Field of the Invention

This invention relates to a labelling station for objects, in particular bottles, with several stations located behind one another along a track, comprising an adhesive or glue application apparatus, a label supply station and a label transfer station. The invention has at least one extracting element which can rotate on a rotating support and be moved past the stations during each rotation of the support.

The extracting element has an outwardly-curved receptacle surface to receive the label as the extracting element moves or rolls past the stations. The drive mechanism for each extracting element is a cam drive, which comprises common, stationary double cam discs for all the extracting elements with the cams located on one side of the drive mechanism and in two different planes, one plane being above the other and at some distance from the other.

Two sets of followers are mounted on the drive shaft or on a bearing shaft which is coupled with the drive shaft by means of a support element. The positive, directed movement of each extracting element over its entire revolution as the support rotates is protected by means of a form-fit with the two cam surfaces.

2. Background Information

The prior art includes various cam-controlled drive mechanisms to turn the extracting elements in labelling machines at the various stations in the same direction with different angular velocities over the entire orbit.

In a first drive system of the prior art (German Patent No. 24 36 003 P2), the extracting elements are always driven by a pair of lever arms, which are guided with a follower in a closed grooved cam. The partly-overlapping grooved cams are in different planes, to allow for an unobstructed path while guided by the lever arms. Each follower is clearly guided or directed as positioned on the two flanks of the corresponding grooved cam. The grooved cams are configured so that the one follower is under torque when the other follower is in an idle position. However, such a drive mechanism has not been used in actual practice.

Further, it has not been possible to utilize in actual practice another drive mechanism for a labelling machine of the type described above (German Patent No. 27 09 521 A1). In the description of the drive mechanism in this patent, there are two cam discs with outside cams located in two planes, one plane above the other. There is a set of two followers, each of which correspond to the two cam discs in two different planes. The two pairs of followers are offset on the upper and lower side of a disc by 90 degrees in relation to one another. The disc is supported by a bearing shaft which extends to the plane between the cam discs. It cannot be determined from the prior art whether precautions have been taken in the design of the drive mechanism to provide for a collisionfree passage area, for example, an open space which the bearing shaft does not enter. According to the present invention, the open space or collision-free area is preferably located outside the radial areas of the cam disc adjacent to the bearing shaft.

According to U.S. Pat. No. 42 98 422, a labelling machine of the type described above, but with another drive mechanism, has been used in actual practice. In this labelling machine, the cam drive mechanism is designed as a lantern gear transmission, with two sets of lantern gear teeth located on the inside of the double cam disc which disc is in the shape of a ring-like body. The support element, which supports one set of the followers designed as lantern wheels on its two sides, is located between the two lantern gears on the end of the drive shaft of the extracting element with the drive shaft extending to the end point. The points of the teeth of this lantern gear are cut off to provide for a collision-free passage of the drive shaft along the lantern gear on the shaft side. With this type of drive mechanism, of course, a non-uniform rotation of the extracting elements can be achieved, but the cost and complexity of the lantern gear transmission is quite high. A further disadvantage is that the radial diameter of the lantern gears cannot be very compact on account of the minimum width of the individual teeth required.

OBJECT OF THE INVENTION

The object of this invention is to create a labelling station with a simpler drive mechanism, which has a more compact structure and provides one or more open spaces, or shaft-free open areas, to maintain a collision-free, smooth operation of the machinery. This object is accomplished with a labelling station in which the drive or bearing shaft ends in front of the plane of the first cam lying closest to this shaft. Thus, in a preferred embodiment of the present invention, a shaft-free open area may be located substantially directly below the bearing shaft, wherein the bearing shaft ends in front of the plane of the first cam lying closest to the bearing shaft. Moreover, as is inherently clear from the drawings, an additional shaft-free open area may be located substantially directly below the drive shaft, wherein the drive shaft ends in front of the plane of the first cam lying closest to the drive shaft. Further, the followers which correspond to the other or second cam, are mounted on a bridge element lying between the first and second cams. The bridge element is supported by spacer elements mounted on the support element. The spacer elements lie outside the area covered by the motion of the first cam. It is particularly advantageous if the followers, which are already present, comprise the spacer elements.

SUMMARY OF THE INVENTION

The labelling station in accordance with the invention can be designed with a compact structure and with a simple configuration of the cams, since both cams with their actuators can extend into the area of the drive or bearing shaft of the followers. According to the present invention and of particular advantage, the spacer elements need not be designed as followers.

BRIEF DESCRIPTION OF THE DRAWINGS

The invention will be further explained below with reference to the following drawings.

FIG. 1ab is an overhead schematic view of a cam drive mechanism for an extraction element.

FIG. 1ac is an axial cross section of the cam drive mechanism shown in FIG. 1ab along Line I—I in FIG. 1ab.

FIG. 1ad illustrates the labelling station shown in FIG. 1aa in a schematic, overhead, expanded, partly modified view.

FIG. 1a is a sectional, elevational view of two glue segments which are simultaneously mounted on the drive shaft of the preferred labelling machine including various features of the invention.

FIG. 1b is an elevational view, partially in section, of the lowest one of the two glue segments shown in FIG. 1a.

FIG. 1c is a bottom view, partially in section, of the glue segment of FIG. 1b as seen when viewed in the direction of the arrow A.

FIG. 1d is a sectional, elevational view of one of the distance elements shown in FIG. 1a.

FIG. 2 is a fragmentary overhead schematic view of one of the cam drive mechanisms for one of the extraction elements in FIG. 1.

DESCRIPTION OF THE PREFERRED EMBODIMENTS

Figure 1:
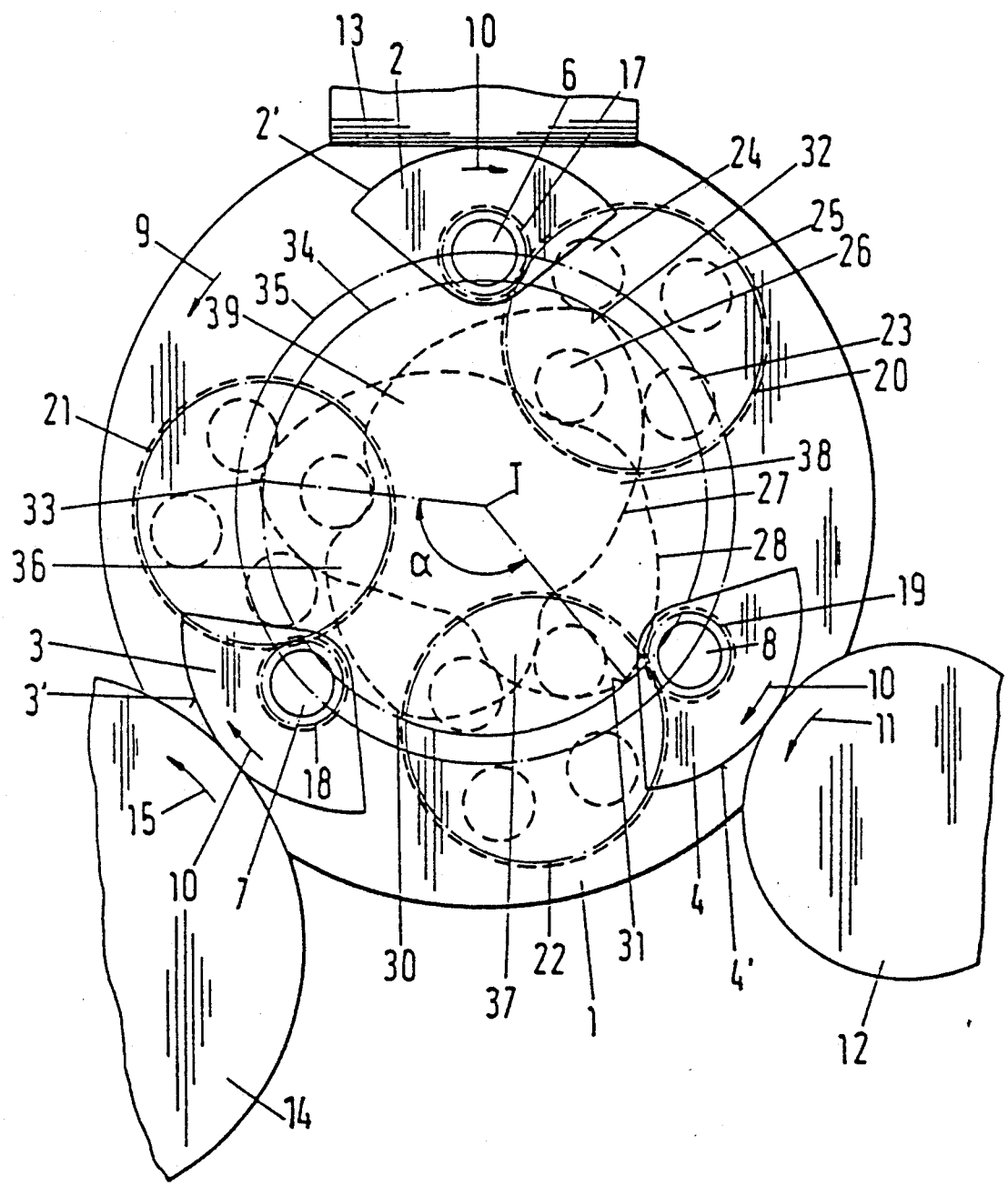
FIG. 1 is a schematic overhead view of a preferred labelling machine including various features of the invention.
Figure 1A:
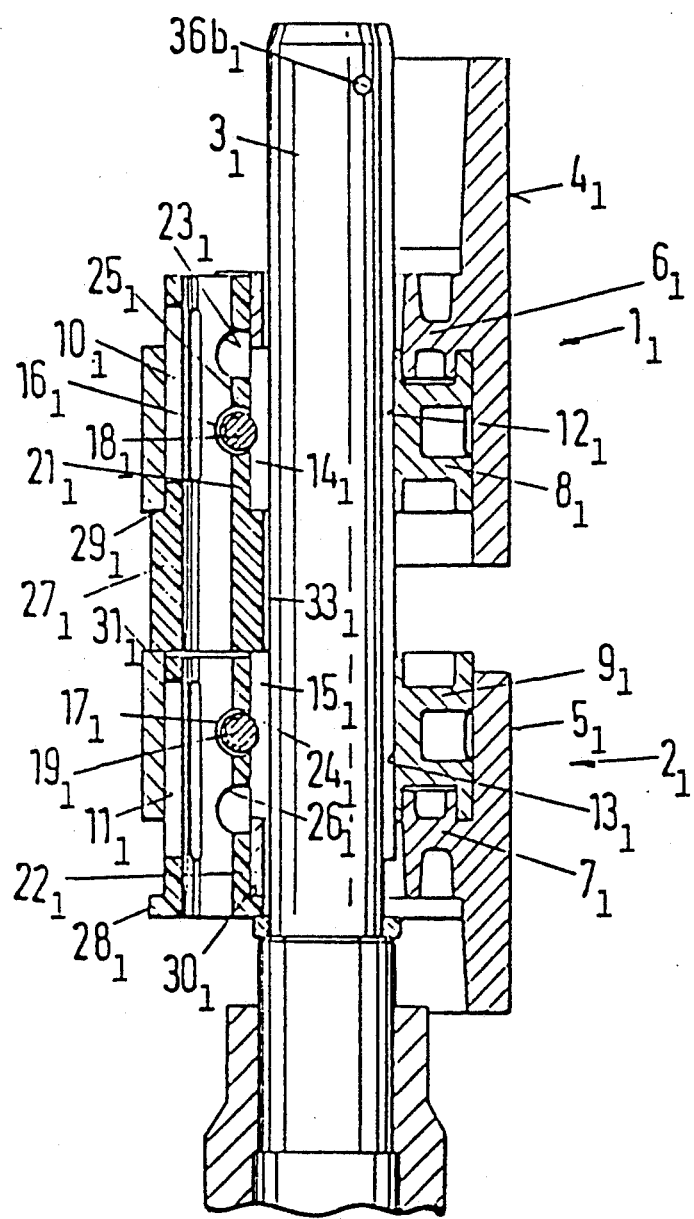
FIG. 1aa is a schematic overhead view of a labelling station.
Figure 1A:
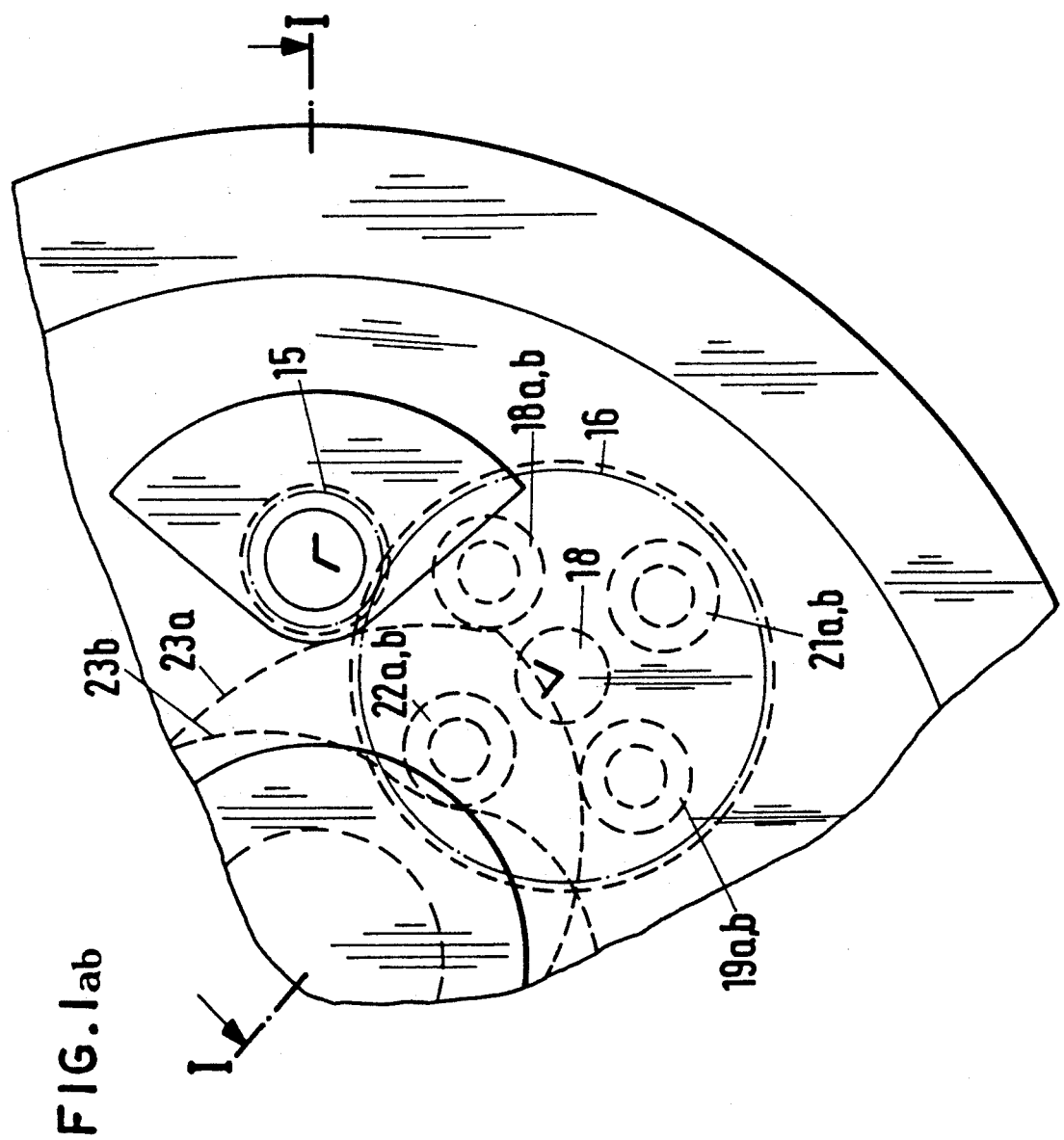
Figure 1A:
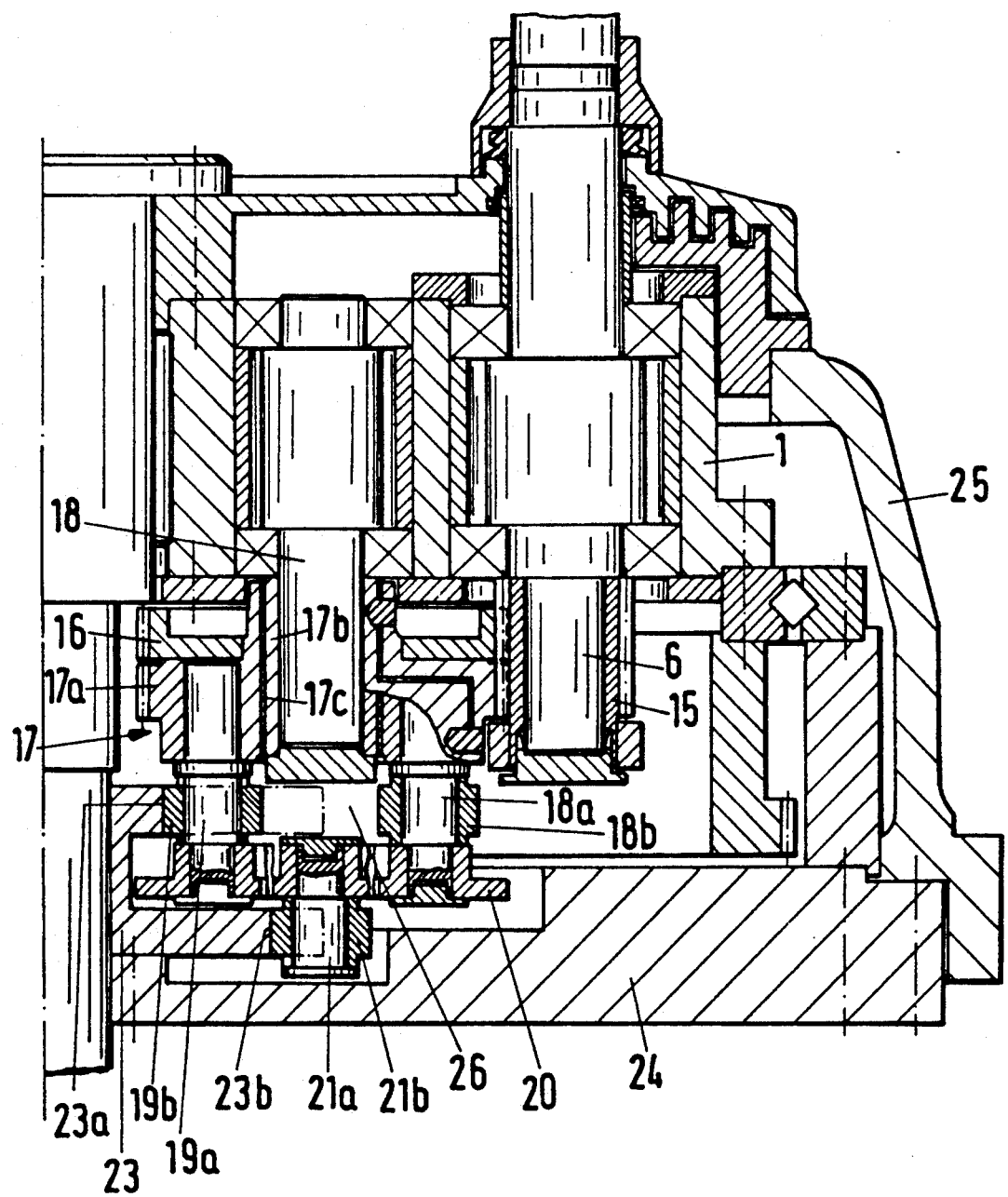
Figure 1A:
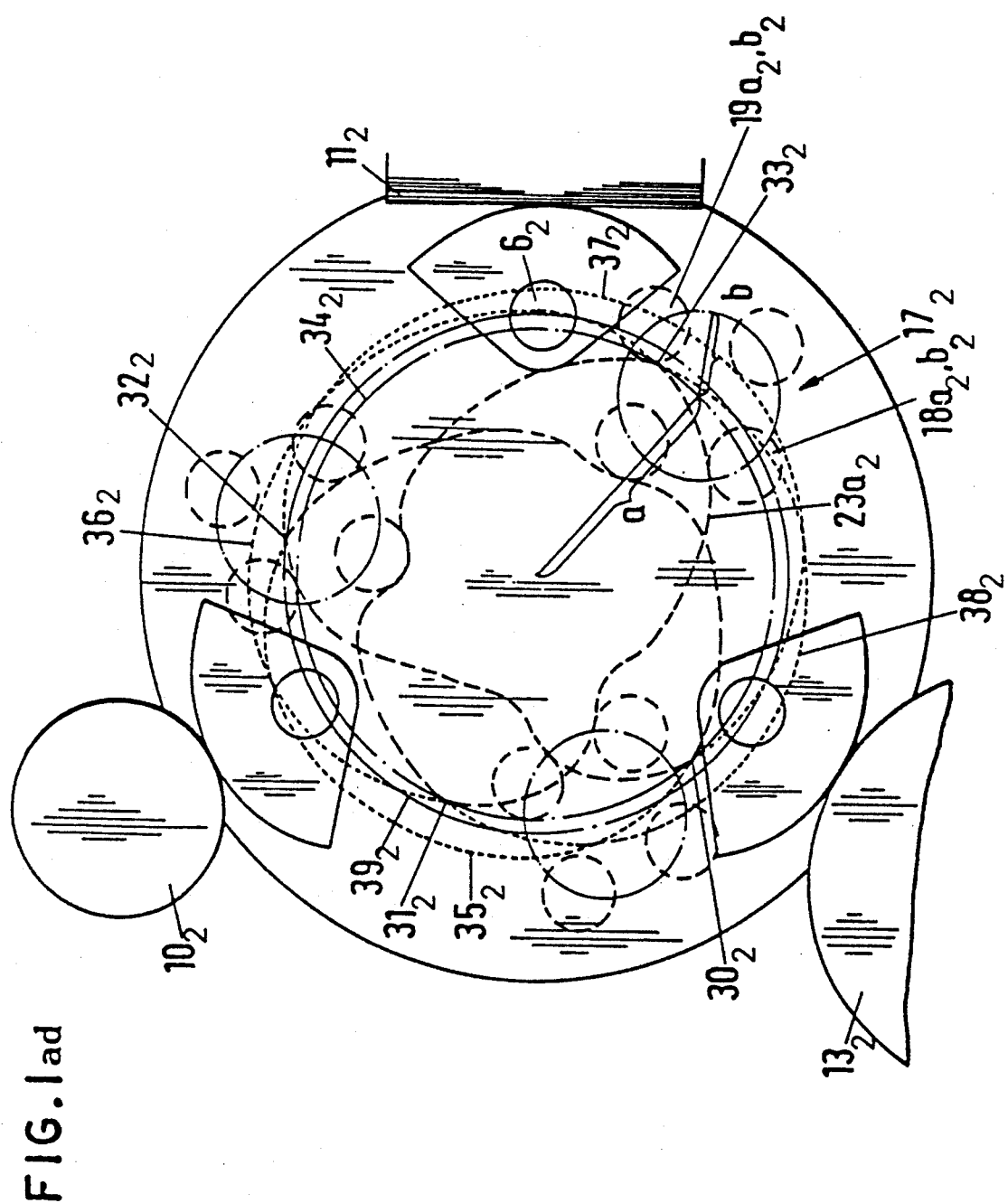

The labelling station illustrated in FIG. 1aa consists of a plate-shaped support $1_2$, on which three extracting elements $2_2, 3_2, 4_2$ are located at equal angles relative to each other and form a circular path, that is, rotate along circular track $39_2$. Each extracting element $2_2, 3_2, 4_2$ has a cylindrically curved receptacle surface $5_2$ for receiving a label, and is mounted on a support plate $1_2$ with a drive shaft $6_2$ extending through the support plate $1_2$. The center point of the drive shafts of all the extracting elements lies on the circumference of the circular track $39_2$ formed by the position of the extracting elements on the support plate $1_2$.

When the support plate $1_2$ is rotated in the direction of the arrow $7_2$, the extraction elements $2_2$, $3_2$, $4_2$ are forced to rotate by a drive mechanism, described herein, in the direction of the arrow $8_2$, that is, in a direction opposite to the support plate $1_2$.

During this rotation of the support plate $1_2$, the extraction elements $2_2$, $3_2$, $4_2$ move past, rolling-off each of the various stations, comprising a glue roller $10_2$ rotating in the direction of the arrow $9_2$, a stationary label box $11_2$ with a stack of labels inside, and a gripper cylinder $13_2$ rotating in the direction of the arrow $12_2$.

At the first station, an adhesive or glue is applied to the receptacle surface $5_2$ of each extraction element $2_2$, $3_2$, $4_2$ by the adhesive or glue roller $10_2$. At the second or next station, the top label is extracted from the label stack as a result of the adhesive action of the adhesive on the receptacle surface $5_2$ as the receptacle surface $5_2$ moves or rolls past the top label contained in the label stack box $11_2$. As the support plate $1_2$ continues to rotate, the label is next conducted to the third station containing the gripper cylinder $13_2$. The gripper cylinder $13_2$ takes the freshly glued label off the receptacle surface $5_2$ and transfers the label, in a manner not shown herein, to objects such as bottles. The objects or bottles are also moving past the gripper cylinder $13_2$, in a manner not shown herein.

In order for the receptacle surface $5_2$ to roll past the variously configured stations $10_2$, $11_2$, $13_2$, the speed of the rotating movement of each extraction element $2_2$, $3_2$, $4_2$ in the direction of the arrow $8_2$ needs to be accelerated or increased and decelerated or decreased as required. The drive mechanism illustrated in detail in FIGS. $1ab$ and $1ac$ is designed to adjust accordingly the speed of the rotating extraction elements.

The drive shaft $6_2$, mounted on and extending through the support $1_2$, has a gear wheel $15_2$ on its end below the plateshaped support $1_2$. This gear wheel $15_2$ meshes with a larger gear wheel $16_2$. The larger gear wheel $16_2$ is part of a support element $17_2$ which sits on the lower end of a bearing shaft $18_2$. The shaft $18_2$ is also mounted in the support $1_2$. The support element $17_2$ consists of an external body $17a_2$ and an internal body $17b_2$. The two bodies $17a_2$, $17b_2$ have radially-oriented claws which engage one another, and between which, covering the entire surface, is a thin elastic insert $17c_2$ of damping material.

The gear wheel $16_2$ is rigidly connected with the outside body $17a_2$. Two diametrically-opposite followers are fastened underneath to outside body $17c_2$. Each follower consists of a bearing neck $18a_2$, $19a_2$ and a roller $18b_2$, $19b_2$ mounted on the followers so that the followers can rotate. Since the elastic intermediate insert $17c_2$ is located between the outside body $17a_2$ and the inside body $17b_2$, a decoupling of the gear wheel $16_2$ and the followers is possible if needed or required.

The bearing necks $18a_2$, $19a_2$ support and hold a ring-shaped bridge element $20_2$ which is positioned below the necks $18a_2$, $19a_2$. Two followers, diametrically opposite one another and offset by 90 degrees from the followers $18a_2$, $18b_2$, $19a_2$, $19b_2$, are underneath and fastened to the bridge element $20_2$. These followers also consist of bearing necks $21a_2$, $22a_2$ and rollers $21b_2$, $22b_2$, respectively.

The two sets of followers, $18a_2$, $18b_2$, $19a_2$, $19b_2$ and $21a_2$, $21b_2$, $22a_2$, $22b_2$, correspond to a double cam disc 23 having two outside cams $23a$, $23b$. This double cam disc $23_2$ is rigidly connected via a support bridge $24_2$ with the machine frame $25_2$ of the labelling station.

As shown in FIG. $1ab$ and indicated by dotted lines in FIG. $1ac$, the outside cams $23a_2$, $23b_2$ lie in partial segments in the vicinity of the axis of the bearing shaft $18_2$. A shaft-free or open space, or shaft-free open area, $26_2$ is created as a result of a design wherein the bridge element $20_2$ is located in the vicinity of the outside cam $23a_2$ and is located in the center between the followers $18a_2$, $18b_2$ and $19a_2$, $19b_2$. According to the present design, the drive or bearing shaft $18_2$ will not enter the open or free space $26_2$. Further, the vicinity or area of the lower outside cam $23b_2$ will not be entered or affected by the operation of bearing shaft $18_2$. Thus, the cams $23a_2$, $23b_2$ can be optimally configured over their entire length, and the complete drive mechanism can be compactly designed with economical components. As is also inherently clear from the drawings, particularly FIG. $1ac$, the drive shaft $6_2$ may end in front of the plane of the first cam $23a_2$ lying closest to the drive shaft $6_2$ to create an additional shaft-free open area substantially directly below the drive shaft $6_2$.

As shown in FIG. $1ad$, the arrangement of the three stations, comprising the adhesive or glue roller $10_2$, the label box $11_2$ and the gripper cylinder $13_2$, divides the support plate $1_2$ into three preferably similar sectors. In FIG. $1ad$, these sectors are shown bounded by the long-short dashed, radial lines running and extending through the center of the stations $10_2$, $11_2$, $13_2$ from the center of support plate $1_2$. In the sector between the adhesive or glue roller $10_2$ and the gripper cylinder $13_2$, there are two extreme points $30_2$, $31_2$ of the outside cams $23b_2$, $23a_2$, respectively. In the sector between the adhesive roller $10_2$ and the label box $11_2$, there is one extreme point $32_2$ of the outside cam $23b_2$. Similarly, in the sector between the label box $11_2$ and the gripper cylinder $13_2$, there is one extreme point $33_2$ of the outside cam $23a_2$.

At least one of these extreme points, extreme point $32_2$ in the embodiment, lies outside the track or circular path $34_2$ of the mid-point of the axis of bearing shaft $18_2$ in the support element $17_2$. Track $34_2$ corresponds to the circumference of the circle on which the mid point of the axis of drive or bearing shaft $18_2$ lies.

The load-bearing portions of the outside cams $23a_2$, $23b_2$ for each pair of followers are illustrated by dashed-lines in FIG. $1ad$. The non-load-bearing and therefore not developed cams, which are adjacent to these developed cams $23a_2$, $23b_2$, are illustrated by the dotted lines. These cams $35_2$, $36_2$, $37_2$, lie, for the most part outside the track $39_2$. Circular track $39_2$ corresponds to the circumference of a circle wherein the mid-point of the axis of the drive shaft $6_2$ of the extracting element lies. Track $39_2$, track $34_2$ and the support element plate $17_2$ are concentric with the radius of track $34_2$. The radius of track $34_2$ is slightly less than the radius of the track $39_2$.

In FIG. $1ad$ the ratio of the radius a of the circular track $34_2$ to the radius b of the orbit or circular path of the followers located on the support element $17_2$ is preferably 3 to 1.

A pair or set of followers $18a_2$, $18b_2$, $19a_2$, $19b_2$ are thus engaged with the cam $23a_2$ when a translation transmission is located between the drive shaft and the support element and has a translation ratio of preferably 1 to 3, when the axis of the drive shaft $6_2$ of the extracting element is located outside the track $34_2$ on the support element $17_2$, preferably on track $39_2$, and when the extracting element is centrally position in front of the label box $11_2$, In summary, one aspect of a design resides broadly in a labelling station for objects, such as bottles, with several stations located behind one another along a track, comprising an adhesive or glue application apparatus, a label feed station and a label transfer station. There is at least one extracting element for the labels, mounted so that it can rotate on a rotating support plate and can be moved past the stations during each rotation of the support. The extracting element has an outwardly-curved receptacle surface for receiving the label when the extracting element moves or rolls past the stations. The drive mechanism for each extracting element is a cam drive, which comprises common, stationary double cam discs for all the extracting elements with cams located on one side in two planes, above one another and at some distance from one another. Two sets of followers are mounted on the drive shaft or on a bearing shaft coupled with it by means of a support element. The positive movement of each extracting element over its entire revolution when the support rotates is protected by means of a form-fit with the two cam surfaces.

The design is also characterized by the fact that the drive or bearing shaft $18_2$ ends in front of the plane in which the first cam $23a_2$, being the cam closest to the shaft $18_2$, lies. The followers $21a_2$, $21b_2$, $22a_2$, $22b_2$, which correspond to the other second cam $23b_2$, are mounted on a bridge element $20_2$ which lies between the two cams $23a_2$, $23b_2$. The bridge element $20_2$ is supported by spacer elements $18a_2$, $19a_2$ on the support element $17_2$. The spacer elements $18a_2$, $19a_2$ lie outside the open, shaft-free space $26_2$ which space is entered and affected by the movement of the first cam $23a_2$.

This above described design may also include a labelling machine which has the preferred glue segments as described herein.

As seen in FIGS. 1a, 1b and 1c, two glue segments $1_1,2_1$ are installed on and attached to a common drive shaft $3_1$. Each of the preferred glue segments $1_1,2_1$, which includes a convex curved glue take-up surface $4_1,5_1$, is, according to a design, to be mounted in an adjustable manner on the shaft $3_1$. The glue segments $1_1,2_1$ are respectively formed of carriers $8_1,9_1$ which are rigidly bolted to foundations $6_1,7_1$ of the curved glue take-up surfaces $4_1,5_1$. Because of the possibility of different bottle and label configurations, a design is directed to a means for properly supporting and spacing the glue segment $1_1$ formed of the combined carrier $8_1$ and foundation $6_1$ and the glue segment $2_1$ formed of the combined carrier $9_1$ and foundation $7_1$. As will been seen, each foundation $6_1,7_1$ is rigidly bolted to its respective carrier $8_1,9_1$ with the carrier $8_1,9_1$ being the primary portion of the glue segment which is secured to the drive shaft $3_1$. It should also be noted, as seen in FIG. 1a, that, basically, the carrier can be installed on the shaft $3_1$ with the corresponding foundation disposed either upwardly or downwardly to properly locate the curved glue take-up surface thereon for accepting labels and applying them to a bottle.

Consequently, it is the object of a design to provide a means for mounting the glue segments on the shaft $3_1$ with a proper orientation and with proper axial spacing between the glue segments and on the drive shaft. As a result, each of the carriers $8_1,9_1$ includes a hole $12_1,13_1$ for disposition around the drive shaft $3_1$. Additionally, the carriers $8_1,9_1$ respectively include axial bores $10_1,11_1$ which are substantially located at the center of curvature of the convex curved take-up surfaces $4_1, 5_1$. While the holes $12_1,13_1$ are intended to basically support the glue segments on the shaft, the axial bores $10_1,11_1$ will be utilized for proper axial spacing of the glue segments $1_1,2_1$ along the shaft $3_1$ and will further be employed to provide means for ensuring that, when properly positioned, the glue segments $1_1,2_1$ will be secured against further axial movement.

Generally, for this purpose, it should be noted that, the wall of the carriers $8_1,9_1$ located between axial bores $10_1,11_1$ and receptacle or holes $12_1,13_1$ includes continued axial slits $14_1,15_1$. The slits or slots $14_1,15_1$ have a circumferential width and allow defection of the carriers $8_1,9_1$ in a manner which can allow the interior dimensions of the holes $12_1,13_1$ to be selectively reduced. Diagonally through the wall, there is provided a bore $16_1,17_1$ which partly intersects its corresponding axial bore $10_1,11_1$. Tension bolts $18_1,19_1$ are respectively used to selectively produce the desired deflection of the carrier $8_1,9_1$ in the area of the holes $12_1,13_1$ for fastening of carriers $8_1,9_1$ onto drive shaft $3_1$. Each tension bolt $18_1,19_1$ includes a lever $20_1$, as shown in FIGS. 1b and 1c, to selectively rotate the bolt and to apply the force needed to maintain the carriers $8_1,9_1$ against undesired axial movement along the shaft $3_1$.

In order to establish the axial position of each of the glue segments $1_1,2_1$, there is disposed in each axial bore $10_1,11_1$ a bushing $21_1,22_1$. Each of the bushings $21_1,22_1$ respectively includes transverse or diagonal recesses $23_1,25_1$ and $24_1,26_1$. The recesses $23_1,25_1$ and $24_1,26_1$ can be selectively used for alignment with and receipt of the tension bolts $18_1,19_1$ therein. As a result, the particular bushings $21_1,22_1$ can be selectively prepositioned within their respective axial bores $10_1,11_1$. Generally, such a configuration allows some selectivity and multiple use of different bushings in different bores of different glue segments. Additionally, such a configuration allows, with proper planning, for the glue segments to be preselected for installation on the shaft in either an upward or downward orientation relative to the foundation and take-up surface thereon.

As seen in FIG. 1a, the lower glue segment $2_1$ includes the bushing $22_1$ disposed within the bore $11_1$ as the bolt $19_1$ extends through the recess $24_1$. With such an arrangement, the bushing $22_1$ includes a base element which is disposed within the bore $11_1$ and a spacing element extending outwardly from the bore $11_1$ in an axial direction toward a ring or collar $32_1$ installed on the shaft $3_1$. The preferred spacing element of the bushing $22_1$ includes a collar $28_1$ having an abutting surface at the lower region thereof for making contact with the ring $32_1$.

When the preferred configuration of FIG. 1a is being formed and the glue segments $1_1,2_1$ are initially installed on the shaft $3_1$, the bolt $19_1$ is loosened but still properly maintains the axial position of the bushing $22_1$ therein. After the collar and the abutting surface thereon is positioned against the ring $32_1$, the bolt $19_1$ is tightened to generally deflect the carrier $9_1$ at the slit $15_1$ to create tension between the carrier $9_1$ and the shaft $3_1$ to prevent any axial displacement from the desired axial position as established by the bushing $22_1$. As will be seen later, there is included means for properly circumferentially orienting each of the glue segments $1_1,2_1$ on the shaft $3_1$ to prevent undesired relative rotation therebetween.

As the upper glue segment $1_1$ is being installed, the particular bushing $21_1$ installed in the bore $10_1$, includes a spacing element thereof in the form of a collar $27_1$ to establish proper axial spacing between the glue segments $1_1,2_1$. The collar $27_1$ includes a lower abutting surface which makes contact with an upper rim $31_1$ of the carrier $9_1$ in order to properly axially locate the glue segment $1_1$ on the shaft $3_1$. Again, after proper axial positioning, the bolt $18_1$ can be tightened to secure the glue segment $1_1$ against undesired axial movement from the desired axial position as established by the bushing $21_1$.

It can be seen, from the embodiment as described hereinabove, that the preferred configuration for supporting each of the glue segments $1_1,2_1$ requires the establishment of a basic radially extending surface at a predetermined location axially on the drive shaft $3_1$. The basic radially extending surface for the glue segment $2_1$ is the ring $32_1$. By proper selection of the amount of extension of the spacing element of the bushing $22_1$, the axial position of the entire glue segment $2_1$ can be established and maintained on the shaft $3_1$. Similarly, after the glue segment $2_1$ is properly located, the upper surface thereof provides a radially extending surface disposed at a predetermined location axially on the drive shaft $3_1$ for the establishment of the axial position of the glue segment $1_1$ on the drive shaft $3_1$ by the proper selection of the spacing element disposed in the bore $10_1$ thereof. Consequently, it can be seen that the preferred configuration provides a convenient means for alternatively employing different forms and sizes of bushings in order to conveniently establish spacing of the glue segments while assuring the spacing will be quickly retained when the glue segments are installed on the shaft $3_1$. It might be noted, for example, that the collar $27_1$ of the bushing $21_1$ is preselected for proper extension from the bore $10_1$ so that an edge $29_1$ will make abutting contact with the lower surface of its carrier $8_1$. On the other hand, the bushing $22_1$ is disposed within its bore $11_1$ in a manner such that the collar $28_1$ thereof extends from the bore $11_1$ without any need for such abutting contact with the lower region of the carrier $9_1$.

Figure 1D:
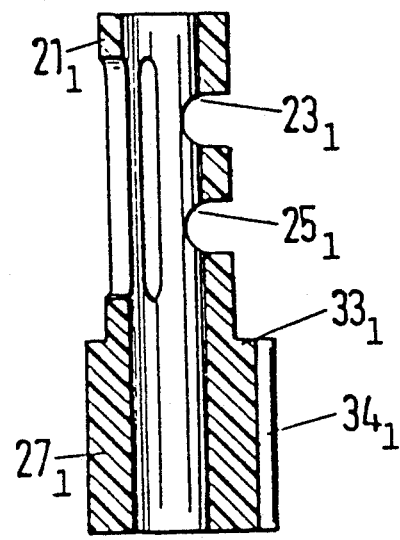
Figure 1E:
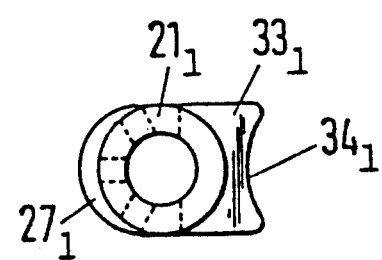
FIG. 1e is a top view of the distance element of FIG. 1d.

As seen in FIGS. 1d and 1e, a preferred bushing $21_1$ includes the collar $27_1$ having an extended portion $33_1$ at one side. The extended portion or projection $33_1$ includes a concave recess $34_1$. The concave recess $34_1$ is adapted to partially encircle the shaft $3_1$ in order to provide a larger support surface around the shaft $3_1$ for better support by, and contact with, a support surface such as that provided by the ring $32_1$ as shown in FIG. 1a. Additionally, by providing the projection $33_1$ and recess $34_1$, the preferred configuration for the bushing $21_1$ ensures that it will be properly oriented within the bore of the carrier for proper alignment of the recesses $23_1,25_1$ for receipt of the tensioning bolt therein.

Figure 1F:
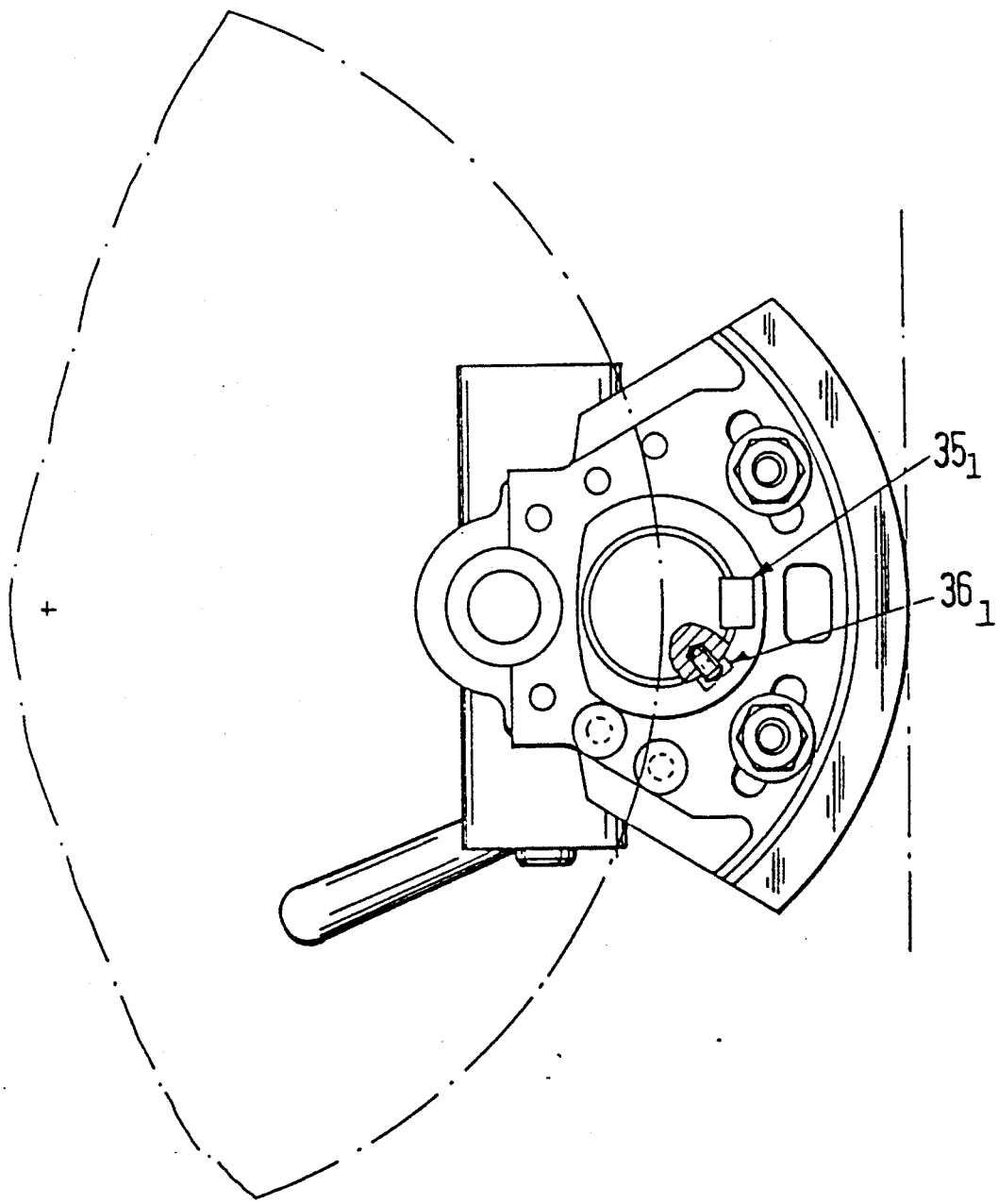
FIG. 1f is a top view, partially in section, of one of the glue segments of FIG. 1a as installed on the drive shaft including a preferred pin installed on the shaft to insure proper orientation of the glue segments.
Figure 1G:
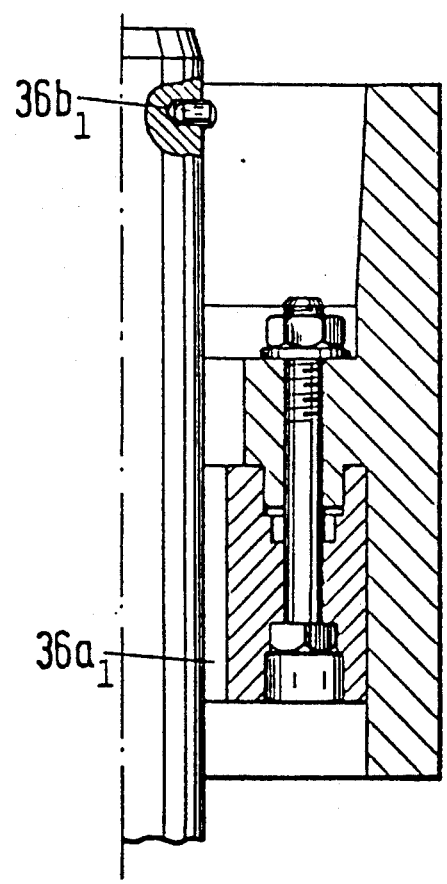
FIG. 1g is a sectional view of the glue segment of FIG. 1f as seen along line VII—VII.

As discussed hereinabove, the basic configuration of the preferred embodiment, as previously described, could be selectively disposed on the shaft with the preselected bushing extending from either side of the bore. Such flexibility is desirable in order to be able to use various components to establish the desired spacing. However, once the proper bushing has been selected and installed, the selected configuration should be readily installed with only one orientation on the shaft. As a result, the preferred embodiment includes, as seen in FIGS. 1f and 1g, means for ensuring that a particular glue segment will only be positioned with one orientation on the shaft after the various components thereof are properly selected. As mentioned above, the glue segments are mounted on the shaft $3_1$ with a matching keyway $35_1$ on the shaft and the carrier. With a key installed in the keyway $35_1$, each of the glue segments $1_1,2_1$ is prevented from rotating relative to the shaft $3_1$. With the glue segments prevented from rotation by the keyway $35_1$ and key therein, the movement from the desired axially position is prevented, as discussed above, by the tightening of the bolt $18_1$ or $19_1$.

To insure that the glue segments are installed properly on the shaft, an additional keyway $36_1$ is provided in the holes $12_1,13_1$. The additional keyway $36_1$ is disposed circumferentially to one side of the keyway $35_1$. The additional keyway $36_1$ is for alignment of a pin $36b_1$ on the shaft $3_1$ for within a groove $36a_1$ of the keyway $36_1$. As seen in FIG. 1g, the pin $36b_1$ need not be specifically disposed within the groove $36a_1$ after the particular glue segment is fully installed on the shaft $3_1$. It is only essential that the pin $36b_1$ be initially aligned with the groove $36a_1$ as the glue segment is initially being installed. Once properly orientated, the glue segment can be moved axially, downwardly on the shaft $3_1$ in a proper orientation so that the key can then be installed in the keyway $35_1$. Proper orientation, as the glue segment is initially being installed, will insure proper orientation after it is proper axially positioned on the shaft.

In further summary, a design includes an attachable glue segment $1_1$ or $2_1$ which is attachable to drive shaft $3_1$. Each segment $1_1,2_1$ respectively consists of a curved glue take-up surface $4_1,5_1$; an axial bore $10_1,11_1$ which is located in the center of the curvature of the glue take-up surface $4_1,5_1$; and an attached axial connecting receptacle or hole $12_1,13_1$ for the drive shaft $3_1$. A wall which is located between the axial bore $10_1,11_1$ and the connecting receptacle $12_1,13_1$ is continually slotted and contains a tension bolt $18_1,19_1$ which is located diagonally to the slot. A design is characterized by the fact that a bushing $21_1,22_1$, which is inserted into its corresponding axial bore $10_1,11_1$, contains a collar $27_1,28_1$ or spacing element which serves as a distance establishing element and is supported on the rim $29_1$ of axial bore $10_1$ or another abutment $30_1$ of the glue segment $2_1$. The glue segments $1_1,2_1$ are secured against movement in an axial direction by clamp bolts $18_1,19_1$ located within the axial bore $10_1,11_1$. These bolts may be either self-locking or self-tapping.

The glue segments may be characterized by the fact that the collars $27_1,28_1$, on one side, have an overhang $33_1$ with a concave recess $34_1$ which matches the contour of drive shaft $3_1$.

The glue segments may also be characterized by the fact that, between the connecting receptacles or holes $12_1,13_1$ and the drive shaft $3_1$, there is a keyway $35_1$, which locks the segments against rotation. In addition, there is a peripherial one sided keyway $36_1$.

An example of a labelling machine in which a design may be used is described as follows:

The labelling station illustrated in FIGS. 1 to 5 consists of a plate-shaped support 1, on which three extracting elements 2, 3, 4 are located at equal angles. Each extracting element 2, 3, 4 has a cylindrically curved receptacle surface 2', 3', 4' for a label and is mounted between the latter and the center point of its curve on a respective drive shaft 6, 7, 8 in the support 1. When the support 1 is rotated in the direction of the arrow 9, the extraction elements 2, 3, 4 are forced to rotate by a drive mechanism (described below) in the direction of the arrow 10, which is opposite to the directional rotation of the support 1.

During this rotation of the support 1, the extraction elements 2, 3, 4 move past various stations. The stations include a glue roller 12 rotating in the direction of the arrow 11, a stationary label box 13 with a stack of labels inside, and a gripper cylinder 14 rotating in the direction of the arrow 15. Each of the extraction elements 2, 3, 4 executes a roll-off movement at the individual stations. First, adhesive is applied to the receptacle surface 2',3', 4' of each extraction element 2, 3, 4 by the adhesive roller 12. While rolling past the front label of the stack of labels in the label box 13, the front label is extracted from the label stack as a result of the adhesive action of the adhesive on the receptacle surface 2', 3' 4'. As the support 1 continues to rotate, the label is conducted to the gripper cylinder 14, which removes the label from the receptacle surface 2', 3', 4' and transfers it in a manner not shown herein to objects, such as bottles, moving past the gripper cylinder 14.

In order for the receptacle surface 2', 3', 4' to roll past the variously configured stations 12, 13, 14, it is necessary for the rotation of each extraction element 2, 3, 4 in the direction of the arrow 9 to be accelerated and decelerated. For this purpose, the extracting elements 2, 3, 4 respectively include pinions 17, 18, 19 which are respectively mounted on the drive shafts 6, 7, 8. The pinions 17, 18, 19 are respectively connected with larger gear wheels 20, 21, 22, which are mounted in the direction of rotation behind the corresponding extracting element 2, 3, 4 by means of bearing shafts shown in FIGS. 2 and 3 in the support 1.

Each larger gear wheel 20, 21, 22 is part of a cam drive mechanism. Each of these cam mechanisms has the same structure, so that the following description can be limited to a single cam drive mechanism but is equally applicable for the others.

The larger gear wheel 20 preferably consists of two gear wheels which can be rotated and fixed in relation to one another to remove play therebetween. The gear wheel 20 is part of a support element 51, which sits on the lower end of the bearing shaft 50 mounted in the support 1. The support element 51 consists of an outside body 51a and an inside body 51b. The two bodies 51a, 51b have radially oriented claws, which are engaged with one another. Between the claws is inserted a thin elastic insert 51c made of damping material.

The gear wheel 20 is rigidly connected to the upper part of the outside body 51a. On the underside of the outside body 51a are fastened two diagonally-opposite followers respectively consisting of a bearing neck 25a, 26a and a roller 25b, 26b rotatably mounted thereon. Because of the elastic insert 51c between the outside body 51a and the inside body 51b, there is thus a decoupling for the gear wheel 20 and the followers 25a, 25b, 26a, 26b.

The bearing necks 25a, 26a support, on their underside, a bridge element 52 in the shape of a ring. On the underside of the bridge element 52 are fastened two followers geometrically opposite one another and offset by 90 degrees from the followers 25a, 25b, 26a, 26b. These followers also respectively consist of a bearing neck 23a, 24a and rollers 23b, 24b located thereon.

The two sets of followers 23a, 23b, 24a, 24b, 25a, 25b, 26a, 26b correspond to a double cam disc 53 having two cams 27, 28 with outside camming surfaces. This double cam disc 53 is rigidly connected via a support bridge 54 with the machine frame 55 of the labelling station. The cams 27, 28 have the shape of ovals indented on both long sides, and are oriented crossways to one another.

Figure 3:
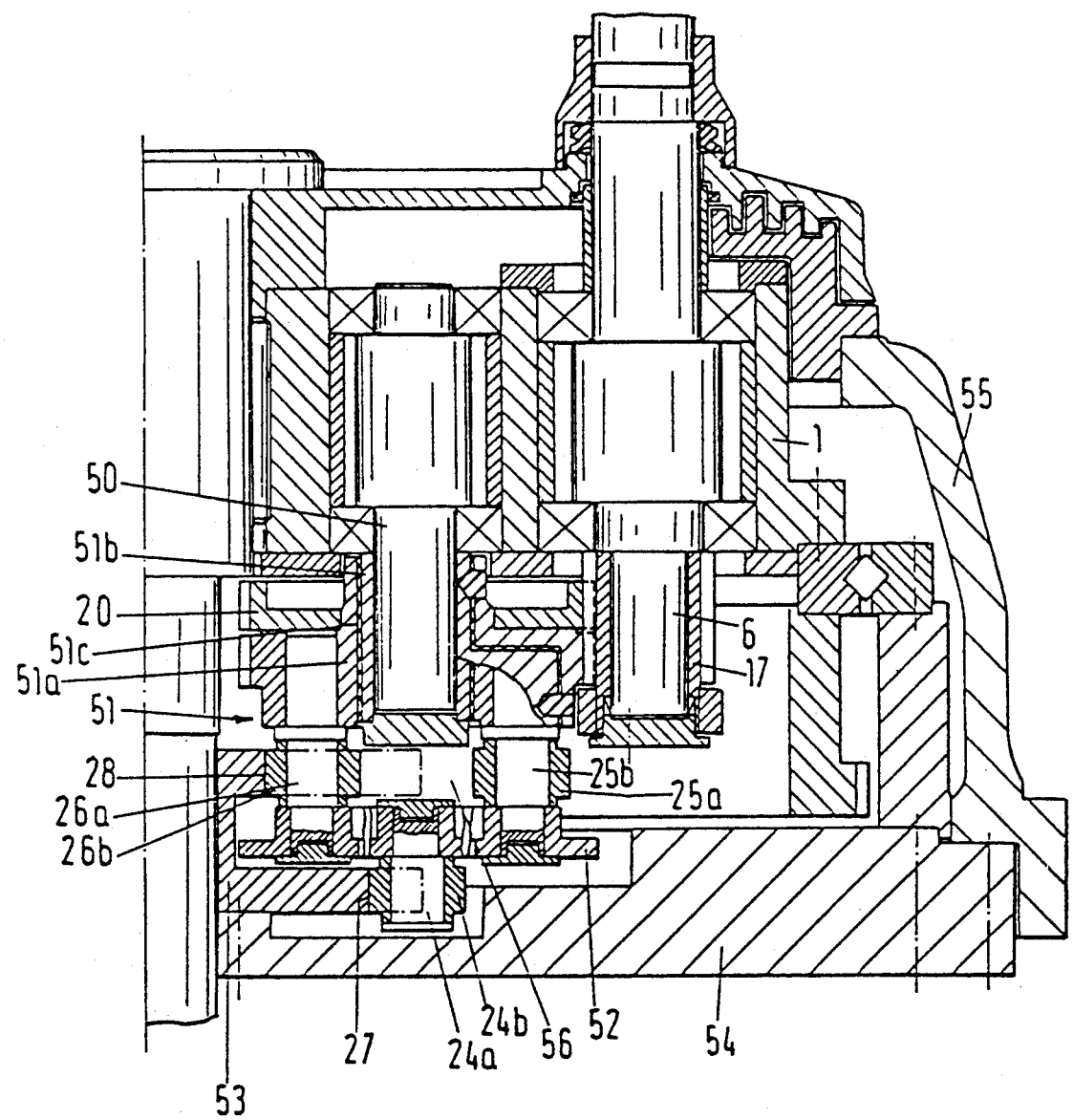
FIG. 3 is a cross section of the cam drive mechanism shown in FIG. 2 as generally seen along Line I—I in FIG. 2.

As shown in FIG. 2 and as indicated by dashed lines in FIG. 3, partial segments of the outside regions of the cams 27, 28 lie in the vicinity of the path of the axis of the bearing shaft 50. However, because of the design with the bridge element 52 lying between the outside portion of the cams 27, 28, in the vicinity of the outside portion of the upper cam 28 in the center between the followers 25a, 25b, 26a, 26b, a shaft-free space 56 is created. In the vicinity of the outside portion of the lower cam 27, the drive or bearing shaft 50 is terminated and does not extend into the level lower cam 27. As a result, the outside portion of the cams 27, 28 can be optimally configured over their entire length so that the entire drive mechanism can be compactly designed with economical components. At each point of the outside portion of the cams, at least one follower is under torque and at least one follower is providing counter support, so that there is always a defined rotational position for the extraction element.

Figure 4:
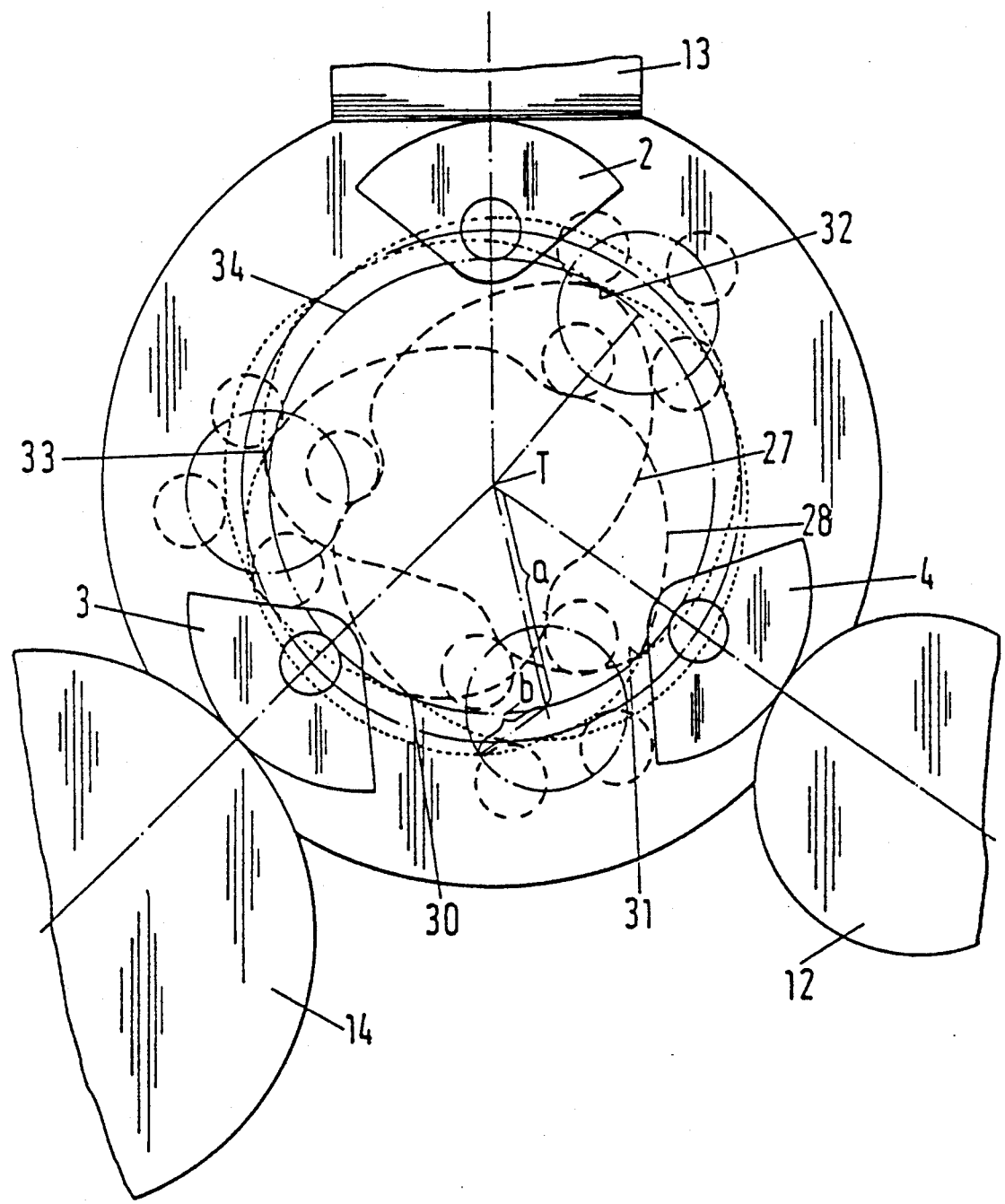
FIGS. 4 through 6 are overhead and smaller scale views of the labelling machine shown in FIG. 1 including specific relationships and features of the invention.
Figure 5:
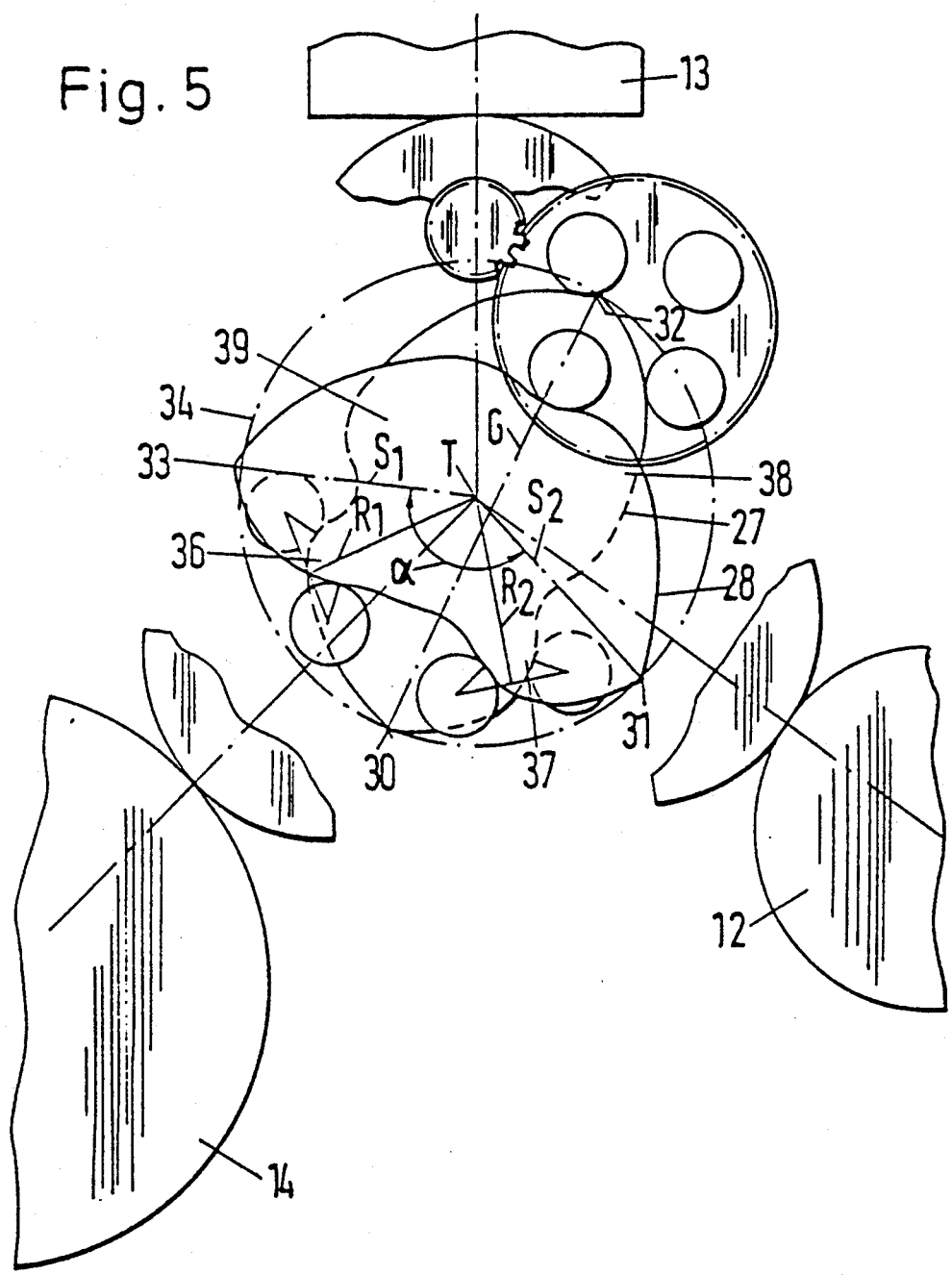
Figure 6:
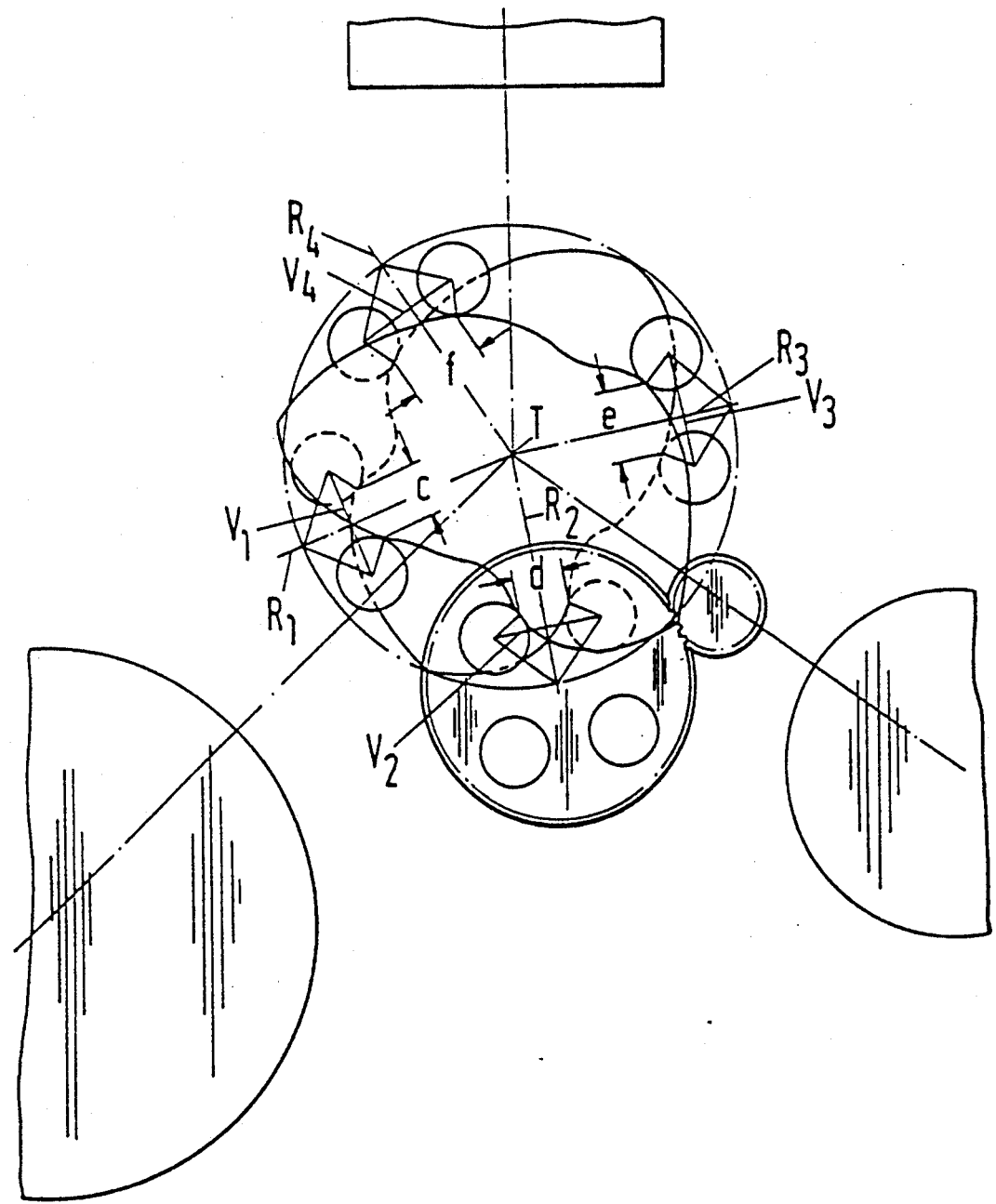

As shown in FIGS. 4-6, the arrangement of the three stations, which include the adhesive roller 12, the label box 13 and the gripper cylinder 14, divides the support 1 into three sectors. In the drawing, these sectors are limited by the dotted lines running through the center of the stations 12, 13, 14. In the sector between the adhesive roller 12 and the gripper cylinder 14 there are two extreme points 30, 31 respectively of the outside regions of the cams 27, 28. In each of the sectors between the adhesive roller 12 and the label box 13, on the one hand, and between the label box 13 and the gripper cylinder, on the other hand, there is always one extreme point 32, 33 of the outside regions of the cams 27, 28. All the extreme points 30, 31, 32, 33 lie practically on the track or path 34 of the mid-point or center of the bearing shaft (not shown) with its support elements for the followers 23, 24, 25, 26 mounted thereon. Only the extreme point 33 lies somewhat outside this track or path 34 of the mid-point or center. The radius a of the track or path 34 of the mid-point preferably has a radius of about 3 to about 1 to the radius b of the orbit of the followers 23, 24, 25, 26. The translation ratio between the pinions 17, 18, 19 and the larger gear wheels 20, 21, 22 engaged therewith is preferably about 1 to about 3.

As also shown in FIGS. 4-6, the extreme points 30, 31, 32, 33 of the outside regions of the cams 27, 28 are determined by the fact that each cam 27, 28 is comprised of two overlapping cams. While the cam segments formed are illustrated in dashed lines, the cam segments which are not formed, and which supplement these formed cam segments are shown in dotted lines. The dotted line represents the path of each of the followers 23, 24 and 25, 26 when the corresponding other followers 24, 23 and 26, 25 are in contact with and guided along a path of the surface of the respective cams 27, 28 represented by the dashed lines.

Figure 7:
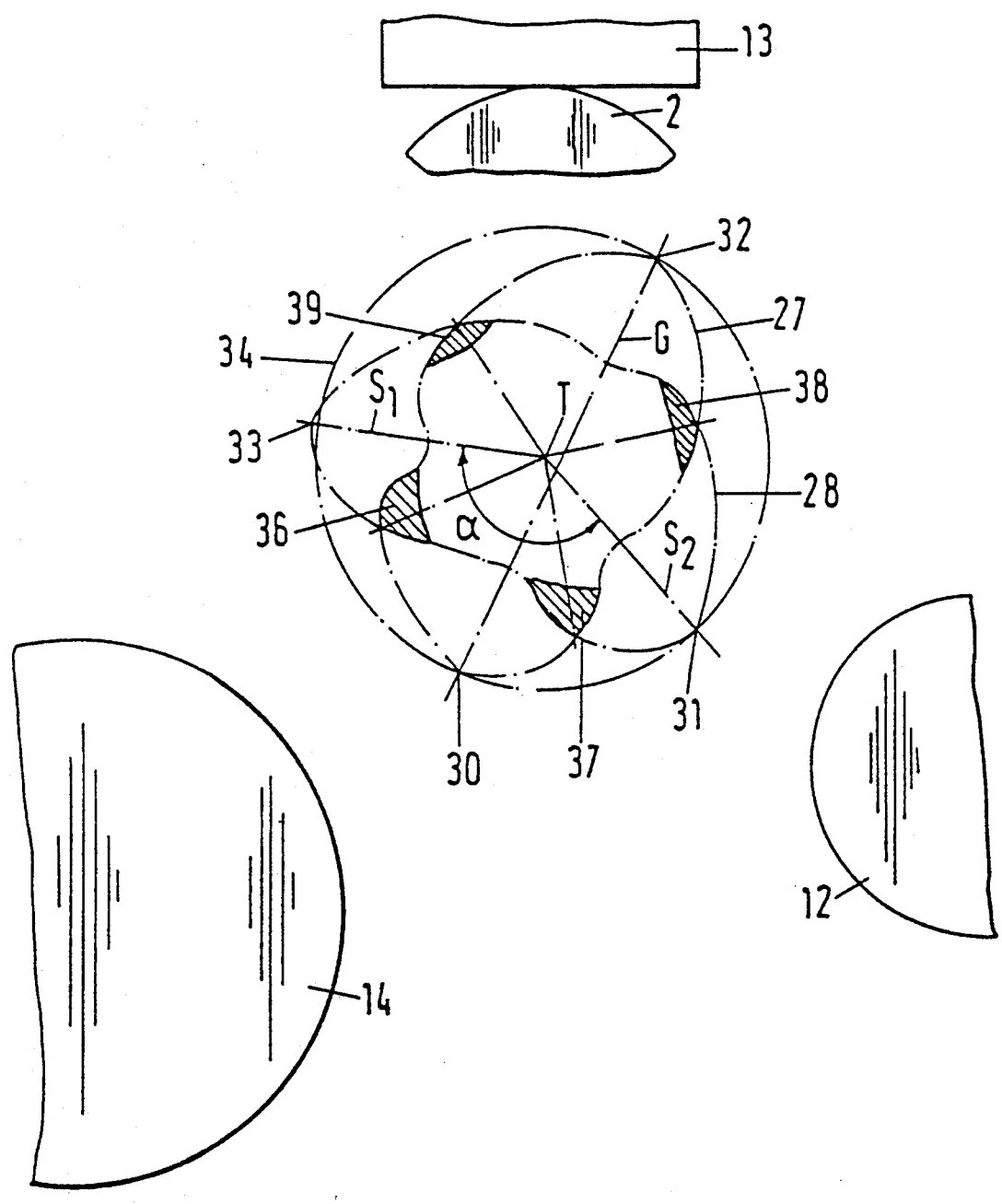
FIG. 7 is a schematic top view of the cams of the labelling machine illustrated in FIG. 1 including the teeth or junctions formed at the overlapping areas of the cams.

FIGS. 5 to 7 show principally the geometric relationships of the two cams 27, 28, which are vertically and rotationally offset from one another with each essentially forming an oval indented on both sides.

FIG. 7 shows principally the teeth or junctions 36 to 38 formed by the two outside curves of the cams 27, 28 in the overlapping area. While the narrower teeth or junctions 36, 37 lie within an obtuse angle $\alpha$, which is bordered by the radial rays or lines $S_1$, $S_2$ emanating from the mid-point T of the support and running through the extreme points 31, 33 of the outside region of the cam 28. The extreme points 30, 3₂ of the outside region of the other cam 27 lie on a straight line G, which runs generally close to or approximately through the mid-point T of the support.

As shown principally by FIG. 6, the followers 23 to 26 of one of the support elements 51 interact with the teeth or junctions 36 to 39 formed in the overlapping area of the two cams 27, 28. There are distances c, d respectively between the contact points of the followers on the flanks of a narrow teeth or junctions 36, 37, when connecting lines $V_2$, $V_2$ running through the mid-points of the followers are perpendicular to the respective radial rays or lines $R_2$, $R_3$ emanating from the support mid-point T and running through the point of the corresponding teeth 36, 37. The distances c, d are 30% to 40% less than the distances e, f of the contact points of the respective followers on the flanks of the wide teeth or junctions 38, 39. Again, the distances e, f are established connecting lines $V_3$, $V_4$ running through the mid-points of the followers is perpendicular to the respective radial rays or lines $R_3$, $R_4$ emanating from the mid-point T of the support and running through the point of the corresponding teeth 38, 39.

FIGS. 5-7 also show that, on one hand, the points of the narrow teeth or junctions 36, 37 and on the other hand, the points of the wide teeth or junctions 38, 39 are respectively at comparable radial distances from the mid-point T of the support. More specifically, the radial distances of the narrower teeth 36, 37 are greater than those of the wide teeth 38, 39.

Figure 10A:
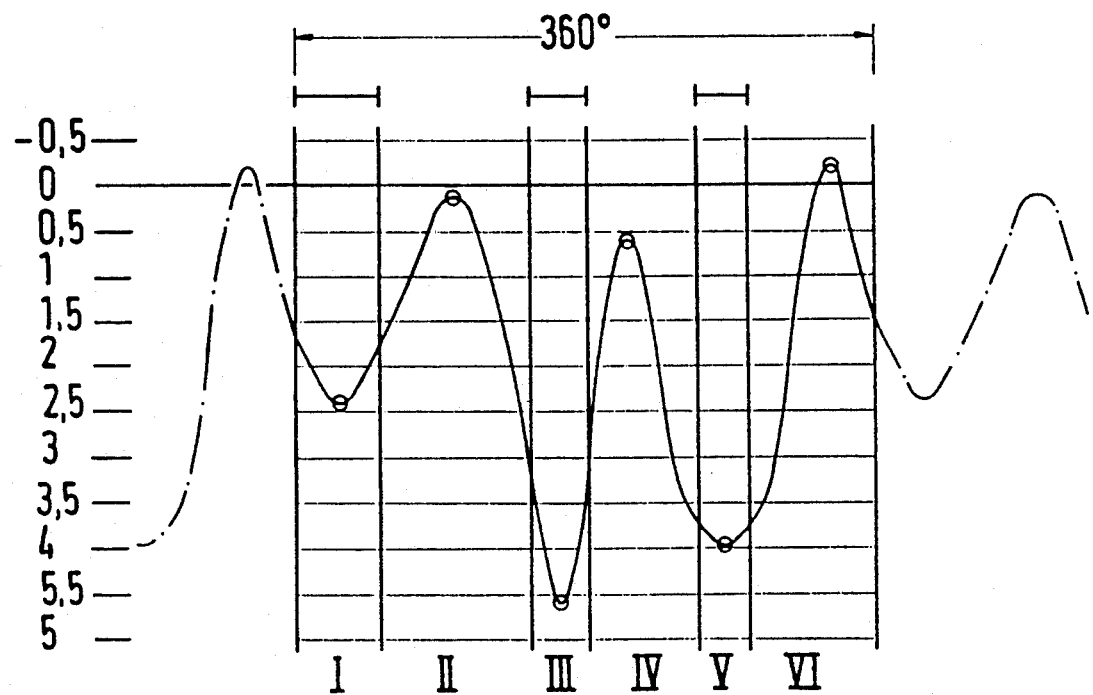
FIG. 10 is a diagram for the angular velocity and angular acceleration of one of the extraction elements of the labelling station illustrated in FIG. 1 including three extracting elements and three transfer regions on the gripper cylinder.
Figure 10B:
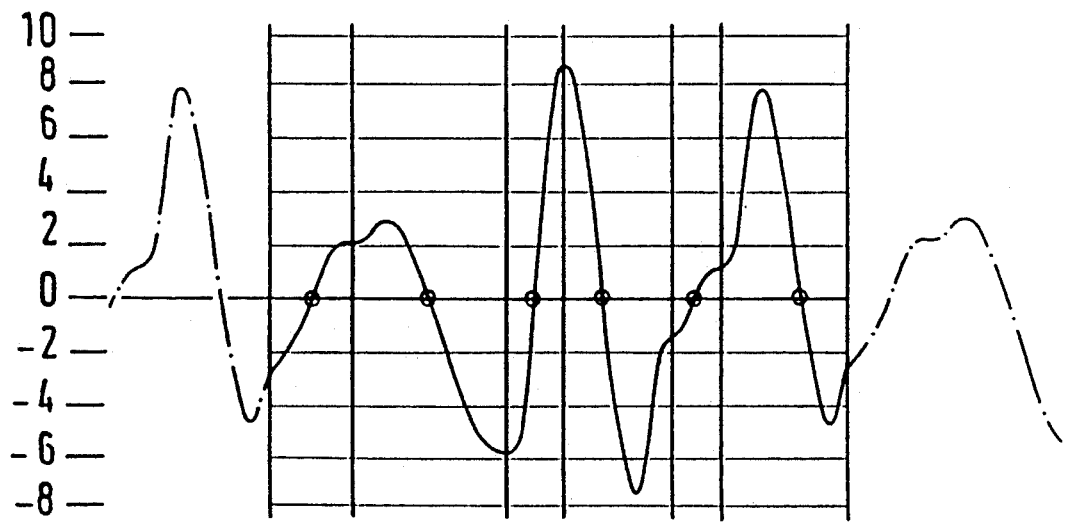

The diagram in the top of FIG. 10 shows the angular velocity of the extracting element and the diagram at the bottom of FIG. 10 shows the angular acceleration of the extracting element during a rotation of the extracting element support by 360 degrees around its circumference. The sectors I, III and V respectively represent the roll-off areas at the label box, the gripper cylinder and the adhesive application roller. The sectors II, IV and VI respectively represent the intervening intermediate areas. The diagram shows that in all the regions, the angular velocity only reaches a maximum in each of the rolling regions I, III and V, and a minimum in each of the intermediate regions II, IV and VI. In the intermediate region VI, the region between the adhesive application roller 12 and the label box 13, the angular velocity even becomes negative, which means that the direction of rotation is briefly reversed. The cams are thereby configured so that the maxima and minima always occur approximately in the central portion of the individual regions so that the movement sequence is optimized. The acceleration diagram shows that in the roll-off regions I and V, where rolling contact takes place in the entire region, the acceleration and thus also the load is significantly less than in the adjacent regions. Only in the vicinity of the gripper cylinder is the acceleration approximately as great as in the adjacent regions. It should be noted that here, the two surfaces do not actually roll along one another over the entire region, but are only following one another.

Figure 8:
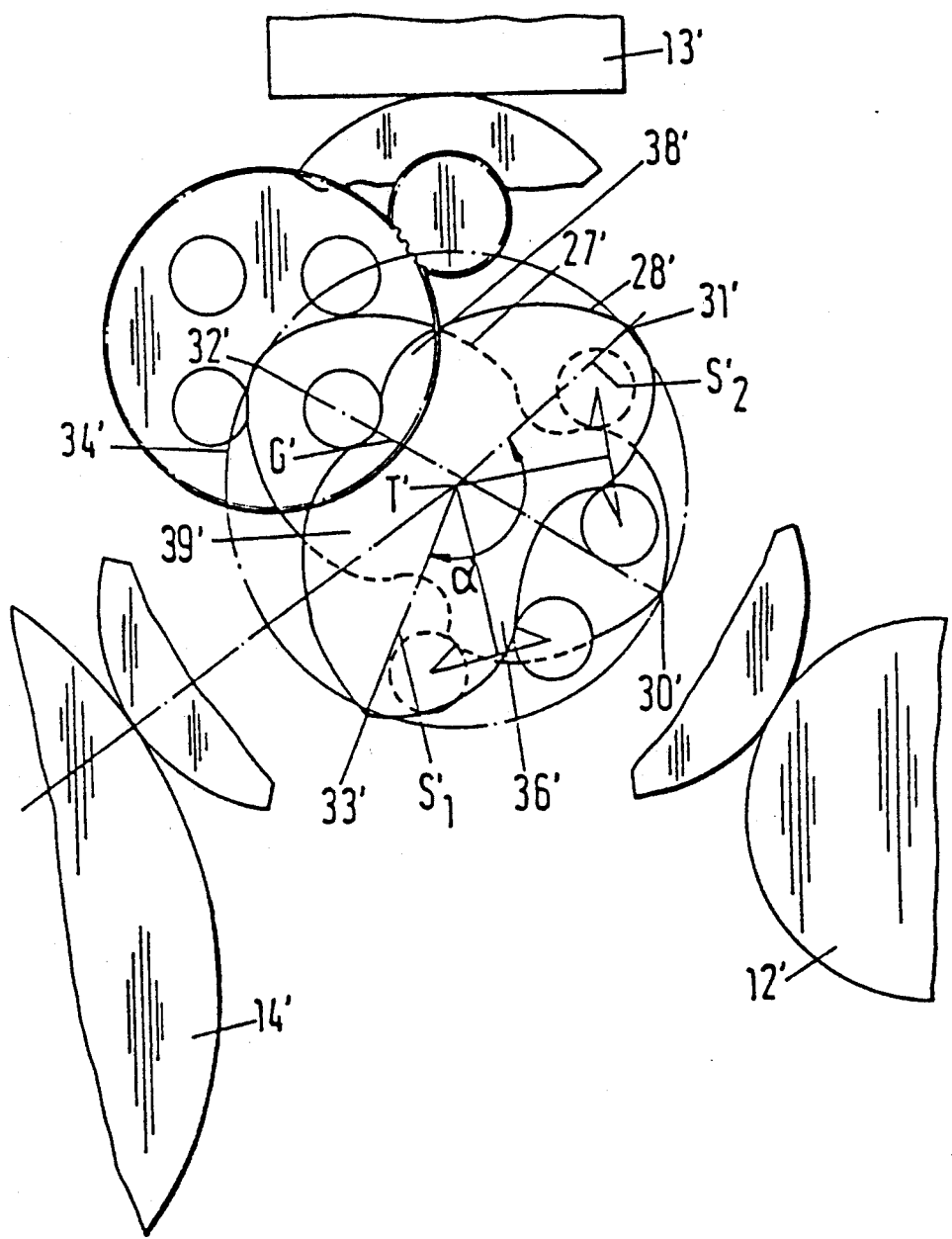
FIG. 8 is a view similar to that of FIG. 5 of an alternative labelling machine.
Figure 9:
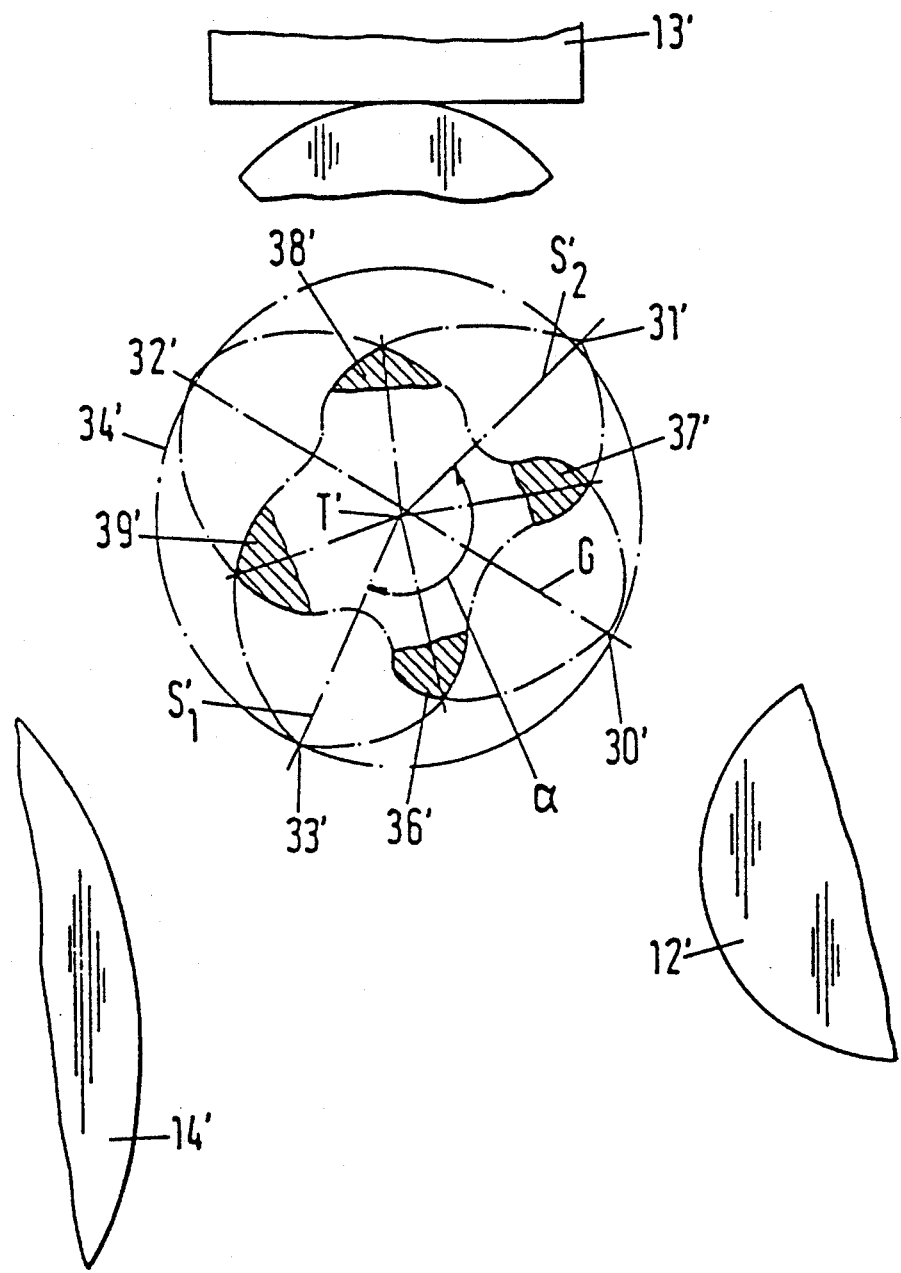
FIG. 9 is a view similar to that of FIG. 7 of cams of the labelling station of FIG. 8 including the teeth or junctions formed at the overlapping of the cams.

The labelling station in accordance with FIGS. 8 and 9 differs from that illustrated in FIGS. 1 to 7 only in that the support element with the followers precedes the extracting element and that the gripper cylinder has a larger diameter. The illustrations in FIGS. 8 and 9 are similar to those in FIGS. 5 and 7 of the labelling station shown in FIG. 1. Since the relationships with regard to the design of the cams 27, 28 are the same in principle, additional explanations in terms of FIGS. 1, 2, 3, 4, 5, 6, 7 and 10 should be unnecessary. The equivalent components of FIGS. 8 and 9 relative to the components of FIGS. 5 and 7 are identified by the same reference numbers plus an apostrophe. Although the specific velocities and accelerations of the extracting elements for the machine of FIGS. 8 and 9 would be different from those shown in FIG. 10 for the machine of FIG. 1, the same rotational principals would still exist.

As generally described above, the preferred labelling machine for objects, such as bottles or the like, includes several stations located behind one another along a track. The stations include an adhesive application apparatus 12, a label feed station 13 and a label transfer station 14. The machine includes at least one extracting element 2, 3, 4 for the labels, mounted so that it can rotate on a rotating support 1 and be moved past the stations 12, 13, 14 during each rotation of the support 1. The extracting element has an outwardly-curved receptacle surface 2', 3', 4' for the label which rolls along the stations 12, 13, 14. The drive for each extracting element 2, 3, 4 is a cam drive, which comprises common, stationary double cam discs 53 for all the extracting elements 2, 3, 4 with cams 27, 28 located in two planes with one above and at some distance from the other. In some embodiments, the two sets of followers 23, 24, 25, 26 may be mounted on each of the drive shafts 6, 7, 8 of the extracting elements 2, 3, 4. Preferably, the two sets of followers 23, 24, 25, 26 are mounted on each of the bearing shafts 50, which is coupled with each of the drive shafts, by means of a support element 51. By means of a form-fit with the two cams 27, 28, the followers produce positive movement of each extracting element 2, 3, 4 over its entire revolution when the support 1 rotates. The labelling machine is characterized by the fact that each bearing shaft 50 ends in front of the plane in which the first cam 28 closer to the shaft 50 lies. The followers 23, 24 which correspond to the other second cam 27 are mounted on a bridge element 52 lying between the two cams 27, 28. The bridge element 52 is supported by spacer elements 25a, 26a on the support element 51. The spacer elements 25a, 26a lie outside the area 56 covered by the relative movement of the first cam 28.

The labelling machine can include the followers 25, 26 of the first cam 28 encompassing the spacer elements 25a, 26a. The two followers 23, 24, 25, 26 which correspond to each set are located opposite one another in relation to the axis of the drive or bearing shaft 50, and the followers 23, 24 of the one set are radially offset by 90 degrees from the followers 25, 26 of the other set. The followers 25, 26 may have pivots 25a, 26a, as the bridge element 52 is supported on its side by the pivots 25a, 26a corresponding to the first cam 28, and on its other side supports the pivots 23a, 24a corresponding to the second cam 27. The followers 23, 24, 25, 26 preferably include rollers 23b, 24b, 25b, 26b which are mounted on the pivots 23a, 24a, 25a, 26a.

The labelling machine may also be characterized by the fact that the double cam disc 53 which has cams 27, 28 is located inside the orbit with the followers 23, 24, 25, 26, and is connected by means of a support bridge 54 located under the followers 23, 24, 25, 26 with the machine frame 55.

Additionally, the support element 51 of the followers 23, 24, 25, 26 may consist of an external body 51a supporting the followers 23, 24, 25, 26 and an internal body 51b connected with it by means of an insert 51c made of elastic damping material. The two bodies 51a, 51b are positively engaged with one another in the vicinity of the insert 51c by means of radially oriented claws. The body 51a supporting the followers 23, 24, 25, 26 may support a drive pinion 20.

Still further, the labelling machine may be characterized by the fact that of the radial extreme points 30, 31, 32, 33 of the outside surfaces of the two cams 27, 28, two extreme points 30, 31 lie in the sector between the gripper cylinder 14 and the adhesive roller 12. The other two extreme points 32, 33 respectively lie in the other two sectors formed between the label transfer station designed as a gripper cylinder 14, the label supply station designed as a label box 11, and the adhesive application apparatus designed as the adhesive roller 10. At least one of the extreme points 30, 31, 32, 33 of the two outside cams 27, 28 may lie outside the path 34 of the mid-point of the support element 51 of the followers 23, 24, 25, 26.

The preferred labelling machine may be characterized by the fact that with a transmission located between the drive shaft 6 of the extracting element 2 and the support element 51, a translation ratio may be about 1 to about 3. When the axis of the drive shaft 6 of the extracting element 2 is outside the path 34 of the mid-point of the support element 51, and the central position of the extracting element is in front of the labelling supply station designed as a label box 11, a pair of followers 23, 24 is engaged by means of both followers 23, 24 with the outside cam 27. The ratio of the radius a of the path of the mid-point 34 of the support element 51 to the radius b of the orbit of the followers 23, 24, 25, 26 on the support element 51 may be about 3 to about 1.

The labelling machine may be further characterized by the fact that the non-load-bearing cam path segments of the cams 27, 28 described by the followers 23, 24, 25, 26 lie for the most part outside the path 35 of the midpoint of the drive shaft 6 of the extracting element 2.

The preferred labelling machine may include the following features:

The extreme points 31, 33 of one of the two outer cams 27, 28 may lie on rays $S_1$, $S_2$ emanating radially outward from the center point T of the support to enclose an obtuse angle $\alpha$ therebetween.

Of the teeth or junctions 36, 37, 38, 39 which are formed in the overlapping areas of the two outer cams 27, 28 and with which simultaneously the followers 23, 24, 25, 26 of both sets interact, the narrower teeth 36, 37 lie inside the obtuse angle $\alpha$.

The obtuse angle $\alpha$ is 120 degrees to 160 degrees, in particular 140 degrees.

The extreme points 30, 32 on the other outside cam 27 lie on a straight line G running near or approximately through the mid-point of the support T.

The distance c, d between the contact points of the followers 23, 24, 25, 26 on the flanks of one of the narrow teeth or junctions 36, 37 formed by the overlapping regions of the two cams 27, 28 is about 30% to about 40% less than the corresponding distance e, f for a corresponding wide tooth or junction 38, 39, when the connecting line running through the mid-point of the followers 23, 24, 25, 26 in contact with the tooth or junction 36, 37 is perpendicular to the radial ray or line $R_1$, $R_2$ emanating from the mid-point T of the support and running through the point of the tooth 36, 37.

The extreme points 30, 31, 32, 33 tend to lie on a circle 34 around the mid-point of the support T.

The points of the teeth 36, 37, 38, 39 formed by the overlapping areas of the outside cams 27, 28 lie inside the circle 34 for the extreme points 30, 31, 32, 33 and are at a different radial distance from the circle or mid-point T of the support.

The radial distances of the peaks of the narrow teeth 36, 37 formed by the overlapping areas of the two outer cams 27, 28 from the mid-point T of the support are substantially equal.

The radial distances between the peaks of the wide teeth 38, 39 formed by the overlapping areas of the two outside cams 27, 28 and the support midpoint T are substantially equal.

The radial distance between the points of the narrow teeth 36, 37 formed by the overlapping areas of the two outside cams 27, 28 is greater than the radial distance of the wide teeth 38, 39.

The labelling station may be further characterized by the fact that, because of the outside curve of the two cams 27, 28, the angular velocity of each individual extracting element 2, 3, 4 in the roll-off area of the stations $1_2$, 13, 14 reaches only a maximum, and in the intermediate areas in between, it reaches only a minimum.

The maxima and minima of the angular velocity always lie approximately in the center of the roll-off area or of the intermediate area. The minimum angular velocity in the intermediate areas is less than one-half the maximum angular velocity in the roll-off areas. The angular velocity is preferably greatest in the vicinity of the gripper cylinder 14. The rotational motion of each individual extracting element 2, 3, 4 is decelerated to at least zero in at least one intermediate region and is then accelerated once again up to the roll-off velocity.

Figure 11:
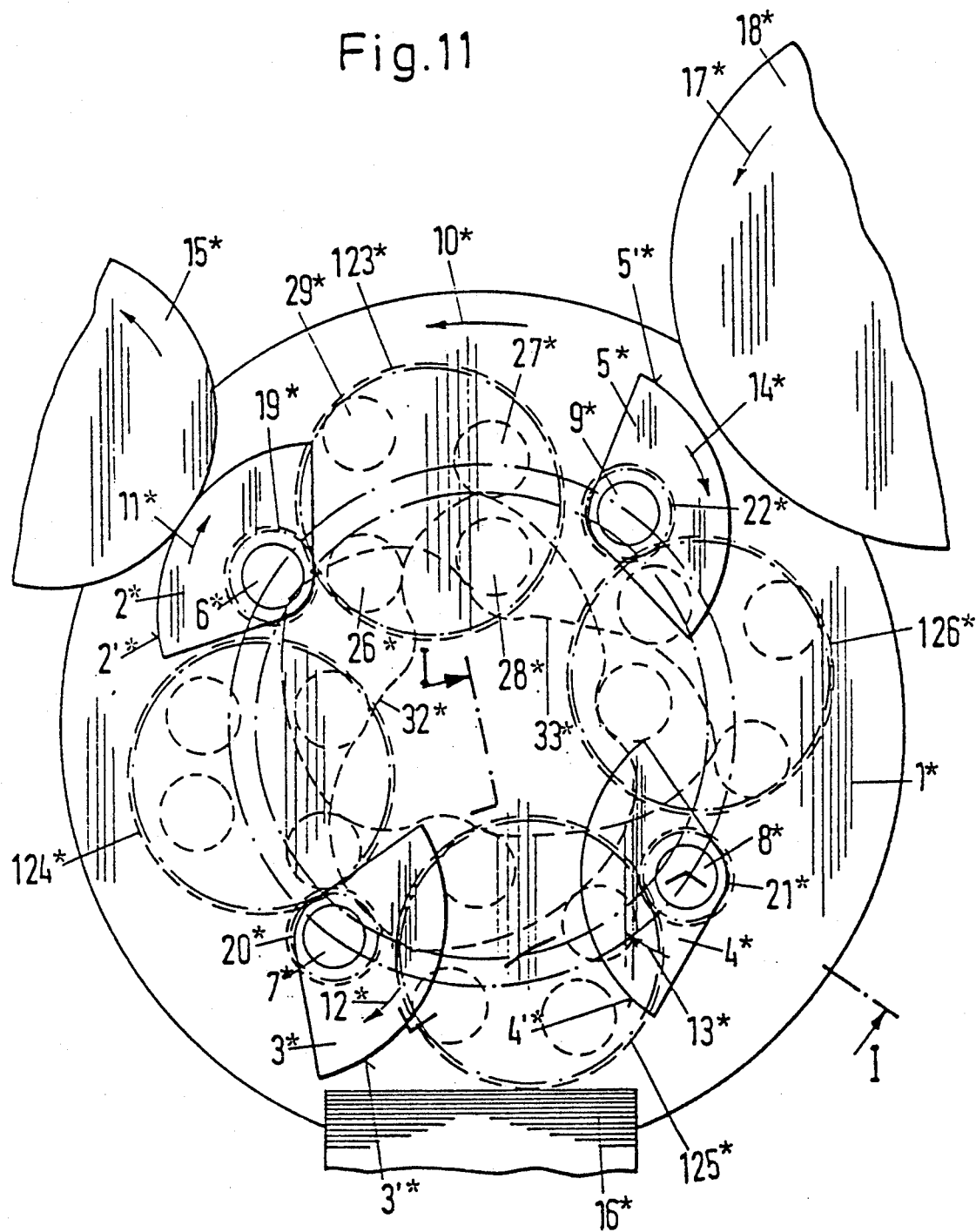
FIG. 11 is a schematic overhead view of another preferred labelling machine.

As generally seen in FIG. 11, the preferred labelling machine comprises a plate-shaped support 1*, on which there are four extracting elements 2*, 3*, 4*, 5* at equal angles to one another. Each extracting element 2*, 3*, 4*, 5* has a cylindrically curved receptacle surface 2'*, 3'*, 4'*, 5'* for a label and is mounted between the surface and the midpoint of its curvature by means of a drive shaft 6*, 7*, 8*, 9* in the support 1*. When the support 1* rotates in the direction of the arrow 10*, the extracting elements 2*, 3*, 4*, 5* are respectively rotated by means of a drive mechanism, as to be described below, in the same direction, in the direction of the arrows 11*, 12*, 13*, 14*, which is in the direction opposite to that of the support 1*.

During the rotation of the support 1, the extracting elements 2*, 3*, 4*, 5* are rolled past various stations including an adhesive application roller 15* rotating in the direction of the arrow as shown thereon, a stationary label box 16* with a stack of labels inside it, and a label transfer cylinder or gripper cylinder 18* rotating in the direction of the arrow 17*. Each extracting element executes a rolling motion as it rolls past the individual stations. Initially, adhesive is applied to the receptacle surfaces 2'*, 3'*, 4'*, 5'* of each extracting element 2*, 3*, 4*, 5* by the adhesive application roller 15*. As the extracting element rolls past the outer label of the stack of labels in the label box 16*, the outer label is extracted from the label stack as a result of the adhesive action of the adhesive on the receptacle surface 2'*, 3'*, 4'*, 5'*. As the support 1* continues to rotate, the extracting element is conducted to the gripper cylinder 18*, which takes the label from the receptacle surface 2'*, 3'*, 4'*, 5'* and for subsequent transfer of the label to objects being moved past the gripper cylinder 15*, such as bottles or the like (not shown).

In order for the receptacle surface 2'*, 3'*, 4'*, 5'* to roll past the variously-configured stations 15*, 16*, 18*, it is necessary to accelerate and decelerate the rotation of each extracting element 2*, 3*, 4*, 5* in the direction of the arrow 11*12*, 13*, 14*. For this purpose, each extracting element 2*, 3*, 4*, 5* is respectively connected by means of a pinion 19*20*, 21*, 22* sitting on its respective drive 6*, 7*, 8*, 9* with a larger gear 123*, 124*, 125*, 126*. Each gear wheel is mounted in the direction of rotation behind its corresponding extracting element 2*, 3*, 4*, 5* by means of a bearing shaft (not shown) in the support 1*.

Each of the larger gear wheels 123*, 124*, 125*, 126* is a cam transmission mechanism. Each of the cam transmission mechanisms has the same design, so that the following description is directed to the cam transmission mechanism corresponding to the extracting element 2* as illustrated in detail in FIG. 12.

On the lower end of the bearing shaft 25* of the cam transmission mechanism for the larger gear wheel 125* mounted in the support 1* is a support element 24* without any relative rotation therebetween. The support element 24* consists of an outside body 24a* and an inside body 24b*. The outside body 24a* has claws or fingers pointing inward, and the inside body 24b* has claws or fingers pointing outward and lying between the claws pointing inward. Between the two bodies 24a* and 24b*, and thus also between the engaged claws or fingers thereof, there is an insert 24c* made of elastic material.

The outer body 24a*, on a radially recessed upper projection thereof, supports the larger gear wheel 125*, which consists of two gear wheels 23a*, 23b* which can be rotated to eliminate any play therebetween them. The wheels 23a* and 23b* are fastened to the outer body 24a* by means of threaded fasteners (not shown).

Figure 12:
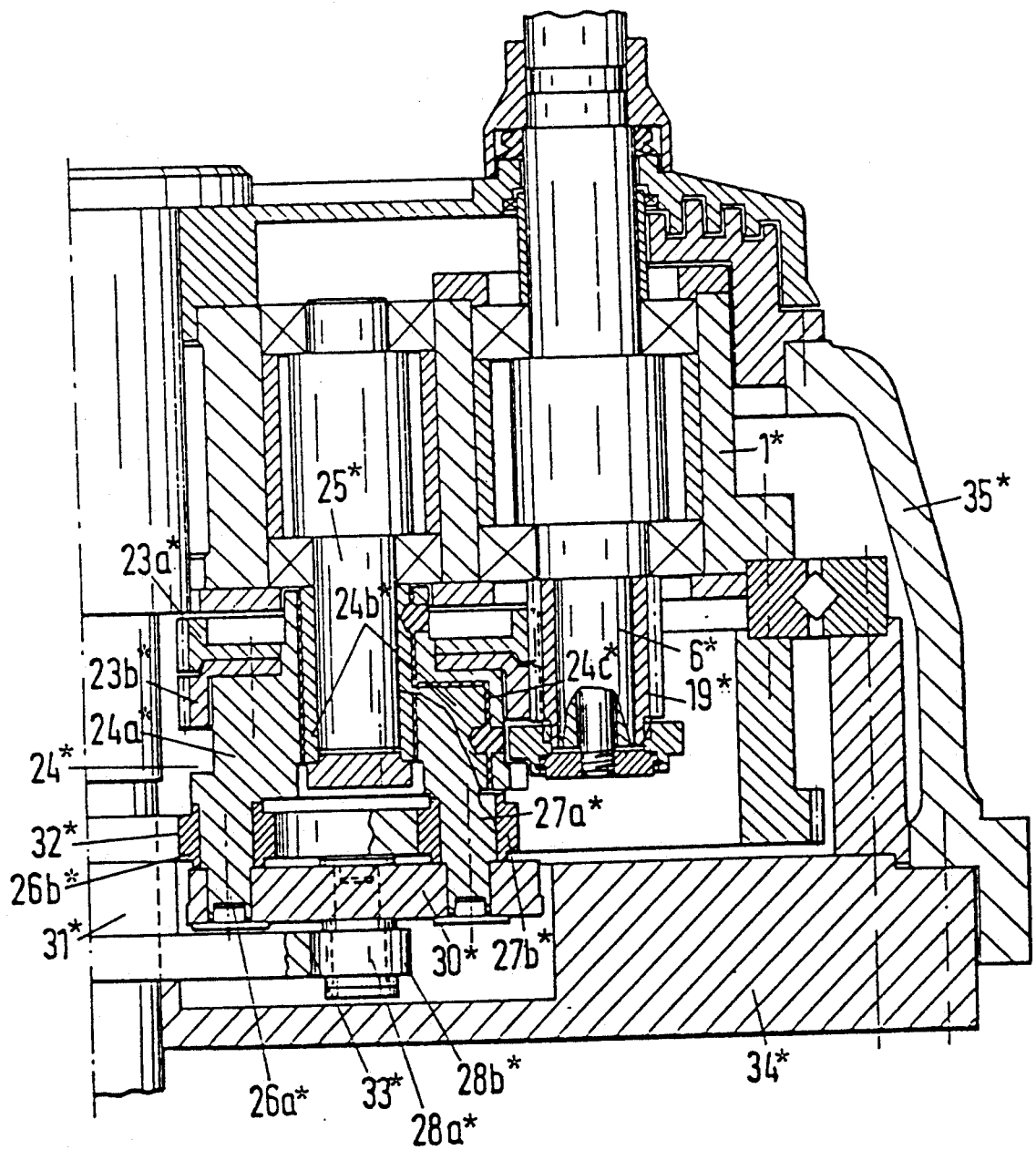
FIG. 12 is a fragmentary cross-sectional view of a preferred cam transmission mechanism of the labelling machine as seen along the line I—I of FIG. 11.

On the underside of the support element 24* are fastened two opposite followers 26*, 27* respectively consisting of a bearing pin 26a*, 27a* and a roller 26b*, 27b* mounted for rotation thereon. The bearing pins 26a*, 27a* are integrally connected to the non-recessed lower part of the support element 24*. As can be seen in FIG. 12, and also in FIG. 11, the roller 26b* with its outer periphery projects beyond the arc of the gear wheel 125*, 23a*, 23b*. With such a geometry, it would not be possible to achieve a sturdy embodiment with a two-piece construction, in which the corresponding bearing pin 26a* would have to be installed in a hole in the support element 24*.

Both of the bearing pins 26a*, 27a*, at the undersides thereof, support a bridge element 30* in the form of a ring, on the under side of which are fastened two opposite followers 28*, 29*. Although only follower 28* is shown, the followers 28*, 29* are offset from the followers 26*, 27*. The follower 28* also consists of a bearing pin 28a* and a roller 28b* mounted for rotation thereon. Each of the followers 26*–29*, as shown in FIG. 11, are offset from adjacent followers by an angle which is between 70 degrees and 110 degrees and is not necessarily equal to 90 degrees. Moreover, the followers 26*–29* are at a different radial distance from the axis of the bearing shaft 25* and, therefore, are engaged by means of different lever arm lengths. In each plane there is one follower with a long lever arm and one follower with a short lever arm. Corresponding to the two sets of followers 26*–29* is a double cam disc 31* with two outside cams 32*, 33* having outside operating surfaces. This double cam disc 31* is rigidly connected by means of a support bridge 34* within the machine frame 35* of the labelling machine. The outside cams 32*, 33* have the basic shape of ovals indented on both long sides, and are oriented crossways to one another.

As shown in FIG. 11 and indicated by a dotted line in FIG. 12, the outside cams 32*, 33* lie with partial segments thereof in the vicinity of the axis of the bearing shaft 25*. Because of the design with the bridge element 30* lying between the outer cams 32*, 33*, a shaft-free space (not shown) has been created in the vicinity of the outside cam 32* in the center between the followers 26*, 27*. Of course, the bearing shaft 25* does not extend into the vicinity of the lower outside cam 33*. As a result, the outside cams 32*33* can be optimally and economically configured over their entire length into compact components. At each point of the outside curves of the cams 32*, 33*, there is at least one follower transmitting torque and at least one follower providing support from the other side, so that there is always a defined rotational position for the corresponding extracting element.

Figure 13:
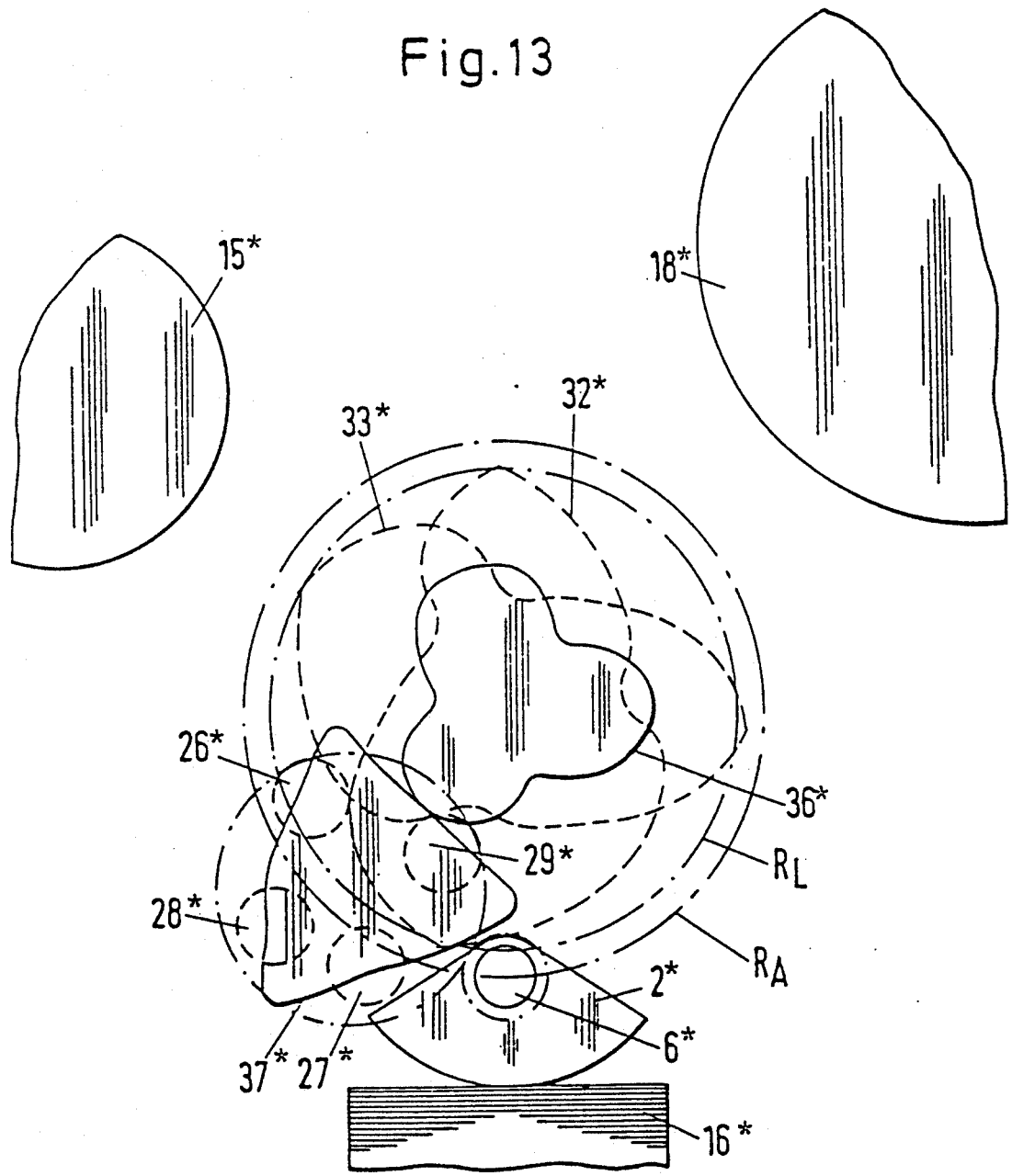
FIG. 13 is a schematic overhead view, on a smaller scale, of the labelling machine illustrated in FIG. 11, with the outside cams shown raised.

FIG. 13 shows, by way of example for a cam transmission mechanism, a fixed equivalent cam surface 36* and the corresponding moving equivalent cam surface 37*. The fixed equivalent cam surface 36* and the moving equivalent cam surface 37* represent cams in which there would be relative rolling contact on a point by point basis between the two cam surfaces thereof. The fixed equivalent cam surface 36* has the same axis as and represents the cams 32*, 33* while the moving equivalent cam surface 37* has the same axis as and represents the same motion about the axis as the followers 26*–29*. As a result, the fixed equivalent cam surface 36* and the moving equivalent cam surface 37* would follow the same relative motions as the cam transmission realized with the two outside cams 32*, 33* and the corresponding followers 26*–29*. In other words, the center axis of both the followers 26*–29* equivalent cam surface 37* would evolve about the center of the cams 32*, 33* or the fixed equivalent cam surface 36* at the same rate. Further, the changing relative rotation about the center axis of the followers 26*–29* and the moving equivalent cam surface 37* would be identical in either case.

As seen in FIG. 13, the axes of all the followers 26*–29* lie within the movable equivalent cam surface 37*, while portions of their periphery outer surfaces remain outside the movable equivalent cam surface. FIG. 13 also shows that the orbit $R_L$ of the bearing shaft 25* lies inside the orbit $R_A$ of the drive shaft 6* of the extracting element. This geometry also contributes to the compact structure.

Figure 14:
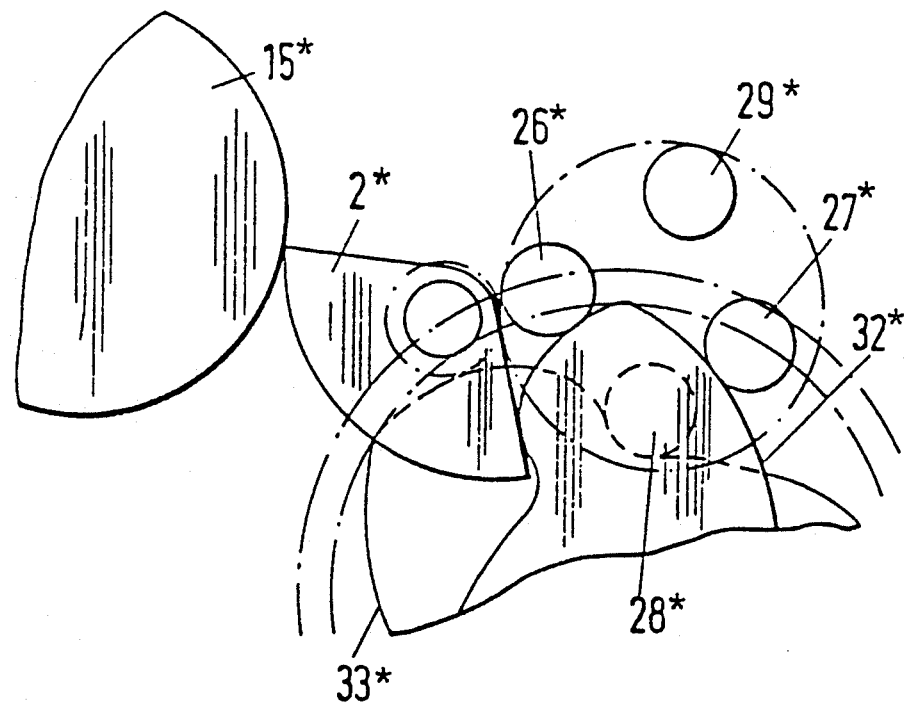
FIGS. 14 and 15 are schematic, fragmentary views of the labelling machine shown in FIG. 11 in two phases of the rolling of an extracting element past an adhesive application roller.
Figure 15:
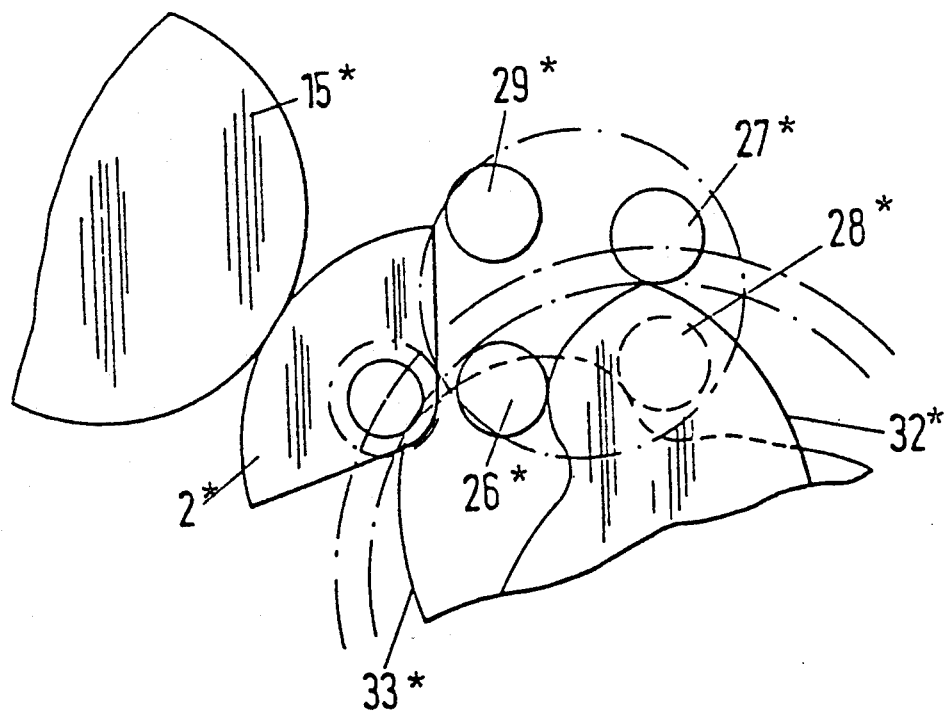

FIGS. 14 and 15 show the engagement of the followers when one of the extracting elements 2* is being aligned with the adhesive application roller 15*. At the beginning of the rolling sequence shown therein, the two followers 27*, 28* are engaged and transmitting torque, and the follower 26*, with a long lever arm, provides support from the other side. In this initial phase, which is particularly important for the application of the adhesive, there is an optimal guidance as a result of the double engagement of the two followers with short lever arms and the supporting follower with a long lever arm. In the rest of the rolling sequence, where the requirements for the guidance of the extracting element 2* are no longer as critical, the engagement of one of the followers with a short lever arm can be eliminated. The instant just prior to the loss of engagement with follower 27* is depicted in FIG. 15.

Figure 16:
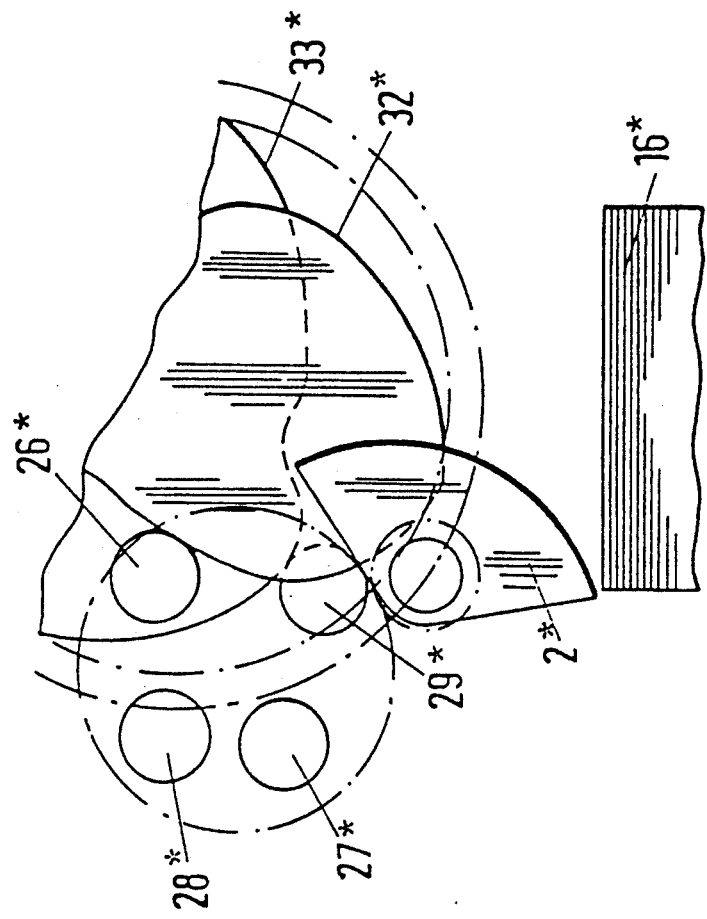
FIGS. 16 and 17 are schematic, fragmentary views of the labelling machine shown in FIG. 11 in two phases of the rolling of an extracting element past a label box.
Figure 17:
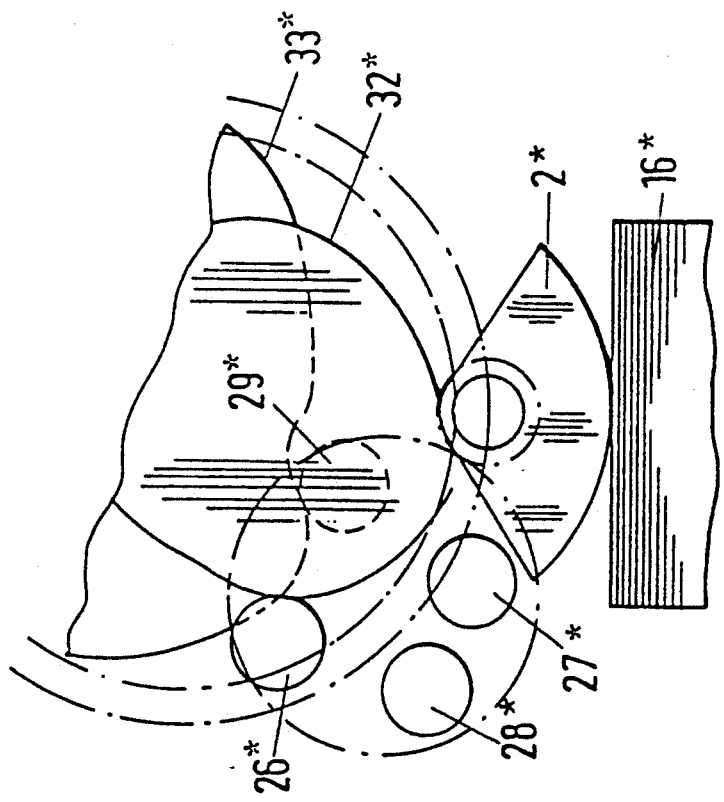

In the vicinity of the label box 16*, as seen in FIGS. 16 and 17, the two followers 26*, 29* with a large lever arm are shown in the engaged state. From the beginning of the rolling sequence until at least the middle, the follower 26* closest to the bearing shaft transmits torque, while the follower 29* provides support from the other side. Because of the proximity of the follower 26* with a long lever arm to the bearing point, the result is also a very precise guidance.

Figure 18:
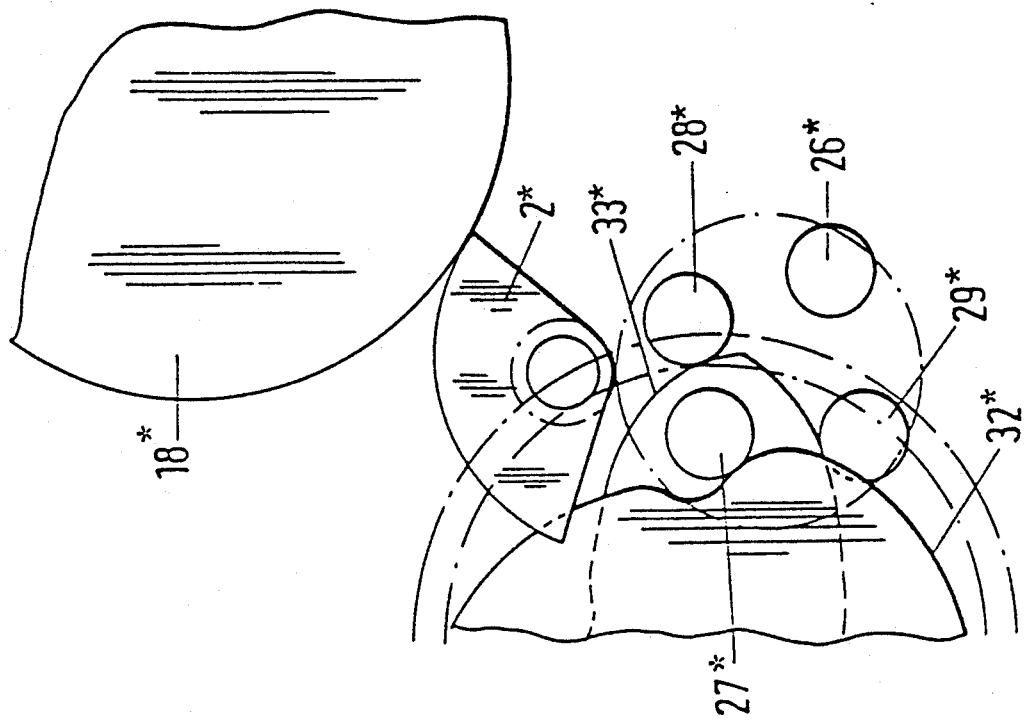
FIGS. 18 and 19 are schematic, fragmentary views of the labelling machine shown in FIG. 11 in two phases of the rolling of an extracting element past the gripper cylinder.
Figure 19:
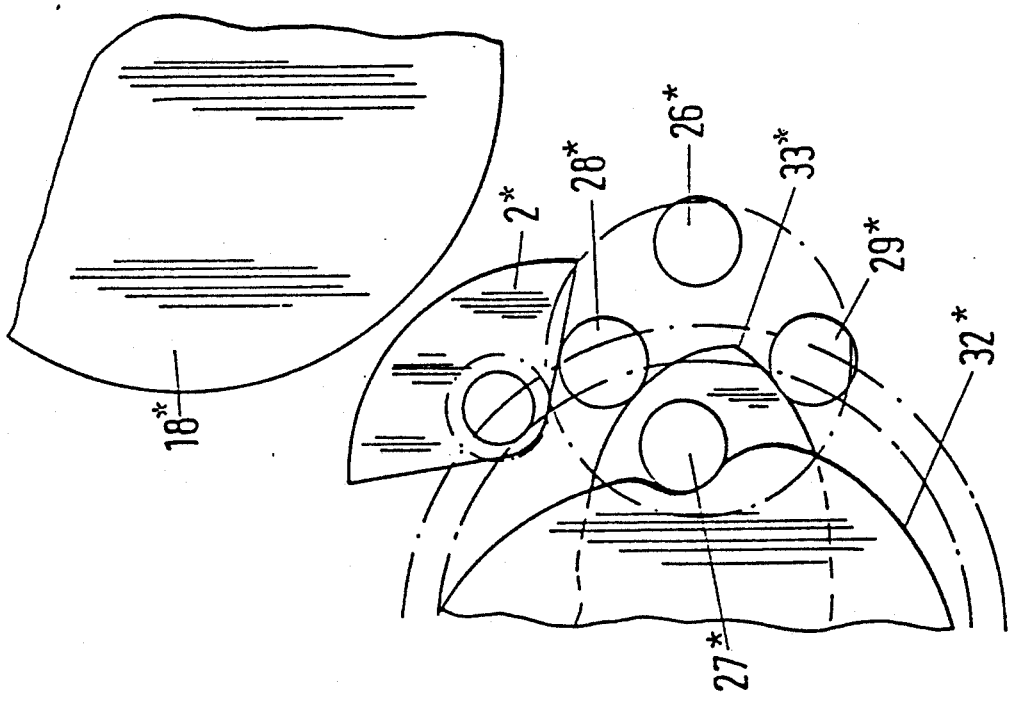

Of all the stations 15*, 16*, 18*, at the station of the gripper cylinder 18*, the guidance of the extracting element 2* is at its least critical at the beginning of the rolling sequence. Accordingly, as seen in FIG. 18, the follower 29* with a long lever arm, the one which is the farthest from the bearing shaft 25*, transmits torque. However, this guidance, which is not as optimal when compared to the torque-transmitting followers on the other stations, is altogether sufficient. During initial alignment for gripping the label from the extracting element 2* and for some portion of the rotation beyond the initial alignment, as seen in FIG. 19, the two followers 27*, 28* with short lever arms act to provide support from the other side for the follower 29*.

As generally described above, the preferred labelling machine of FIGS. 11 through 19 for objects, such as bottles or the like, with several stations located behind one another along a track. The stations include an adhesive application roller 15*, a label box 16* and a label transfer cylinder 18*. The machine includes at least one extracting element 2*, 3*, 4*, 5* for the labels, mounted so that it can rotate on a rotating support 1* and be moved at a different angular velocity past the stations 15*, 16*, 18* each rotation of the support 1*. The extracting element has an outwardly-curved receptacle surface 2', 3', 4', 5' for the label which rolls along the stations 15*, 16*, 18*. The drive for each extracting element 2*, 3*, 4*, 5* is a cam drive mechanism, which comprises common, stationary double cam discs 31* for all the extracting elements 2*, 3*, 4*, 5* with cams 32*, 33* located in two planes with one above the other. Two sets of two followers 26*, 27*, 28*, 29*, which are angularly offset from one another and are mounted on each of the drive shafts 6*, 7*, 8*, 9* or on a bearing shaft 25* coupled with each of the drive shafts by means of a support element 24*. By means of a form-fit with the two cams 32*, 33*, the followers produce positive movement of each extracting element 2*, 3*, 4*, 5* over its entire revolution when the support 1* rotates. The labelling machine is characterized by the fact that the axes of all the followers 26*, 27*, 28*, 29* is located inside a moving equivalent cam surface of the cam mechanism while at least one of the followers 26*, 29* lies partly outside the moving equivalent cam surface. The labelling machine portions of all of the followers 26*, 27*, 28*, 29* lying partly outside the moving equivalent cam surface. At least some of the followers 26*, 27*, 28*, 29* may be offset from one another by an angle which is not equal to 90 degrees and have lever arms of different lengths.

Preferably, either two followers 26*, 29* include large lever arms, or two followers 27*, 28* include small lever arms with one follower 26*, 29* having a large lever arm for engagement with the cams 32*, 33*.

The labelling machine is preferably characterized by the following engagement alternatives:

a) With the adhesive application roller 15*, two followers 27*, 28* with small lever arms are engaged for transmitting torque, and one follower 26* with a large lever arm supporting from the other side.

b) With the label box 16*, one follower 26* with a large lever arm is engaged for transmitting torque, and one follower 29* with a large lever arm for supporting from the other side.

c) With the label transmission cylinder 18*, one follower 29* with a large lever arm is engaged for transmitting torque, and two followers 27*, 28* with small lever arms for supporting from the other side.

The labelling machine may be characterized by the fact that the follower 26* transmitting torque to the label box 16* corresponds to the cam 32* closer to the drive or bearing shaft 25*. Additionally, each set of followers 26*-29* comprises one follower 26*, 29* with a large lever arm and an opposite follower 27*, 28* with a small lever arm.

The labelling machine is further characterized by the fact that the orbit $R_A$ of the drive shaft 6* of the extracting element 2* the orbit $R_L$ of the bearing shaft 25* of the extracting element 2*. Still further, when the transmission mechanism 19*-26* lies between the drive shaft 6* and the bearing shaft 25*, at least one follower 26* with a large lever arm is tangent to or projects beyond the arc of the gear wheel 123*, 23a*, 23b* located on the bearing shaft 25*. Finally, the followers 26*, 27* can consist of rollers 26b*, 27b* mounted on bearing pins 26a*, 27a*, whereby the bearing pins 26a*, 27a* located closest to the bearing shaft 25* are connected integrally with the support element 24*, which supports the gear wheel 123*, 23a*, 23b* on a radially recessed projection thereof.

Figure 20:
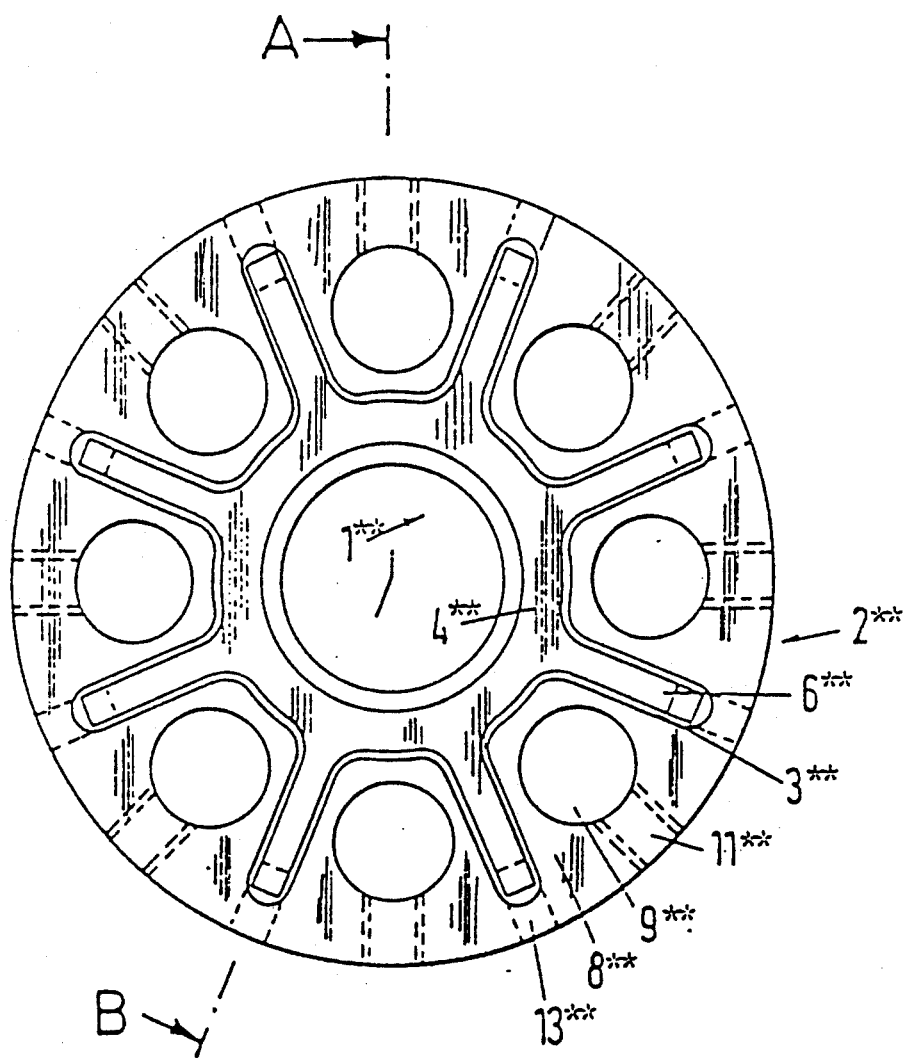
FIG. 20 is an end view of a support element for the followers of a cam drive designed as a lantern gear mechanism.
Figure 21:
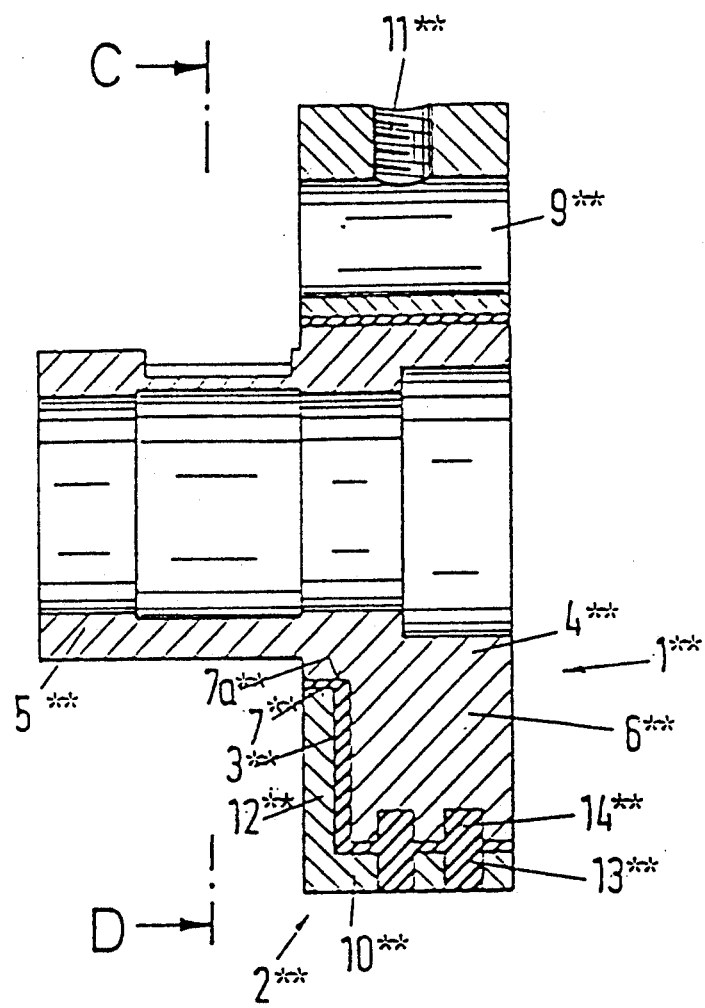
FIG. 21 is a cross-section of the support element of FIG. 20 taken along line A—B.
Figure 22:
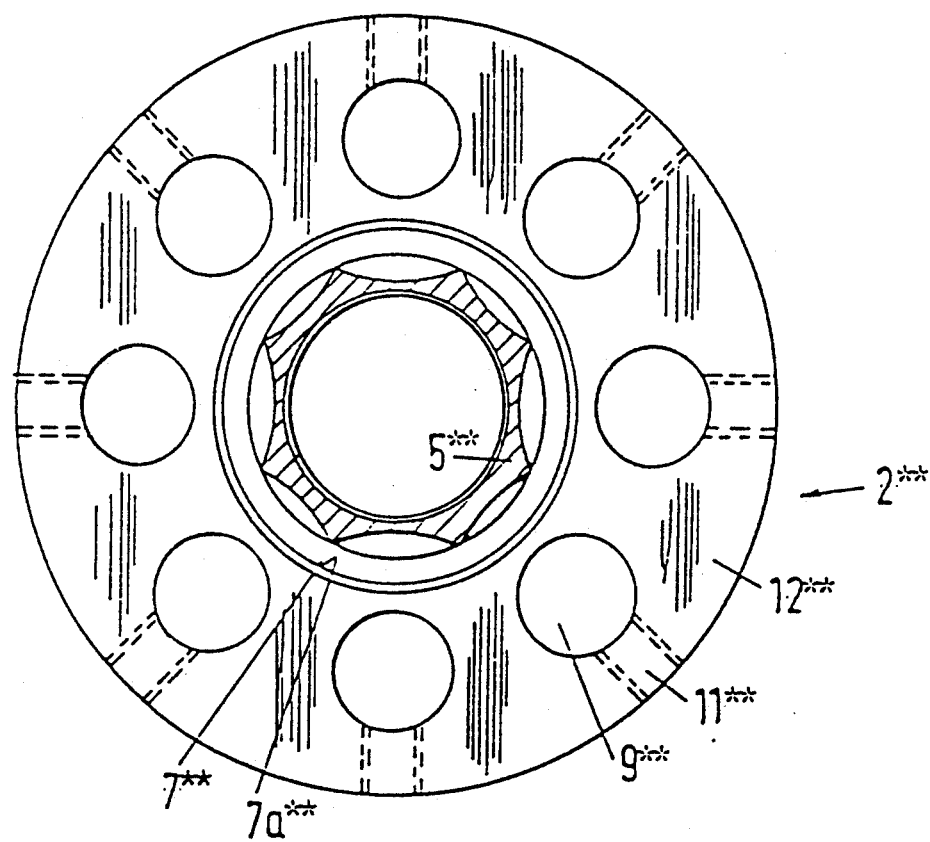
FIG. 22 is a cross-section of the support element of FIG. 21 taken along line C—D.

The support element illustrated in FIGS. 20 through 22 includes an inside body 1 and an outside body 2, which are not in direct contact with one another. Insert 3, made of elastic material, is positioned in the space between bodies 1 and 2**.

Inside body 1 is designed to be fastened on a drive shaft of an extracting element for labels. For this purpose, it has a middle part 4 and a sleeve 5 attached to one end. Middle part 4 supports a number of claws 6 directed radially outwardly along the circumference. The width of the claws 6 is significantly less than the distance between claws 6**.

Outer body 2 has the basic shape of a basin with central opening 7, through which middle part 4 projects by means sleeve 5. Outer body 2 has radially inwardly-directed claws 8, which lie between claws 6 of inner body 1. In each of inner claws 8 there is hole 9, which is used to hold the bearing pivot of a cam follower. A threaded fastener (not shown) is provided for insertion within radially threaded hole 11 in the outer wall 10 of the basin-shaped outer body 2 to axially secure the bearing pivot inserted in hole 9. End wall 12, which covers the spaces between claws 8 is positioned on the end side adjacent to outer body 2**.

There is a space on all sides between inner and outer bodies 1 and 2. The space is between the engaged claws 6 and 8 between end wall 12 and the end side of claw 6 facing it and between the inner annular surface of central opening 7 in outer body 2 and outer annular surface 7a of inner body 1. This space is filled by elastic insert 3, which is relatively thin. The result is contact and support over a large area, which can absorb the forces which occur in all axes without danger of overloading, while maintaining the damping action. For axial protection, radial holes 13 and blind holes 14 are positioned in the vicinity of claws 6. Holes 13 and 14 are axially aligned with one another in pairs and are filled by the elastic material of insert 3. The elastic material of insert 3 is installed jointly with the material for radial holes 13 and blind holes 14 by injection.

Figure 23:
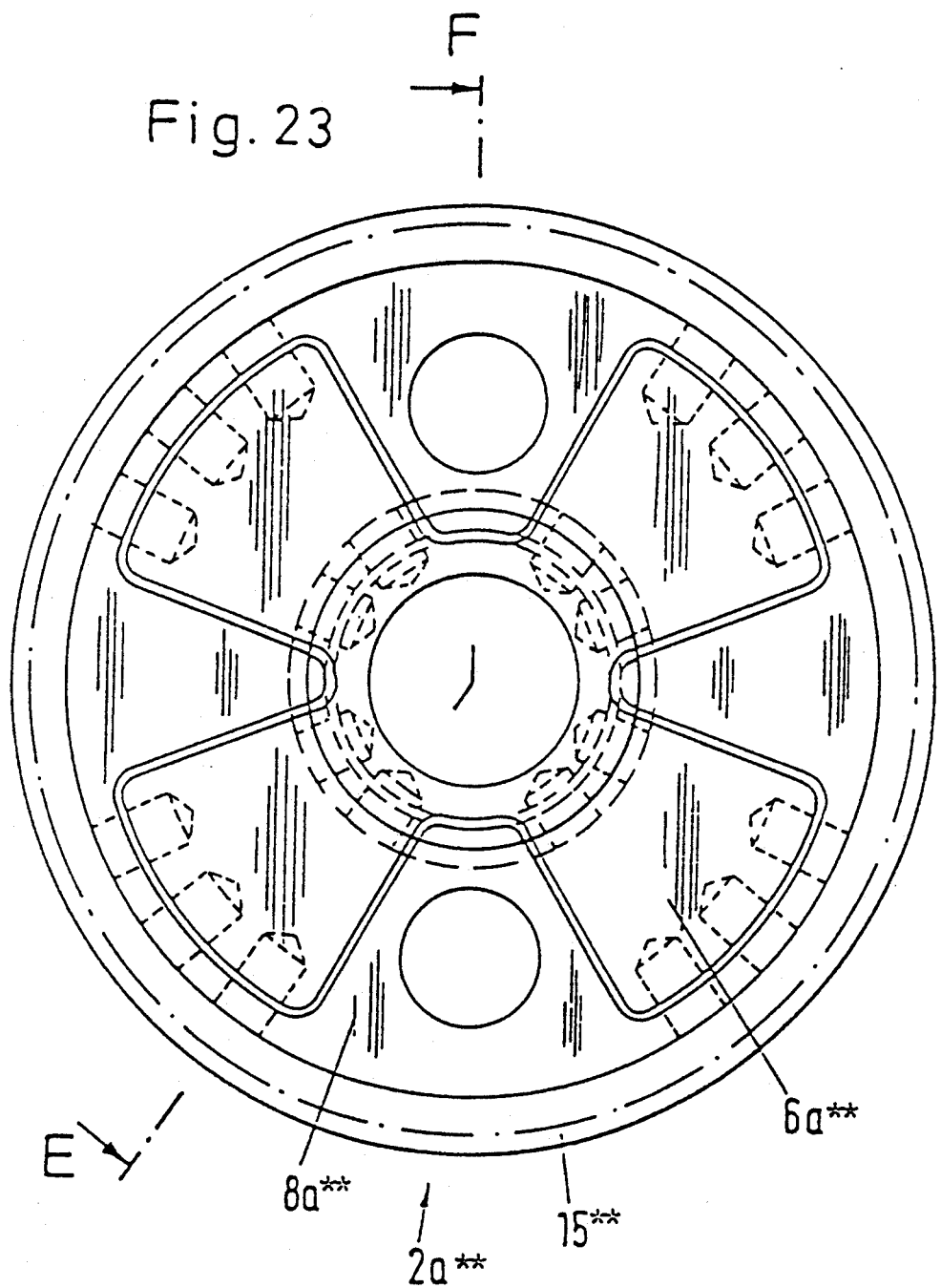
FIG. 23 is an end view of a different support element for followers of a conventional cam drive mechanism.
Figure 24:
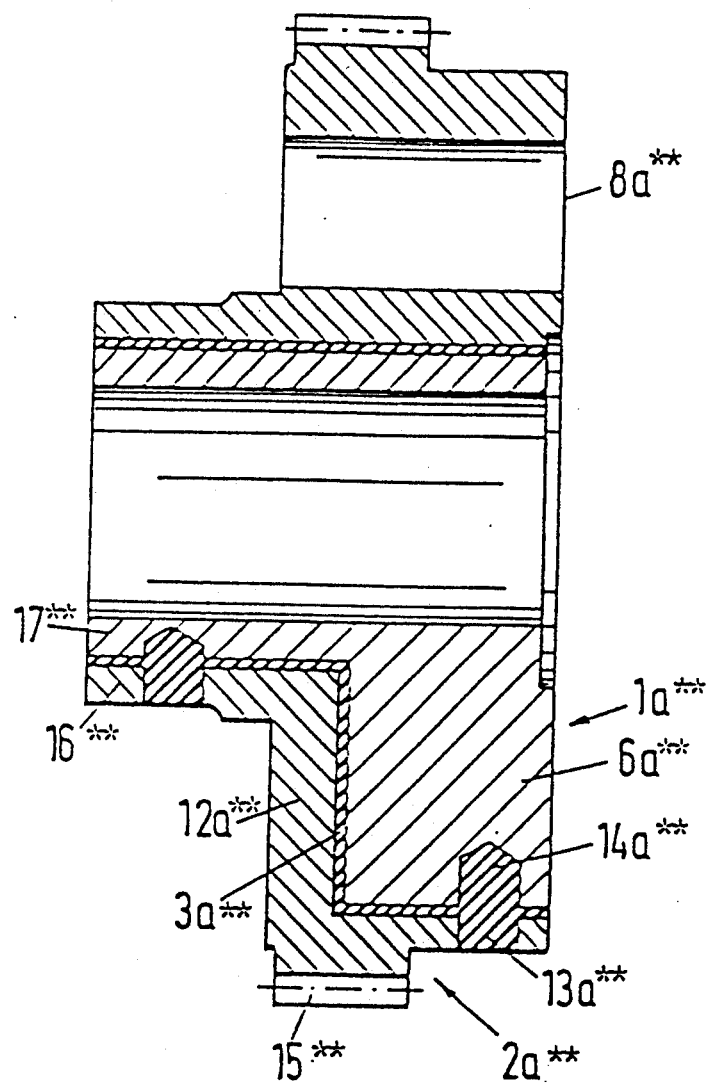
FIG. 24 is a cross-section of the support element of FIG. 23 taken along line E—F.

The support element illustrated in FIGS. 23 and 24 has essentially the same structure as the support element illustrated in FIGS. 20 through 22. Therefore, the following description, primarily, discusses the differences between them.

In the embodiment depicted in FIGS. 23 and 24 only two diametrically opposite claws 8a of the outer body 2a are provided for the insertion of cam followers. The number of inwardly directed claws 8a and outwardly directed claws 6a engaged with one another is therefore reduced to four. Moreover, outer body 2a has gear teeth on its periphery, so that the support element can also serve as a drive pinion. Finally, the coaxial annular surfaces above one another of outer body 2a and of inner body 1a are formed by coaxially overlapping sleeve-shaped projections 16 and 17 of the outer and inner bodies. Compared to the inner annular surface in the embodiment illustrated in FIGS. 20 and 22, the annular surfaces of the embodiment of FIGS. 23 and 24 are significantly larger, which increases the angular rigidity of both bodies 1a and 2a**.

FIGS. 25 through 28 show a labelling station which may employ either of the support element described above. The labelling station includes a driven, rotating support 21, with extracting elements 22 through 25 mounted on it so that they can pivot or rotate and stations positioned along the circumference of support 21. These stations are adhesive application roller 26, label box 27 and gripper cylinder 28. Extracting elements through 22 through 25 are driven by a cam transmission mechanism when support 21 rotates thereby rolling elements 22 through 25 over the surfaces of stations 26 through 28.

Each extracting element is mounted by means of bearing shaft 29 on support 21. Pinion 30 is on bearing shaft 29 and is engaged with two-part gear wheel 15 and 15a. The two-part design is intended to offset the two parts, somewhat, from one another resulting in an adjustment of the engagement which is free from play. Support element 2a, which includes two-part gear wheel 15 and 15, is rotationally connected to drive shaft 31 which, in turn, is mounted on support 1**.

Figure 25:
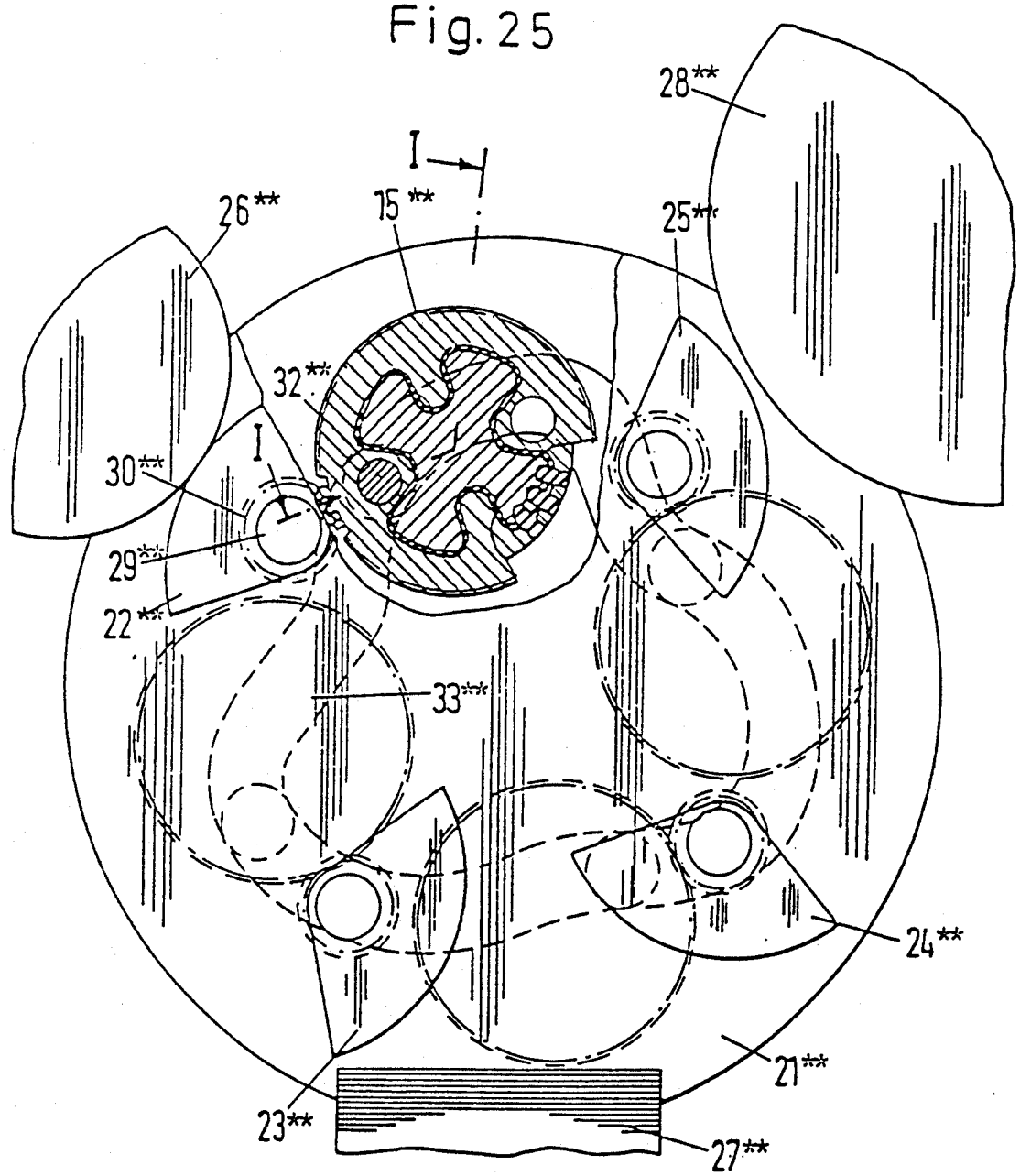
FIG. 25 is a top view of a labelling station with a follower guided in a grooved cam.
Figure 26:
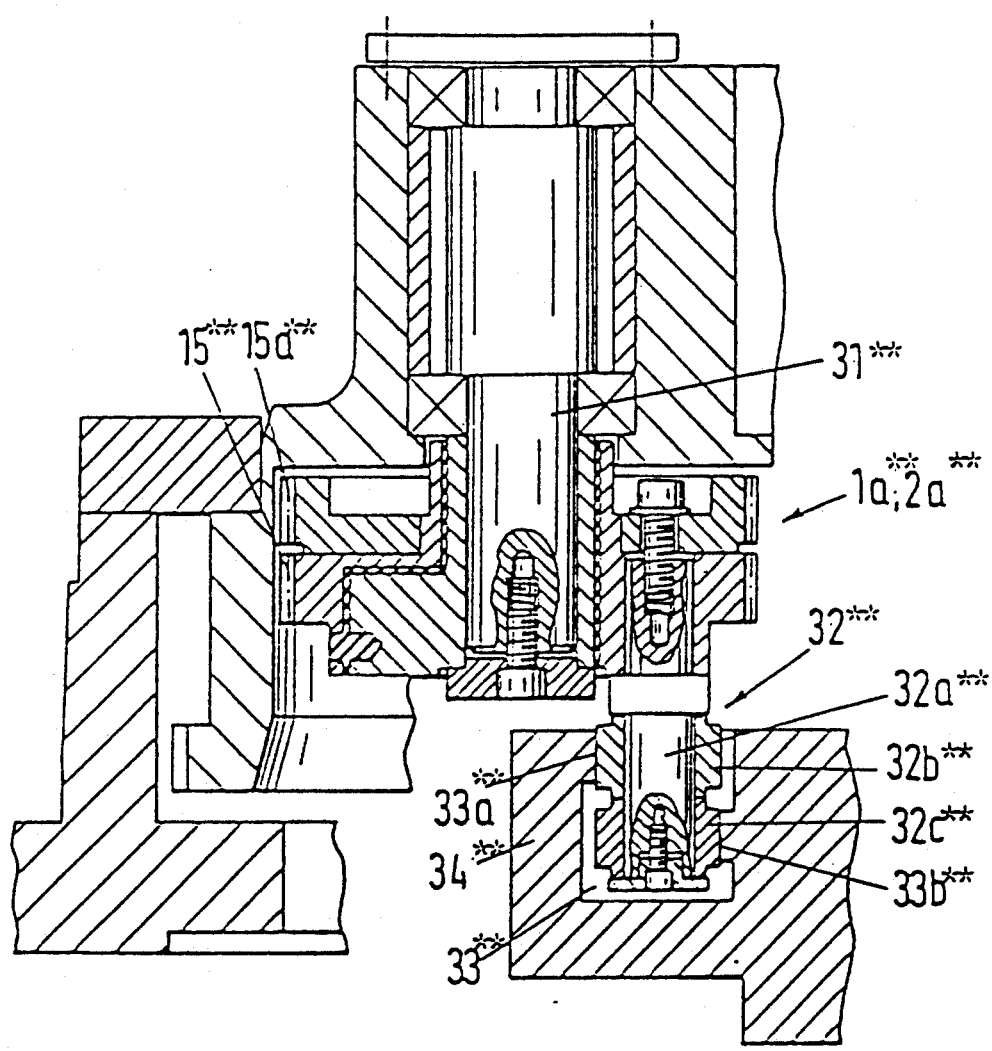
FIG. 26 is a cross-section of the labelling machine of FIG. 25 taken along line I—I.

In the embodiment illustrated in FIGS. 25 and 26, the support element is equipped with single follower 32, which includes bearing pivot 32a which supports rollers 32b and 32c. Follower 32 is engaged in grooved cam 33 of stationary cam support 34. Rollers 32b and 32c are unilaterally guided on opposite flanks 33a and 33b**.

When support 21 rotates, the support element and thus also extracting element 22 is pivoted corresponding to the path of grooved cam 33, so that it rolls over the surfaces of the individual stations 26 through 28. This causes element 22, sequentially, to receive glue from application roller 26, apply the adhesive to the top label in label box 27, remove the top label from box 27 and transfer the label to gripper cylinder 28.

Figure 27:
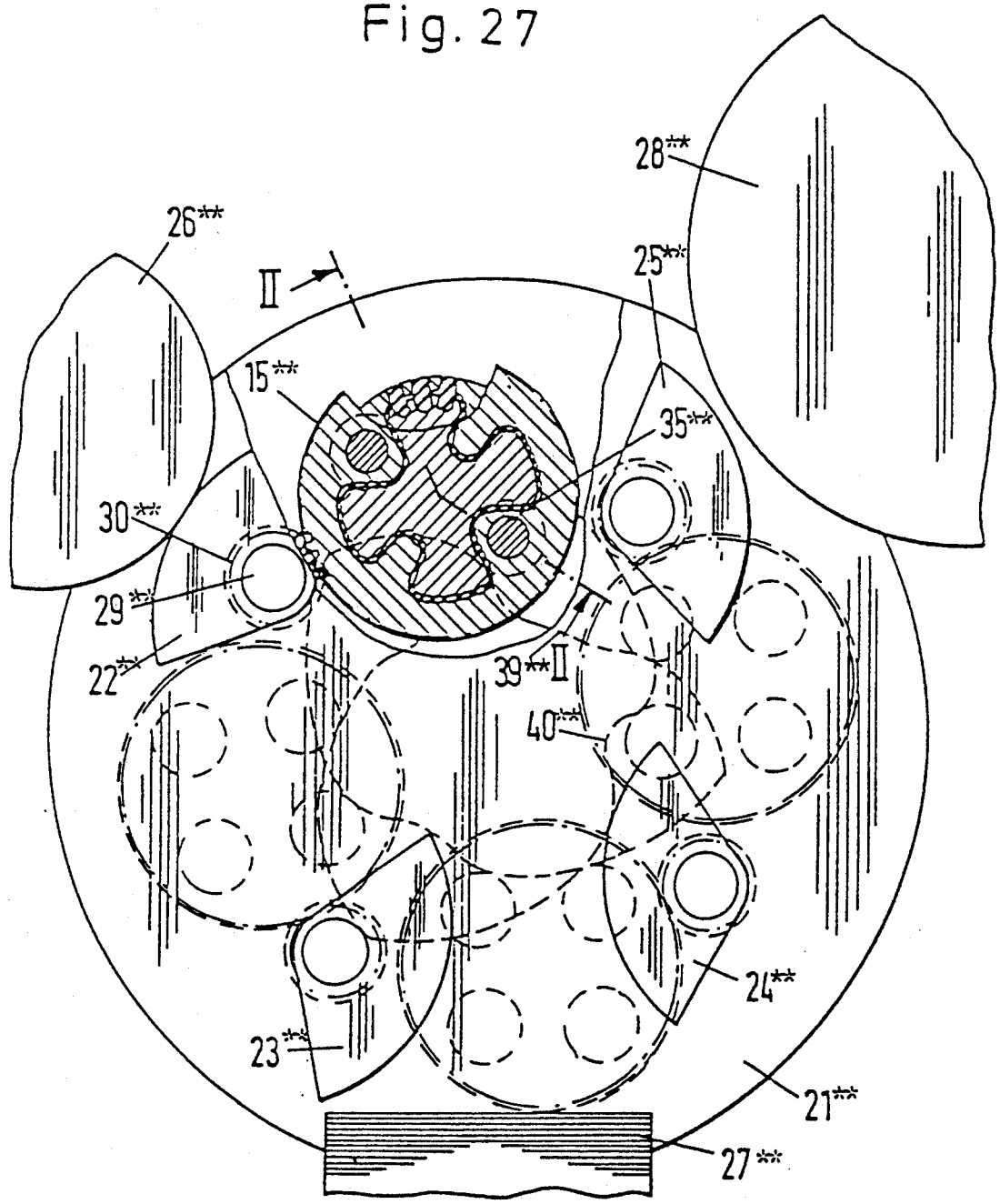
FIG. 27 is a top view of a labelling machine with followers guided on two one-sided outside cams.
Figure 28:
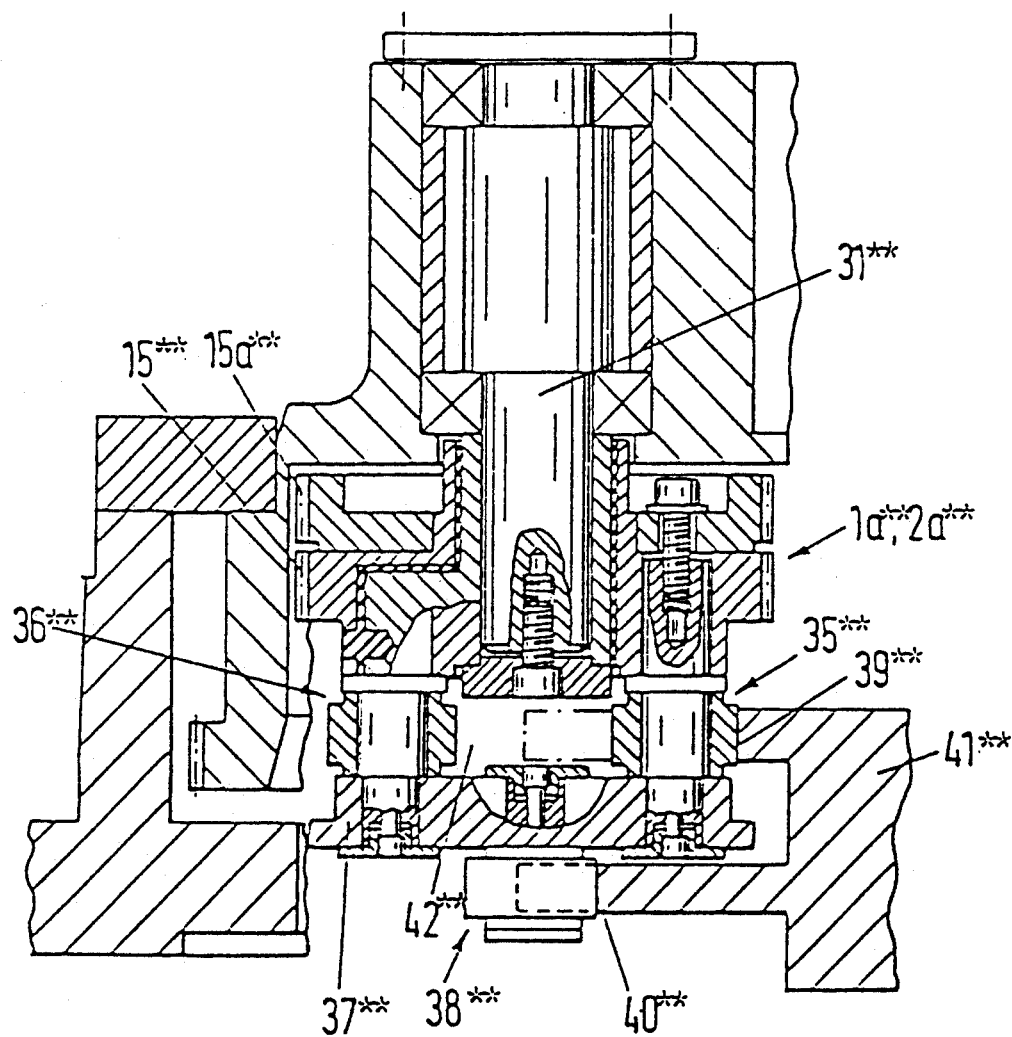
FIG. 28 is a cross-section of the labelling machine of FIG. 27 taken along line II—II.

The embodiment illustrated in FIGS. 27 and 28 differs from the embodiment illustrated in FIGS. 25 and 26 in that the support element is equipped with two followers 35 and 36, which support bridge element 37. Bridge element 37 is also equipped with two followers 38, which are offset by approximately 90 degrees from followers 35 and 36. FIG. 28 shows only one of the two followers. Corresponding to the two pairs of followers are two overlapping and separate one-sided outer cams 39 and 40 of common stationary cam support 41. In the space between the two outer cams, 39 and 40, is bridge element 37. Outer cams 39 and 40 have the basic shape of indented ovals and are oriented crossways to one another. When support 21 rotates, the support element and the extracting element are rotated in the same direction causing the extracting element to roll over the surface of stations 26 through 28. Bridge element 37 allows outer cams 39 and 40 to be completely filled thereby allowing the support element and the extracting element 22 to be clearly guided. Bridge element 37, thus allows upper outer cam 39 to extend into vicinity 42 of the axis of the drive shaft 31.

Although for purposes of illustration the cam followers shown have been attached through a mounting to a support which is then attached to a drive shaft, it is to be understood that the followers may also be directly connected to the drive shaft. In this embodiment the elastic dampening material would be interposed directly between the mounting for the followers and the drive shaft.

In summary, what is provided is a support element mounted on a shaft 31 for the followers 32, 35, 36, 38 of a cam drive mechanism, in particular a mechanism for a label extracting element 22 to 25 and a labelling station, characterized by the fact that the support element comprises an outer body 2, 2a are an inner body 1, 1a located inside it at some distance from it on all sides, whereby the outer body 2, 2a has claws 8, 8a directed radially inward, and the inner body 1, 1a has claws 6, 6a directed radially outward between the inwardly directed claws and the space between the two bodies 1, 1a, 2, 2a is filled with an insert 3, 3a of elastic material, and that the inwardly directed claws 8, 8a of the outer body 2, 2a are designed for the insertion of followers 32, 35, 36, 38. The support element is characterized by the fact that the spaces between the claws 8, 8a of the outer body 2, 2a are enclosed by an end wall 12, 12a and that between this end wall 12, 12a and the end surfaces of the claws 6, 6a of the inner body 1, 1a facing it, elastic insert 3, 3a** is located.

Also, the support element is characterized by the fact that between the two bodies 1, 1a, 2, 2a there are annular surfaces which extend axially, between which the elastic insert 3, 3a is located. Further, the support element is characterized by the fact that the annular surfaces are formed by sleeve-shaped projections 16, 17 of the inner and outer bodies 1, 1a, 2, 2a located coaxially above one another. Additionally, the support element is characterized by the fact that the annular surfaces make the transition gradually into the radially inward surfaces of the inwardly-directed claws 8a of the outer body, in the spaces containing the outwardly-directed claws 6a of the inner body 1a and containing the claws 8a of the outer body 2a**.

The support element is further characterized by the fact that there are several radial recesses 13, 13a, 14, 14a in the inside and outside body 1, 1a, 2, 2a, which are filled with a slug of elastic material connected with elastic insert 3, 3a. Also, the support element is characterized by the fact that the recesses 13, 13a, 14, 14a with the slug are on the outside circumference of the support element. Further, the support element is characterized by the fact that the recesses 13, 13a, 14, 14a are aligned with one another in pairs. Additionally, the support element is characterized by the fact that the outer body 2 has a drive pinion 15.

Also provided is a labelling station for objects, in particular, bottles with several stations located behind one another along a track, namely an adhesive application apparatus 26, a label transfer station 28, and with extracting element 22 to 25 for the labels, mounted so that it can rotate on a rotating support 21 and be moved passed the stations 26, 27, 28 during each rotation of the support 21, which extracting element has an outwardly-curved receptacle surface for the label which rolls along the currently foremost label in the label feed station 27 and the other stations whereby the drive for each extracting element 22 to 25 is a cam drive, which comprises common, stationary double cams 33, 33a, 33b, 34, 39, 40, 41 for all the extracting elements 22 to 25 and one or more interacting followers 32, 35, 36, 38 which are mounted on the drive shaft 31 or on a bearing shaft 60 coupled with it by means of a support element 1, 2, 1a, 2a and which by means of the form-fit with the double cam 33, 33a, 33b, 34, 39, 40, 41 protect the rotational movement of each extracting element 26 to 28 when the support 21, characterized by the fact that the driver bearing shaft 31 ends in front of the plane of the followers 32, 35, 36, 38 and the support element 1, 2, 1a, 2a is designed for the optional insertion of a single follower 32, which is engaged with a double cam 33, 33a, 33b, 34 designed as a grooved cam, or for the insertion of two followers 35, 36 diametrically opposite one another in relation to the axis of the drive shaft 31 where the bearing shaft, which interact with a first one-sided cam 39 of the double cam 39, 40, 41 and support a bridge element 37 which is located between the first cam 39 and a second cam 40 located at some distance from it and which supports followers 38 off-set from the followers 35, 36 of the first cam 39 by approximately 90 degrees in interacting with the second cam 40.

The labelling machine illustrated in FIG. 29 through 32 includes rotating transport table 1*, which moves containers 2* so that they may be labelled. The containers are moved on a track, in the form of a circular arc, past gripper cylinder 3*, which transfers a label with adhesive to container 2*. Gripper cylinder 3* takes the glued label from curved receptacle surfaces 4* of extracting elements 5*. Elements can rotate eccentrically to curved receptacle surface 4* on support table 6***, or may be mounted so that they can rotate or pivot eccentrically to the support axis.

Each extracting element 5* is driven when support table 6* is in rotation by means of a transmission, which includes cam disc 7*, which is common for all extracting elements 5* and which has two outside cams, 7a* and 7b*, at different heights and drive wheel 8* on which are mounted cam followers 8a*, 8b*, 8c* and 8d*. The driving of extracting elements 5*, as indicated in FIG. 20, can be accomplished directly by means of transmission 120* and 121*. The rotational or pivoting movement of extracting elements 5* is not uniform, so that their receptacle surfaces can roll over adhesive application roller 9*, stationary label box 10* and gripper cylinder 3*, in the same direction.

Figure 29:
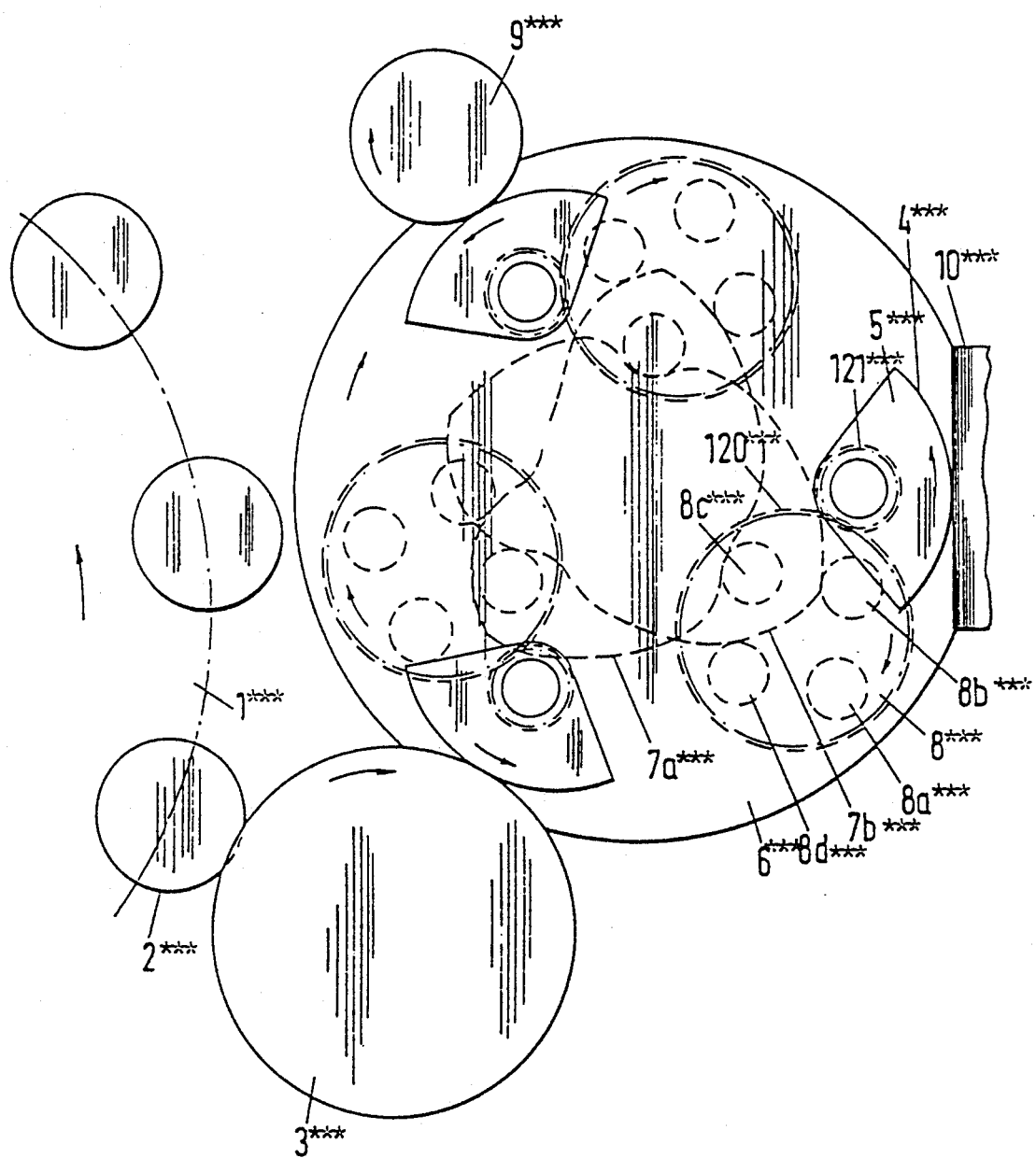
FIG. 29 is a schematic plan view of a labelling machine.
Figure 32:
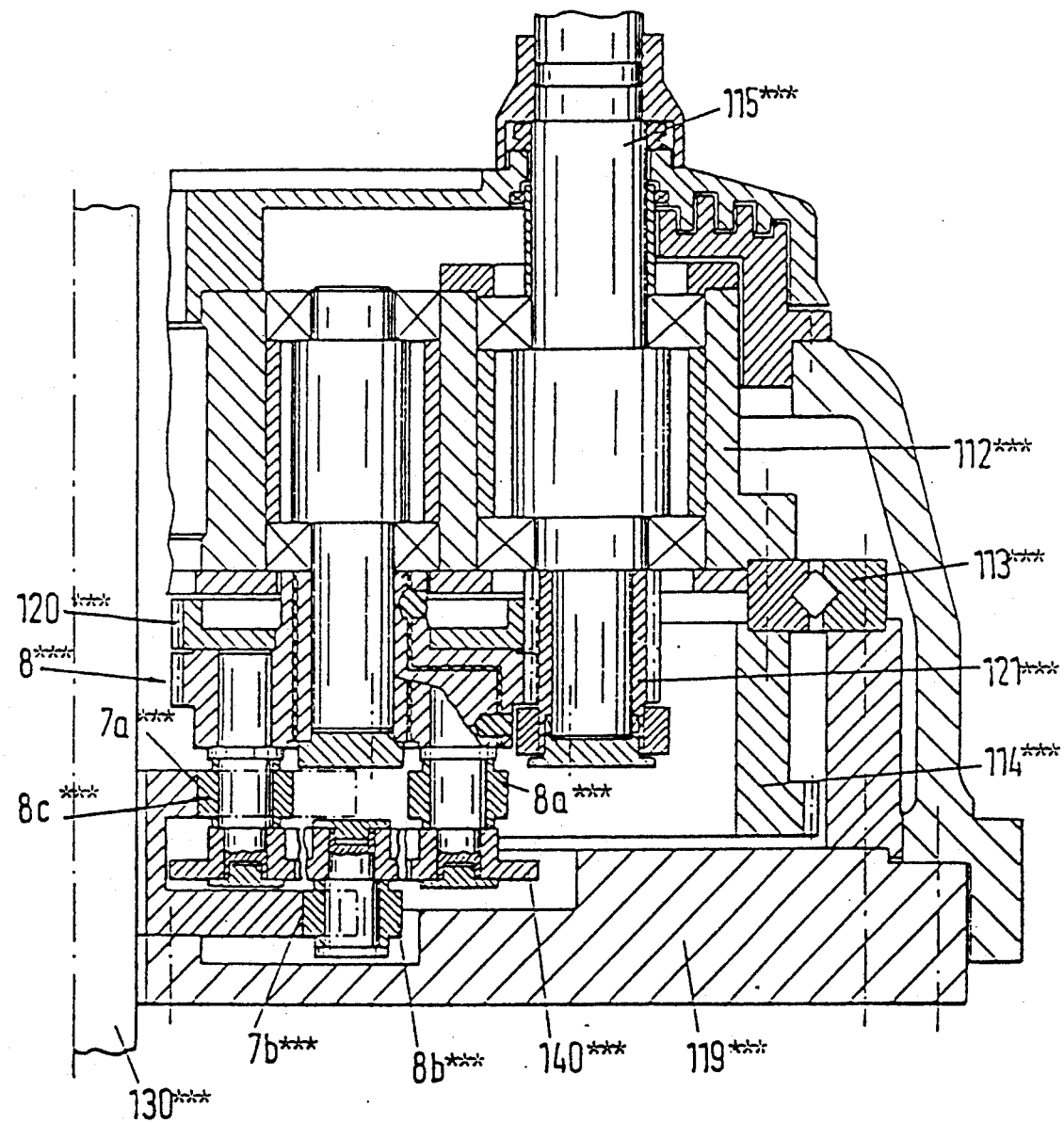
FIG. 32 is a cross sectional view of a support of the labelling machine illustrated in FIG. 29.

With the embodiment of a design as illustrated in FIGS. 29 and 32, the drive of each extracting element 5* is by means of a cam transmission consisting of two outside cams, 7a* and 7b* which are positioned at different heights and followers 8a*, 8b*, 8c* and 8d* which ride on cams 7a* and 7b*. The transmission mechanism in the embodiment illustrated in FIG. 30 consists of cam disc 19* with grooved cam slot 19a* and followers 18* in the form of rollers mounted on a lever arm 17***.

Figure 30:
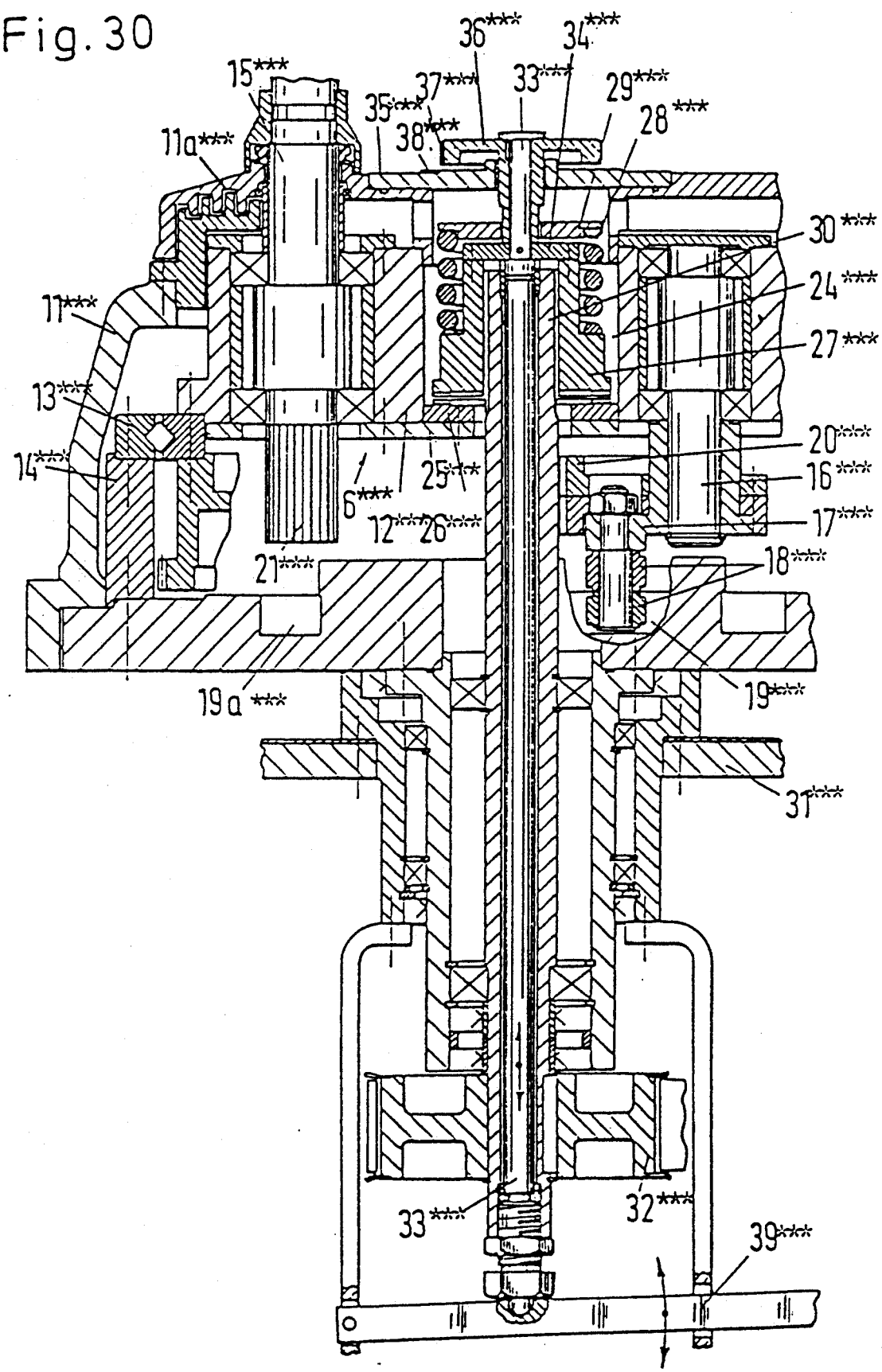
FIG. 30 is a cross-sectional view of a support of the labelling machine of FIG. 29 which employs different drives for the extracting elements than that of FIG. 29.
Figure 31:
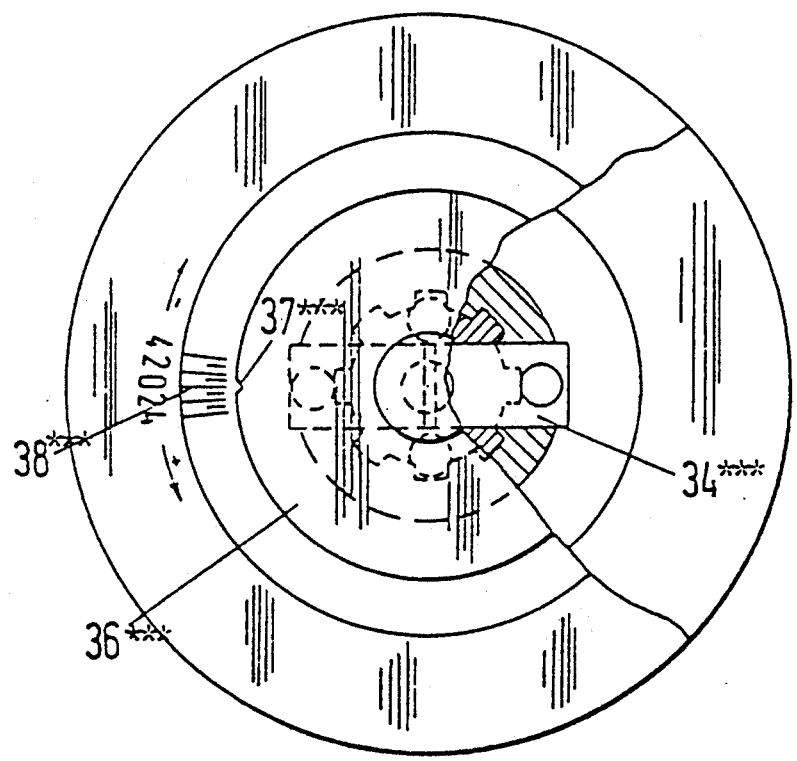
FIG. 31 is a top view of the central portion of the support illustrated in FIG. 30.

Support table 6*, as shown in FIG. 30, has upper cover plate 11a*, housing 11* and, underneath it and connected to it, bearing structure 12* which is mounted on the outside circumference of the table 6* by means of angular roller bearing 13*. Bearing structure 12* is also used to mount drive shafts 15*, which extend upward through cover plate 11a* and support extracting elements 5*, and to mount bearing shafts 16* which support followers 18* through lever arms 17*. Followers 18* engage closed grooved cam 19a*, which is common to all followers 18*, of the cam disc 19*. Closed groove cam 19a* is similar in construction to grooved cam 33* in FIG. 25. Pinions 20* mesh with gear wheel 21* on drive shafts 15* of the extracting elements 5* and are mounted so that they do not rotate on the bearing shafts 15*. Gear wheel 21* with a gear wheel of the synchronously driven adhesive application roller 23*.

In central space 24*, left open by the drive and transmissions of the extracting elements, between cover plate 11a* and mounting plate 25*, there is an axially retractable spur gear coupled with one coupling half, 26*, which is fastened to mounting plate 25* and the other coupling half, 27*. Coupling half 27* is biased by coil spring 28* so that it is normally held in direct contact with coupling half 26* when hand lever 39* is lowered. For this purpose, coupling half 27* is in contact with annular disc 29*, which is supported by central drive shaft 30* which is a hollow shaft. Hollow drive shaft 30* extends downward through a central opening in base plate 31* of machine frame 14*, where it is mounted and supports belt wheel 32*** which is normally connected to a drive belt which extends from a drive (not shown).

Bumper 33* runs through hollow drive shaft 30* and has stationary crosshead 34* on its upper end, which extends with both legs through axial slits in drive shaft 30* and is connected with coupling half 27*. Bumper 33* runs through a central opening of marking disc 35* which, in turn, is inserted in an opening of cover plate 11a*. On its free end, bumper 33* supports marking wheel 36* with notch 37* which corresponds to marks 38* on marking disc 35*. The spacing of marks 38* coincides with the spur gear teeth of coupling halves 26* and 27*.

To disengage the two coupling halves 26*, so that support table 6* can be twisted relative to drive shaft 30* and with the marking ring 36*, bumper 33* is lifted by means of hand lever 39*, the lower end of which supports bumper 33***.

FIG. 30 illustrates the retracted state of coupling halves 26* and 27*. After uncoupling, the labelling station, as shown in FIG. 29, can be rotated independently of the machine drive and can be set up in the desired position for the label to be transferred. The degree of misalignment can be read from markings 37* and 38*.

The embodiment illustrated in FIG. 32 differs, as noted above, from the embodiment illustrated in FIG. 30 principally in terms of the transmission. FIG. 32, moreover, does not show the coupling. The embodiment in FIG. 32 is primarily intended to show the compact construction, because in this embodiment the transmission with the cams extends almost up to drive shaft 130. For the sake of simplicity, in this embodiment, the same identification numbers are used as in FIG. 30, but are preceded by the number 1.

In the embodiment illustrated in FIG. 32, cam disc 119* is designed as a bridge element and supports two outside cams, 7a* and 7b*, different planes. Followers 8a*, 8c*, 8b* and 8d* interact with outside cams 7a* and 7b* and are mounted on drive wheel 8*, which is engaged by drive pinion 120* with pinion 121* positioned on the drive shaft of extracting element 115*. Bridge element 140*, which is supported by the bearing pivot of the followers 8a* and 8c*, is provided to support the bearing pivots of the lower followers 8b* and 8d*.

In summary, a design provides a labelling station of a labelling machine for containers, in particular bottles 2*, which have a support 6*, and a support table 11*. The support 6* can be driven via a coupling 26*, 27*, by a central drive shaft 30*, supports at least one extracting element 5* and is mounted so that it can rotate in the machine frame 14*. When the support 6* rotates, the extracting element 5* which has in particular a curved receptacle surface 4* and is mounted on it eccentrically so that it cam rotate or pivot around its own axis and is moved along a closed track past stations 3*, 9*, 10* for the application of adhesive to the receptacle surface and for the storage and transfer of labels. For each extracting element 5*, for whose rotating or pivoting motion there is a transmission 16*-21*, in particular a cam transmission, with a common transmission part, in particular a cam disc 19* mounted no the machine frame 14* for all the extracting elements 5*. The mounting 13* of the support 6* in the machine frame 14* is located exclusively on the outside edge of the support 6***.

Another aspect of the above design resides in that the coupling 26*, 27* between the drive shaft 30* and the support 6* is located inside a central space inside the orbit described by the transmission 16*-21*, between the cover plate 11a* of the support 6* and the parts 16*-21* of the transmission engaged with one another.

Still another aspect of the above design resides in that a non-rotating bumper 33* extends through the drive shaft 20* designed as a hollow shaft and which can move axially inside it and to each is attached a spring-loaded coupling half 27* of the axially retractable coupling 26*, 27*, the end of which projects from the table 11* of the support 6*, together with the adjacent portion 35* of the table 11*, has alignment marks 37*, 38***.

A further aspect of the above design resides in that the coupling halves 25*, 27* are engaged with one another by means of spur gear teeth 26a*, 27a*, the spacing of which corresponds to the spacing of the alignment marks 38***.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to by incorporable, at applicant's option, into the claims during prosecution as further limitations in the claims to patentably distinguish any amended claims from any applied prior art.

The invention as described hereinabove in the context of the preferred embodiment is not to be taken as limited to all of the provided details thereof, since modifications and variations thereof may be made without departing from the spirit and scope of the invention.

What is claimed is:

1. A labelling station for a labelling machine for supplying labels to objects, such as bottles or the like, said labelling station comprising a plurality of stations located one behind another along a track; the plurality of stations comprising an adhesive application apparatus, a label feed station and a label transfer station; said labelling machine comprising:

a rotatable support mounted on a central axis for rotation by each of the plurality of stations;

a least one extracting means for the labels;

said extracting means including drive shaft means;

said extracting means being mounted on said drive shaft means for rotation on said rotatable support for movement by each of the stations during each rotation of said rotatable support;

means for rotating said extracting means;

said extracting means rotating means comprising cam means and cam follower means;

said cam means including a first cam disc and a second cam disc;

said first cam disc and said second cam disc being disposed below said rotatable support mounted on said central axis;

said first cam disc including a first outer cam surface extending about said central axis;

said second cam disc including a second outer cam surface extending about said central axis;

said first cam disc being disposed above said second cam disc;

said cam follower means for following said cam means;

means for operably connecting said follower means to said drive shaft means;

said follower means being mounted for rotation about a follower axis on said rotatable support for providing at least a portion of the rotation of said extracting means;

said follower means including a first pair of followers being disposed in substantially the same horizontal elevation as said first cam disc;

said first pair of followers for making contact with said first outer cam surface, and a second pair of followers being disposed in substantially the same horizontal elevation as said second cam disc;

said second pair of followers for making contact with said second outer cam surface;

each of said first pair of followers and said second pair of followers being mounted on a follower support element at substantially opposite sides of a follower axis;

said follower means being rotatable by said cam means for producing said rotation of said extracting means;

said means for operably connecting said follower means to said drive shaft means being for rotating said drive shaft means;

said means for operably connecting said follower means to said drive shaft means comprising:

a bearing shaft;

said follower means defining a shaft-free open area between said first pair of followers; and said bearing shaft being disposed away from said shaft-free open area;

said shaft-free open area being disposed below said bearing shaft;

said drive shaft means at least partly defining an additional shaft-free open area disposed below said drive shaft means.

2. Labelling machine according to claim 1, further comprising:

said follower means corresponding to said second outer cam surface being mounted on a bridge element;

said bridge element being located between said first cam disc and said second cam disc;

said bridge element being supported by spacer elements positioned on a support element;

said spacer elements being located outside an area covered by the eccentric movement of said first pair of followers effected by said first cam disc; and at least one of said first pair of followers and said second pair of followers comprising said spacer elements.

3. Labelling machine according to claim 1, further comprising:

said first pair of followers and said second pair of followers defining a moving equivalent cam surface;

said first cam disc and said second cam disc defining a fixed equivalent cam surface;

said moving equivalent cam surface being for rotation about said fixed equivalent cam surface with point by point rolling contact therebetween when said follower means is rotated about said cam means;

each of said followers including a center of rotation which is radially located within said moving equivalent cam surface; and at least a portion of at least one of said followers lying outside of said moving equivalent cam surface.

4. Labelling machine according to claim 3, wherein at least one of said cam followers comprises a support element, said support element comprising:

an outer body member having a plurality of radially inwardly projecting claws for the mounting of a cam follower thereon;

an inner body member for being operatively associated with said outer body member, said inner body member comprising a plurality of radially outwardly projecting claws corresponding to said radially inwardly projecting claws of said outer body member, said inner body member and said outer body member being out of direct contact with one another; and dampening means for being interposed between and in direct contact with said outer body member and said inner body member for dampening noise applied to said outer body member before the noise reaches said inner body member.

5. Labelling machine according to claim 4, further comprising:

said dampening means being an elastic material;

said plurality of radially outwardly projecting claws of said inner body member comprising first and second radially outwardly projecting claws corresponding to at least one radially inwardly projecting claw of said outer body member;

said first and second radially outwardly projecting claws of said inner body member being relatively positioned to define a cavity therebetween;

said at least one radially inwardly projecting claw of said body member being positioned within said cavity and between said first and second radially outwardly projecting claws of said inner body member;

said elastic material for absorbing at least radial forces between said inner body member and said outer body member to dampen noise applied to said outer body member before the noise reaches said inner body member; and said outer body member and said inner body member defining a plurality of radial recesses which are filled with a slug of elastic material.

6. The labelling machine according to claim 5, further comprising rotatable support mounting means attached to said central axis and positioned adjacent to and in movable contact exclusively with the perimeter of said rotatable support for supporting said rotatable support and allowing relative rotational movement of said rotatable support with respect to said central axis.

7. The labelling machine according to claim 6, further comprising coupling means interposed between said drive shaft means and said rotatable support with said coupling means capable of assuming a couple position for coupling said drive shaft to said support table and capable of assuming a decoupled position for releasing said drive shaft from said support table.

8. The labelling machine according to claim 7, further comprising:

said drive shaft means comprising a drive shaft;

said extracting means comprising at least one glue segment having a curved glue take-up surface;

said at least one glue segment including a hole for receipt of the drive shaft within said hole;

said at least one glue segment for being disposed on the drive shaft with the drive shaft being disposed within said hole;

said at least one glue segment being for rotation with the drive shaft;

said at least one glue segment including an axial bore;

said axial bore including a longitudinal axis;

said hole including a longitudinal axis;

said longitudinal axis of said bore being substantially parallel with said longitudinal axis of said hole and with the axis of the drive shaft when the drive shaft is disposed within said hole;

a bushing including a base element and a spacing element;

said base element of said bushing for being disposed in said bore of said at least one glue segment;

said spacing element of said bushing for extending outwardly from said bore in an axial direction, along said longitudinal axis of said bore, toward one of the at least one radially extending surface means;

said spacing element including abutting surface means for making contact with the one of the at least one radially extending surface means; and said abutting surface means making contact with the one of the at least one radially extending surface means for defining an axial position of said at least one glue segment relative to the predetermined location of the one of the at least one radially extending surface means of the drive shaft.

9. Labelling machine according to claim 8, further comprising:

said first cam disc defining a plane and said second cam disc also defining a plane;

at least one of:
said drive shaft means, and
said bearing shaft ending before intersecting either one of:
the plane of said first cam disc, and
the plane of said second cam disc; and said plane of said first cam disc being closer to said bearing shaft than said plane of said second cam disc.

10. A labelling station for a labelling machine for supplying labels to objects, such as bottles or the like, said labelling station comprising a plurality of stations located one behind another along a track; the plurality of stations comprising an adhesive application apparatus, a label feed station and a label transfer station; said labelling machine comprising:

a rotatable support mounted on a central axis for rotation by each of the plurality of stations;

a least one extracting means for the labels;

said extracting means including drive shaft means;

said extracting means being mounted on said drive shaft means for rotation on said rotatable support for movement by each of the stations during each rotation of said rotatable support;

means for rotating said extracting means;

said extracting means rotating means comprising cam means and cam follower means;

said cam follower means for following said cam means;

means for operably connecting said follower means to said drive shaft means;

said follower means being mounted for rotation about a follower axis on said rotatable support for providing at least a portion of the rotation of said extracting means;

said follower means including at least a first pair of followers being disposed in substantially the same horizontal elevation;

said follower means being rotatable by said cam means for producing said rotation of said extracting means;

said means for operably connecting said follower means to said drive shaft means being for rotating said drive shaft means;

said means for operably connecting said follower means to said drive shaft means comprising:
a bearing shaft;

said follower means defining a shaft-free open area between said first pair of followers; and said bearing shaft being disposed away from said shaft-free open area;

said shaft-free open area being disposed below said bearing shaft;

said drive shaft means at least partly defining an additional shaft-free open area disposed below said drive shaft means.

11. The labelling station according to claim 10, wherein said cam means includes a first cam disc and a second cam disc;

said first cam disc and said second cam disc being disposed below said rotatable support mounted on said central axis;

said first cam disc including a first outer cam surface extending about said central axis;

said second cam disc including a second outer cam surface extending about said central axis;

said first cam disc being disposed above said second cam disc;

said first pair of followers being disposed in substantially the same horizontal elevation as said first cam disc;

said first pair of followers for making contact with said first outer cam surface, and a second pair of followers being disposed in substantially the same horizontal elevation as said second cam disc; and said second pair of followers for making contact with said second outer cam surface.

12. The labelling station according to claim 11, further comprising:

each of said first pair of followers and said second pair of followers being mounted on a follower support element;

said first cam disc defining a plane and said second cam disc also defining a plane;

at least one of:
said drive shaft means, and
said bearing shaft ending before intersecting either one of:
the plane of said first cam disc, and
the plane of the second cam disc; and said plane of said first cam disc being closer to said bearing shaft than said plane of said second cam disc.

13. Labelling machine according to claim 12, further comprising:

said follower means corresponding to said second outer cam surface being mounted on a bridge element;

said bridge element being located between said first cam disc and said second cam disc;

said bridge element being supported by spacer elements positioned on a support element;

said spacer elements being located outside an area covered by the eccentric movement of said first pair of cam followers effected by said first cam disc; and at least one of said first pair of followers and said second pair of followers comprising said spacer elements.

14. Labelling machine according to claim 12, further comprising:

said first pair of followers and said second pair of followers defining a moving equivalent cam surface;

said first cam disc and said second cam disc defining a fixed equivalent cam surface;

said moving equivalent cam surface being for rotation about said fixed equivalent cam surface with point by point rolling contact therebetween when said follower means is rotated about said cam means;

each of said followers including a center of rotation which is radially located within said moving equivalent cam surface; and at least a portion of at least one of said followers lying outside of said moving equivalent cam surface.

15. Labelling machine according to claim 14, wherein at least one of said cam followers comprises a support element, said support element comprising:

an outer body member having a plurality of radially inwardly projecting claws for the mounting of a cam follower thereon;

an inner body member for being operatively associated with said outer body member, said inner body member comprising a plurality of radially outwardly projecting claws corresponding to said radially inwardly projecting claws of said outer body member, said inner body member and said outer body member being out of direct contact with one another; and dampening means for being interposed between and in direct contact with said outer body member and said inner body member for dampening noise applied to said outer body member before the noise reaches said inner body member.

16. Labelling machine according to claim 15, further comprising:

said dampening means being an elastic material;

said plurality of radially outwardly projecting claws of said inner body member comprising first and second radially outwardly projecting claws corresponding to at least one radially inwardly projecting claw of said outer body member;

said first and second radially outwardly projecting claws of said inner body member being relatively positioned to define a cavity therebetween;

said at least one radially inwardly projecting claw of said body member being positioned within said cavity and between said first and second radially outwardly projecting claws of said inner body member;

said elastic material for absorbing at least radial forces between said inner body member and said outer body member to dampen noise applied to said outer body member before the noise reaches said inner body member; and said outer body member and said inner body member defining a plurality of radial recesses which are filled with a slug of elastic material.

17. The labelling machine according to claim 16, further comprising rotatable support mounting means attached to said central axis and positioned adjacent to and in movable contact exclusively with the perimeter of said rotatable support for supporting said rotatable support and allowing relative rotational movement of said rotatable support with respect to said central axis.

18. The labelling machine according to claim 17, further comprising coupling means interposed between said drive shaft means and said rotatable support with said coupling means capable of assuming a couple position for coupling said drive shaft to said support table and capable of assuming a decoupled position for releasing said drive shaft from said support table.

19. The labelling machine according to claim 18, further comprising:

said drive shaft means comprising a drive shaft;

said extracting means comprising at least one glue segment having a curved glue take-up surface;

said at least one glue segment including a hole for receipt of the drive shaft within said hole;

said at least one glue segment for being disposed on the drive shaft with the drive shaft being disposed within said hole;

said at least one glue segment being for rotation with the drive shaft;

said at least one glue segment including an axial bore;

said axial bore including a longitudinal axis;

said hole including a longitudinal axis;

said longitudinal axis of said bore being substantially parallel with said longitudinal axis of said hole and with the axis of the drive shaft when the drive shaft is disposed within said hole;

a bushing including a base element and a spacing element;

said base element of said bushing for being disposed in said bore of said at least one glue segment;

said spacing element of said bushing for extending outwardly from said bore in an axial direction, along said longitudinal axis of said bore, toward one of the at least one radially extending surface means;

said spacing element including abutting surface means for making contact with the one of the at least one radially extending surface means; and said abutting surface means making contact with the one of the at least one radially extending surface means for defining an axial position of said at least one glue segment relative to the predetermined location of the one of the at least one radially extending surface means of the drive shaft.

20. The labelling machine according to claim 19, further comprising:

each of said followers includes a portion thereof which lies outside of said moving equivalent cam surface;

at least some of said followers are offset from one another by an angle not equal to 90 degrees and have lever arms from said follower axis of different lengths;

two of said followers including longer ones of said lever arms are in engaging contact with said cam means during at least part of said rotation about said central axis;

two of said followers including shorter ones of said lever arms and one of said follower with a longer one of said lever arms are in engaging contact with said cam means during at least part of said rotation about said central axis;

at the adhesive application station, two of said followers with shorter said lever arms are engaged with said cam means for transmitting torque and one of said followers with a longer said lever arm is for supporting from the other side of said cam means;

at the label feed station, one of said followers with a longer said lever arm is engaged with said cam means for transmitting torque and one of said followers with a longer said lever arm are for supporting form the other side of said cam means;

at the label transfer station, one of said followers with a longer said lever arm is engaged with said cam means for transmitting torque and two of said followers with shorter said lever arms are for supporting from the other side of said cam means;

the follower for transmitting torque at the label feed station corresponds to said first cam disc;

one of said followers of said first pair and one of said followers of said second pair include long said lever arms and an opposite ones of said followers of said first pair and of said second pair include short said lever arms;

an orbit of said drive shaft means about said central axis is longer than an orbit of said follower axis about said central axis;

said dampening means is elastic material means;

said outer body member further includes wall means adjacent said elastic material means;

said outer body member and said inner body member define annular surfaces in at least partially surrounding relationship with respect to said elastic material means;

said annular surfaces are formed by elements which project from said outer body member and said inner body member and are relatively positioned in coaxial relation with respect to one another;

said outer body member includes a drive pinion;

said inner body member being separated from said outer body member on all sides;

said dampening means filling the space between said outer body member and said inner body member;

said at least one radially inwardly projecting claw being configured for the insertion of cam followers;

an end wall enclosing a space adjacent said at least one radially inwardly projection claw of said outer body member;

a plurality of axially extending annular surfaces between said outer body member and said inner body member;

said dampening means is positioned between said axially extended annular surfaces;

said annular surfaces making a transition gradually into the surface of said at least one radially inwardly projecting claw of said outer body member and the space containing said radially outwardly projecting claws of said inner body member and said at least one radially inwardly projecting claw of said outer body member;

said elastic material being connected with said dampening means;

said radial recesses and said slug of elastic material being positioned on the outside circumference of a support element;

said radial recesses being aligned with one another in pairs;

said outer body member including a drive pinion;

transmission means moveably attached to the support table and the label extractor for moving the label extractor relative to the support table;

said coupling means is positioned within a central area which has a perimeter defined by a path of movement of said transmission means;

decoupling means mechanically attached to said coupling means for causing said coupling means to assume said decoupled position;

biasing means for causing said coupling means to be biased toward said coupled position;

said biasing means includes spring means;

said decoupling means includes shaft means for causing said coupling means to assume said decoupled position;

first alignment means attached to said shaft means for determining the angular position of the support table relative to the drive shaft;

said coupling means includes a first coupling member and a second coupling member;

said first coupling member is in contact with said second coupling member when said coupling means is in said coupled position;

said first coupling member is out of contact with said second coupling member when said coupling means is in said decoupled position;

said first and second coupling member include spur teeth;

said spur teeth on said first coupling member are relatively positioned to correspond to and engage with said spur teeth on said second coupling member when said coupling means is in said coupled position;

said alignment means includes alignment marks which correspond to the relatively positioned spur teeth on said first and second coupling members;

said curved glue take-up surface has a center of curvature and said longitudinal axis of said bore is substantially located at said center of curvature;

said at least one glue segment includes means for selectively securing said at least one glue segment at said axial position;

said means for selectively securing includes said at least one glue segment having a wall between said hole and said bore; said wall having an axial slot; said slot having a circumferential width; tensioning bolt means disposed through said wall; and said tensioning bolt means being selectively rotated to decrease said circumferential width of said slot for tightening said hole about the drive shaft;

said tensioning bolt means extends at least partially through said bore, said base element of said bushing includes recess means, and said tensioning bolt means is disposed within said recess means of said base element;

said spacing element includes a side portion, said side portion includes an axially extending recess, and said side portion is for at least partially encircling the drive shaft when the drive shaft is at least partially disposed within said axially extending recess;

first keyway means between the drive shaft and said at least one glue segment at said hole and said first keyway means being for preventing relative rotation of said at least one glue segment about the drive shaft when said at least one glue segment is at said axial position;

second keyway means between the drive shaft and said at least one glue segment at said hole, said second keyway means being circumferentially adjacent to said first keyway means, and said second keyway means being for alignment of said at least one glue segment relative to the drive shaft during the receipt of the drive shaft within said hole;

said second keyway means includes a radially extending pin extending outwardly from the drive shaft, said at least one glue segment includes a cylindrical surface around said hole, an axial groove in said cylindrical surface, and said pin being for extension into said axial groove to cause the alignment during the receipt of the drive shaft within said hole;

the at least one radially extending surface means includes a ring which is disposed about the drive shaft and the abutting surface means makes contact with the ring;

said at least one glue segment includes an upper glue segment and a lower glue segment, the at least one radially extending surface means associated with said lower glue segment includes a ring disposed around the drive shaft, said abutting surface means of said lower glue segment makes contact with the ring, the at least one radially extending surface means associated with said upper glue segment includes an upper surface portion of said lower glue segment, and said abutting surface means of said upper glue segment makes contact with said upper surface portion of said lower glue segment; and said abutting surface means of said spacing element of said lower glue segment makes contact with the ring for defining a first of said axial positions of said lower glue segment relative to the ring and said abutting surface means of said spacing element of said second glue segment makes contact with said upper surface portion of said lower glue segment for defining a second of said axial positions relative to said upper surface portion of said lower glue segment.

* * * * *

UNITED STATES PATENT AND TRADEMARK OFFICE
CERTIFICATE OF CORRECTION

PATENT NO. : 5,227,005
DATED : July 13, 1993
INVENTOR(S) : Rudolf ZODROW and Rainer BUCHHOLZ It is certified that error appears in the above-indentified patent and that said Letters Patent is hereby corrected as shown below:

On title page, item [63] line 9, after Ser. No. 335,478,', delete "Nov. 3, 1989" and insert --Apr. 7, 1989--.

In column 16, line 20, after 'stations', delete "$1_2$" and insert --12--.

In column 17, line 8, after 'gear', insert --wheel--.

In column 21, line 47, after 'and', delete " 15 " and insert -- 15a --.

In column 29, line 33, Claim 10, before 'least', delete "a" and insert --at--.

In column 32, line 61, after 'supporting', delete "form" and insert --from--.

Signed and Sealed this

Sixteenth Day of August, 1994

Attest:

BRUCE LEHMAN

*Attesting Officer*     *Commissioner of Patents and Trademarks*